(12) United States Patent
Kitajima et al.

(10) Patent No.: US 9,356,836 B2
(45) Date of Patent: May 31, 2016

(54) ADMINISTRATION DEVICE, ADMINISTRATION CONTROL METHOD, AND PROGRAM

(71) Applicant: FUJITSU LIMITED, Kawasaki-shi, Kanagawa (JP)

(72) Inventors: Shinya Kitajima, Inagi (JP); Tetsuya Uchiumi, Kawasaki (JP); Shinji Kikuchi, Yokohama (JP); Yasuhide Matsumoto, Kawasaki (JP); Toshihiro Kodaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 301 days.

(21) Appl. No.: 14/099,213

(22) Filed: Dec. 6, 2013

(65) Prior Publication Data
US 2014/0164587 A1 Jun. 12, 2014

(30) Foreign Application Priority Data

Dec. 10, 2012 (JP) .................................. 2012-269025
Oct. 3, 2013 (JP) .................................. 2013-208590

(51) Int. Cl.
*G06F 15/173* (2006.01)
*H04L 12/24* (2006.01)
*H04L 29/06* (2006.01)

(52) U.S. Cl.
CPC ............ *H04L 41/0873* (2013.01); *H04L 63/02* (2013.01); *H04L 63/104* (2013.01)

(58) Field of Classification Search
CPC . H04L 41/0873; H04L 67/1034; H04L 63/02; H04L 63/104
USPC .................................................. 709/203, 223
See application file for complete search history.

(56) References Cited

U.S. PATENT DOCUMENTS

| | | | |
|---|---|---|---|
| 2005/0138462 A1* | 6/2005 | Hunt ................... | G06F 11/2007 714/4.4 |
| 2006/0062219 A1* | 3/2006 | Ookubo .................. | H04L 12/66 370/392 |
| 2007/0147383 A1* | 6/2007 | Kojima ............... | H04L 63/0227 370/392 |
| 2010/0030463 A1* | 2/2010 | Tomizawa .......... | G01C 21/3611 701/533 |
| 2013/0054828 A1* | 2/2013 | Nishi .................. | H04L 67/1034 709/232 |
| 2014/0154971 A1* | 6/2014 | Tanaka ................ | H04L 12/4625 455/7 |

FOREIGN PATENT DOCUMENTS

| | | |
|---|---|---|
| JP | 9-266477 | 10/1997 |
| JP | 11-145957 | 5/1999 |
| JP | 2000-269998 | 9/2000 |
| JP | 2001-274806 | 10/2001 |
| JP | 2004-46445 | 2/2004 |

(Continued)

*Primary Examiner* — Frantz Jean
(74) *Attorney, Agent, or Firm* — Staas & Halsey LLP

(57) ABSTRACT

An administration device in a system in which a first device group and a second device group are connected to a network. The administration device acquires first communication history of the first device group and second communication history of the second device group, compares first specific information which specifies communication source and communication destination of the first communication history and second specific information which specifies communication source and communication destination of the second communication history while referring to relating information and detects a setting error of the second specific information set in the devices of the second device group based on a result of the comparison.

19 Claims, 59 Drawing Sheets

(56) References Cited

FOREIGN PATENT DOCUMENTS

| JP | 2006-174399 | 6/2006 |
| JP | 2006-293641 | 10/2006 |
| JP | 2010-226617 | 10/2010 |
| JP | 2011-192098 | 9/2011 |

* cited by examiner

| IP ADDRESS OF TRANSMISSION SOURCE | PORT NUMBER OF TRANSMISSION SOURCE | IP ADDRESS OF TRANSMISSION DESTINATION | PORT NUMBER OF TRANSMISSION DESTINATION |
|---|---|---|---|
| 192.168.1.26 | ***** | 192.168.1.37 | 25 |
| 192.168.1.27 | 53 | 192.168.1.26 | ***** |
| 192.168.1.37 | ***** | 192.168.1.31 | 2952 |
| 192.168.1.37 | ***** | 192.168.1.35 | 9004 |
| 12.0.3.6 | ***** | 12.0.0.5 | 5012 |
| 192.168.0.12 | ***** | 192.168.1.23 | 9002 |
| 12.3.0.142 | 9000 | 12.0.3.7 | ***** |
| ... | | | |

FIG. 7

| T1b | | | | |
|---|---|---|---|---|
| IP ADDRESS OF TRANSMISSION SOURCE | PORT NUMBER OF TRANSMISSION SOURCE | IP ADDRESS OF TRANSMISSION DESTINATION | PORT NUMBER OF TRANSMISSION DESTINATION | STATE |
| 192.168.1.26 | ***** | 192.168.1.37 | 25 | OK |
| 192.168.1.27 | 53 | 192.168.1.26 | ***** | OK |
| 192.168.1.37 | ***** | 192.168.1.31 | 2952 | OK |
| 192.168.1.37 | ***** | 192.168.1.35 | 9004 | NO RESPONSE |
| 12.4.3.6 | ***** | 12.4.0.5 | 5012 | OK |
| 12.3.0.142 | 9000 | 12.0.3.7 | ***** | OK |
| ... | | | | |

FIG. 8

| IP ADDRESS (FIRST BLOCK A) | IP ADDRESS (SECOND BLOCK B) |
|---|---|
| 192.168.1.23 | 192.168.1.23 |
| 192.168.1.26 | 192.168.1.26 |
| 192.168.1.27 | 192.168.1.27 |
| 192.168.1.31 | 192.168.1.31 |
| 192.168.1.35 | 192.168.1.35 |
| 192.168.1.37 | 192.168.1.37 |
| 192.168.0.12 | 192.168.0.12 |
| 12.0.0.5 | 12.4.0.5 |
| 12.0.3.6 | 12.4.3.6 |
| 12.0.3.7 | 12.4.3.7 |
| 12.3.0.142 | 12.3.0.142 |
| ... | ... |

| IP ADDRESS OF TRANSMISSION SOURCE | PORT NUMBER OF TRANSMISSION SOURCE | IP ADDRESS OF TRANSMISSION DESTINATION | PORT NUMBER OF TRANSMISSION DESTINATION | CORRESPON-DENCE PRESENCE |
|---|---|---|---|---|
| 192.168.1.26 | ***** | 192.168.1.37 | 25 | PRESENCE |
| 192.168.1.27 | 53 | 192.168.1.26 | ***** | PRESENCE |
| 192.168.1.37 | ***** | 192.168.1.31 | 2952 | PRESENCE |
| 192.168.1.37 | ***** | 192.168.1.35 | 9004 | PRESENCE |
| 12.4.3.6 (BEFORE CONVERSION: 12.0.3.6) | ***** | 12.4.0.5 (BEFORE CONVERSION: 12.0.0.5) | 5012 | PRESENCE |
| 192.168.0.12 | ***** | 192.168.1.23 | 9002 | |
| 12.3.0.142 | 9000 | 12.4.3.7 (BEFORE CONVERSION: 12.0.3.7) | ***** | |
| ... | | | | |

P1 → (row 1)
P2 → (row 2)
P3 → (row 6)

| IP ADDRESS OF TRANSMISSION SOURCE | PORT NUMBER OF TRANSMISSION SOURCE | IP ADDRESS OF TRANSMISSION DESTINATION | PORT NUMBER OF TRANSMISSION DESTINATION | STATE | CORRESPONDENCE PRESENCE |
|---|---|---|---|---|---|
| 192.168.1.26 | ***** | 192.168.1.37 | 25 | OK | PRESENCE |
| 192.168.1.27 | 53 | 192.168.1.26 | ***** | OK | PRESENCE |
| 192.168.1.37 | ***** | 192.168.1.31 | 2952 | OK | PRESENCE |
| 192.168.1.37 | ***** | 192.168.1.35 | 9004 | NO RESPONSE | PRESENCE |
| 12.4.3.6 | ***** | 12.4.0.5 | 5012 | OK | PRESENCE |
| 12.3.0.142 | 9000 | 12.0.3.7 | ***** | OK | |
| ... | | | | | |

P1 → (row 1)
P2 → (row 2)
P3 → (row 6)

| IP ADDRESS OF TRANSMISSION SOURCE | PORT NUMBER OF TRANSMISSION SOURCE | IP ADDRESS OF TRANSMISSION DESTINATION | PORT NUMBER OF TRANSMISSION DESTINATION | CORRESPON- DENCE PRESENCE |
|---|---|---|---|---|
| 192.168.0.12 | ***** | 192.168.1.23 | 9002 | |
| 12.3.0.142 | 9000 | 12.4.3.7 (BEFORE CONVERSION: 12.0.3.7) | ***** | |

| IP ADDRESS OF TRANSMISSION SOURCE | PORT NUMBER OF TRANSMISSION SOURCE | IP ADDRESS OF TRANSMISSION DESTINATION | PORT NUMBER OF TRANSMISSION DESTINATION | STATE | CORRESPON- DENCE PRESENCE |
|---|---|---|---|---|---|
| 192.168.1.37 | ***** | 192.168.1.35 | 9004 | NO RESPONSE | PRESENCE |
| 12.3.0.142 | 9000 | 12.0.3.7 | ***** | OK | |

| IP ADDRESS OF TRANSMISSION SOURCE | PORT NUMBER OF TRANSMISSION SOURCE | IP ADDRESS OF TRANSMISSION DESTINATION | PORT NUMBER OF TRANSMISSION DESTINATION |
|---|---|---|---|
| 12.3.0.142 | 9000 | 12.4.3.7 | ***** |

| IP ADDRESS OF TRANSMISSION SOURCE | PORT NUMBER OF TRANSMISSION SOURCE | IP ADDRESS OF TRANSMISSION DESTINATION | PORT NUMBER OF TRANSMISSION DESTINATION | STATE |
|---|---|---|---|---|
| 12.3.0.142 | 9000 | 12.0.3.7 | ***** | OK |

| IP ADDRESS OF TRANSMISSION SOURCE | PORT NUMBER OF TRANSMISSION SOURCE | IP ADDRESS OF TRANSMISSION DESTINATION | PORT NUMBER OF TRANSMISSION DESTINATION |
|---|---|---|---|
| 192.168.0.12 | ***** | 192.168.1.23 | 9002 |

| IP ADDRESS OF TRANSMISSION SOURCE | PORT NUMBER OF TRANSMISSION SOURCE | IP ADDRESS OF TRANSMISSION DESTINATION | PORT NUMBER OF TRANSMISSION DESTINATION | STATE |
|---|---|---|---|---|
| 192.168.1.37 | ***** | 192.168.1.35 | 9004 | NO RESPONSE |

| IP ADDRESS (FIRST BLOCK A) | IP ADDRESS (SECOND BLOCK B) | IP ADDRESS (THIRD BLOCK C) | IP ADDRESS (FOURTH BLOCK D) |
|---|---|---|---|
| 192.168.1.23 | 192.168.1.23 | 192.168.1.23 | 192.168.1.23 |
| 192.168.1.26 | 192.168.1.26 | 192.168.1.26 | 192.168.1.26 |
| 192.168.1.27 | 192.168.1.27 | 192.168.1.27 | 192.168.1.27 |
| 192.168.1.31 | 192.168.1.31 | 192.168.1.31 | 192.168.1.31 |
| 192.168.1.35 | 192.168.1.35 | 192.168.1.35 | 192.168.1.35 |
| 192.168.1.37 | 192.168.1.37 | 192.168.1.37 | 192.168.1.37 |
| 192.168.0.12 | 192.168.0.12 | 192.168.0.12 | 192.168.0.12 |
| 12.0.0.5 | 12.4.0.5 | 12.8.0.5 | 12.12.0.5 |
| 12.0.3.6 | 12.4.3.6 | 12.8.3.6 | 12.12.3.6 |
| 12.0.3.7 | 12.4.3.7 | 12.8.3.7 | 12.12.3.7 |
| 12.3.0.142 | 12.3.0.142 | 12.3.0.142 | 12.3.0.142 |
| ... | | | |

| IP ADDRESS OF TRANSMISSION SOURCE | PORT NUMBER OF TRANSMISSION SOURCE | IP ADDRESS OF TRANSMISSION DESTINATION | PORT NUMBER OF TRANSMISSION DESTINATION |
|---|---|---|---|
| 192.168.1.26 | ***** | 192.168.1.37 | 25 |
| 192.168.1.27 | 53 | 192.168.1.26 | ***** |
| 192.168.1.37 | ***** | 192.168.1.31 | 2952 |
| 192.168.1.37 | ***** | 192.168.1.35 | 9004 |
| 12.12.3.6 (BEFORE CONVERSION: 12.0.3.6) | ***** | 12.12.0.5 (BEFORE CONVERSION: 12.0.0.5) | 5012 |
| ... | | | |

P1a → (row 1)
P2a → (row 3)
P11 → (row 5)

| IP ADDRESS OF TRANSMISSION SOURCE | PORT NUMBER OF TRANSMISSION SOURCE | IP ADDRESS OF TRANSMISSION DESTINATION | PORT NUMBER OF TRANSMISSION DESTINATION |
|---|---|---|---|
| 192.168.1.26 | ***** | 192.168.1.37 | 25 |
| 192.168.1.27 | 53 | 192.168.1.26 | ***** |
| 192.168.1.37 | ***** | 192.168.1.31 | 2952 |
| 12.12.3.6 (BEFORE CONVERSION: 12.4.3.6) | ***** | 12.12.0.5 (BEFORE CONVERSION: 12.4.0.5) | 5012 |
| ... | | | |

P1b →  (row 1)
P2b →  (row 3)

| IP ADDRESS OF TRANSMISSION SOURCE | PORT NUMBER OF TRANSMISSION SOURCE | IP ADDRESS OF TRANSMISSION DESTINATION | PORT NUMBER OF TRANSMISSION DESTINATION |
|---|---|---|---|
| 192.168.1.26 | ***** | 192.168.1.37 | 25 |
| 192.168.1.27 | 53 | 192.168.1.26 | ***** |
| 192.168.1.37 | ***** | 192.168.1.31 | 2685 |
| 12.12.3.6 (BEFORE CONVERSION: 12.8.3.6) | ***** | 12.12.0.5 (BEFORE CONVERSION: 12.8.0.5) | 5012 |
| ... | | | |

P1c → (row 1)
P3c → (row 3)

| | IP ADDRESS OF TRANSMISSION SOURCE | PORT NUMBER OF TRANSMISSION SOURCE | IP ADDRESS OF TRANSMISSION DESTINATION | PORT NUMBER OF TRANSMISSION DESTINATION | DC NUMBER | CER-TAINTY | CORRESPON-DENCE PRESENCE |
|---|---|---|---|---|---|---|---|
| P1m → | 192.168.1.26 | ***** | 192.168.1.37 | 25 | 3 | 1 | PRESENCE |
| | 192.168.1.27 | 53 | 192.168.1.26 | ***** | 3 | 1 | PRESENCE |
| P2m → | 192.168.1.37 | ***** | 192.168.1.31 | 2952 | 2 | 2/3 | |
| P3m → | 192.168.1.37 | ***** | 192.168.1.31 | 2685 | 1 | 1/3 | PRESENCE |
| | 192.168.1.37 | ***** | 192.168.1.35 | 9004 | 1 | 1/3 | PRESENCE |
| P4m → | 12.12.3.6 | ***** | 12.12.0.5 | 5012 | 3 | 1 | |
| ... | | | | | | | |

| IP ADDRESS OF TRANSMISSION SOURCE | PORT NUMBER OF TRANSMISSION SOURCE | IP ADDRESS OF TRANSMISSION DESTINATION | PORT NUMBER OF TRANSMISSION DESTINATION | STATE | CORRESPONDENCE PRESENCE |
|---|---|---|---|---|---|
| 192.168.1.26 | ***** | 192.168.1.37 | 25 | OK | PRESENCE |
| 192.168.1.27 | 53 | 192.168.1.26 | ***** | OK | PRESENCE |
| 192.168.1.37 | ***** | 192.168.1.31 | 2685 | OK | PRESENCE |
| 192.168.1.37 | ***** | 192.168.1.35 | 9004 | NO RESPONSE | PRESENCE |
| 12.3.0.142 | 9000 | 12.8.3.7 | ***** | OK | |
| ... | | | | | |

| IP ADDRESS OF TRANSMISSION SOURCE | PORT NUMBER OF TRANSMISSION SOURCE | IP ADDRESS OF TRANSMISSION DESTINATION | PORT NUMBER OF TRANSMISSION DESTINATION | NUMBER OF COMMUNI-CATIONS |
|---|---|---|---|---|
| 192.168.1.26 | ***** | 192.168.1.37 | 25 | 12 |
| 192.168.1.27 | 53 | 192.168.1.26 | ***** | 42 |
| 192.168.1.37 | ***** | 192.168.1.31 | 2952 | 36 |
| 192.168.1.37 | ***** | 192.168.1.35 | 9004 | 24 |
| 12.12.3.6 | ***** | 12.12.0.5 | 5012 | 45 |
| ... | | | | |

| IP ADDRESS OF TRANSMISSION SOURCE | PORT NUMBER OF TRANSMISSION SOURCE | IP ADDRESS OF TRANSMISSION DESTINATION | PORT NUMBER OF TRANSMISSION DESTINATION | NUMBER OF COMMUNI-CATIONS |
|---|---|---|---|---|
| 192.168.1.26 | ***** | 192.168.1.37 | 25 | 11 |
| 192.168.1.27 | 53 | 192.168.1.26 | ***** | 16 |
| 192.168.1.37 | ***** | 192.168.1.31 | 2685 | 33 |
| 12.12.3.6 | ***** | 12.12.0.5 | 5012 | 51 |
| ... | | | | |

| IP ADDRESS OF TRANSMISSION SOURCE | PORT NUMBER OF TRANSMISSION SOURCE | IP ADDRESS OF TRANSMISSION DESTINATION | PORT NUMBER OF TRANSMISSION DESTINATION | DC NUMBER | NUMBER OF COMMUNICATIONS | CERTAINTY | CORRESPONDENCE PRESENCE |
|---|---|---|---|---|---|---|---|
| 192.168.1.26 | ***** | 192.168.1.37 | 25 | 3 | 38 | 38(1) | PRESENCE |
| 192.168.1.27 | 53 | 192.168.1.26 | ***** | 3 | 94 | 94(1) | PRESENCE |
| 192.168.1.37 | ***** | 192.168.1.31 | 2952 | 2 | 90 | 60(2/3) | |
| 192.168.1.37 | ***** | 192.168.1.31 | 2685 | 1 | 33 | 11(1/3) | PRESENCE |
| 192.168.1.37 | ***** | 192.168.1.35 | 9004 | 1 | 24 | 8(1/3) | PRESENCE |
| 12.12.3.6 | ***** | 12.12.0.5 | 5012 | 3 | 161 | 161(1) | |
| ... | | | | | | | |

| | IP ADDRESS OF TRANSMISSION SOURCE | PORT NUMBER OF TRANSMISSION SOURCE | IP ADDRESS OF TRANSMISSION DESTINATION | PORT NUMBER OF TRANSMISSION DESTINATION |
|---|---|---|---|---|
| P31 → | 12.0.3.7 | ***** | 12.0.0.3 | 161 |
| P32 → | 12.0.3.7 | ***** | 12.0.0.5 | 161 |
| | 12.0.3.7 | ***** | 12.0.0.6 | 161 |
| | 12.0.3.7 | ***** | 12.0.0.9 | 161 |
| | 12.0.3.7 | ***** | 12.1.2.11 | 161 |
| | 12.0.3.7 | ***** | 12.1.2.12 | 161 |
| | 12.0.3.7 | ***** | 12.1.2.61 | ***** |
| P33 → | 12.0.3.7 | ***** | 12.3.0.142 | 9000 |
| P34 → | 12.0.3.6 | ***** | 12.0.3.7 | 56241 |
| P35 → | 12.0.0.3 | 161 | 12.0.3.7 | ***** |
| | 12.0.0.6 | 161 | 12.0.3.7 | ***** |
| | 12.1.2.11 | 161 | 12.0.3.7 | ***** |
| | 12.1.2.12 | 161 | 12.0.3.7 | ***** |
| | 12.1.2.61 | ***** | 12.0.3.7 | ***** |
| | 12.3.0.142 | 9000 | 12.0.3.7 | ***** |
| | 12.0.3.7 | 56241 | 12.0.3.6 | ***** |
| | 12.0.3.7 | 162 | 12.1.2.14 | 162 |
| | 12.1.2.14 | 162 | 12.0.3.7 | 162 |

FIG. 40

| | PARTNER IP ADDRESS | TRANSMITTED PORT NUMBER OF TRANSMISSION SOURCE | TRANSMITTED PORT NUMBER OF TRANSMISSION DESTINATION | RECEIVED PORT NUMBER OF TRANSMISSION SOURCE | RECEIVED PORT NUMBER OF TRANSMISSION DESTINATION |
|---|---|---|---|---|---|
| P51 → | 12.0.0.3 | 161 | ***** | ***** | 161 |
| P52 → | 12.0.0.5 | - | - | ***** | 161 |
| | 12.0.0.6 | 161 | ***** | ***** | 161 |
| | 12.0.0.9 | - | - | ***** | 161 |
| | 12.1.2.11 | 161 | ***** | ***** | 161 |
| | 12.1.2.12 | 161 | ***** | ***** | 161 |
| | 12.1.2.61 | ***** | ***** | ***** | ***** |
| P53 → | 12.3.0.142 | 9000 | 56241 | 56241 | 9000 |
| P54 → | 12.0.3.6 | ***** | 162 | 162 | ***** |
| | 12.1.2.14 | 162 | 162 | 162 | 162 |

| ITEM NUMBER | PARTNER IP ADDRESS | TRANSMITTED PORT NUMBER OF TRANSMISSION SOURCE | TRANSMITTED PORT NUMBER OF TRANSMISSION DESTINATION | RECEIVED PORT NUMBER OF TRANSMISSION SOURCE | RECEIVED PORT NUMBER OF TRANSMISSION DESTINATION |
|---|---|---|---|---|---|
| 1 | 12.0.0.3, 12.0.0.6, 12.1.2.11, 12.1.2.12 | 161 | ***** | ***** | 161 |
| 2 | 12.0.0.5, 12.0.0.9 | - | - | ***** | 161 |
| 3 | 12.1.2.14 | 162 | 162 | 162 | 162 |
| 4 | 12.1.2.61 | ***** | ***** | ***** | ***** |
| 5 | 12.0.3.6 | ***** | 56241 | 56241 | ***** |
| 6 | 12.3.0.142 | 9000 | ***** | ***** | 9000 |

| PARTNER IP ADDRESS | TRANSMITTED PORT NUMBER OF TRANSMISSION SOURCE | TRANSMITTED PORT NUMBER OF TRANSMISSION DESTINATION | RECEIVED PORT NUMBER OF TRANSMISSION SOURCE | RECEIVED PORT NUMBER OF TRANSMISSION DESTINATION | NUMBER OF COMMUNI-CATION |
|---|---|---|---|---|---|
| 12.0.0.3 | 161 | ***** | ***** | 161 | 5124 |
| 12.0.0.5 | - | - | ***** | 161 | 4957 |
| 12.0.0.6 | 161 | ***** | ***** | 161 | 4857 |
| 12.0.0.9 | - | - | ***** | 161 | 6421 |
| 12.1.2.11 | 161 | ***** | ***** | 161 | 5842 |
| 12.1.2.12 | 161 | ***** | ***** | 161 | 6545 |
| 12.1.2.14 | 162 | 162 | 162 | 162 | 7554 |
| 12.1.2.61 | ***** | ***** | ***** | ***** | 521 |
| 12.0.3.6 | 161 | ***** | ***** | 161 | 1025 |

| PARTNER IP ADDRESS | TRANSMITTED PORT NUMBER OF TRANSMISSION SOURCE | TRANSMITTED PORT NUMBER OF TRANSMISSION DESTINATION | RECEIVED PORT NUMBER OF TRANSMISSION SOURCE | RECEIVED PORT NUMBER OF TRANSMISSION DESTINATION | NUMBER OF COMMUNI-CATION |
|---|---|---|---|---|---|
| 12.0.0.3 | 161 | ***** | ***** | 161 | MANY |
| 12.0.0.5 | - | - | ***** | 161 | MANY |
| 12.0.0.6 | 161 | ***** | ***** | 161 | MANY |
| 12.0.0.9 | - | - | ***** | 161 | MANY |
| 12.1.2.11 | 161 | ***** | ***** | 161 | MANY |
| 12.1.2.12 | 161 | ***** | ***** | 161 | MANY |
| 12.1.2.14 | 162 | 162 | 162 | 162 | MANY |
| 12.1.2.61 | ***** | ***** | ***** | ***** | SMALL |
| 12.0.3.6 | 161 | ***** | ***** | 161 | MEDIUM |

| ITEM NUMBER | PARTNER IP ADDRESS | TRANSMITTED PORT NUMBER OF TRANSMISSION SOURCE | TRANSMITTED PORT NUMBER OF TRANSMISSION DESTINATION | RECEIVED PORT NUMBER OF TRANSMISSION SOURCE | RECEIVED PORT NUMBER OF TRANSMISSION DESTINATION | NUMBER OF COMMUNI-CATION |
|---|---|---|---|---|---|---|
| 1 | 12.0.0.3, 12.0.0.6, 12.1.2.11, 12.1.2.12 | 161 | ***** | ***** | 161 | MANY |
| 2 | 12.0.0.5, 12.0.0.9 | - | - | ***** | 161 | MANY |
| 3 | 12.1.2.14 | 162 | 162 | 162 | 162 | MANY |
| 4 | 12.1.2.61 | ***** | ***** | ***** | ***** | SMALL |
| 5 | 12.0.3.6 | 161 | ***** | ***** | 161 | MEDIUM |

| ITEM NUMBER | PARTNER IP ADDRESS | TRANSMITTED PORT NUMBER OF TRANSMISSION SOURCE | TRANSMITTED PORT NUMBER OF TRANSMISSION DESTINATION | RECEIVED PORT NUMBER OF TRANSMISSION SOURCE | RECEIVED PORT NUMBER OF TRANSMISSION DESTINATION |
|---|---|---|---|---|---|
| 1 | 12.0.0.3, 12.0.0.6, 12.1.2.11, 12.1.2.12, 12.0.3.6 | 161 | ***** | ***** | 161 |
| 2 | 12.0.0.5, 12.0.0.9 | - | - | ***** | 161 |
| 3 | 12.1.2.14 | 162 | 162 | 162 | 162 |
| 4 | 12.1.2.61 | ***** | ***** | ***** | ***** |

FIG. 49A
C1

```
<item id="VServer005" type="VServer">
 <record type="observed">
  <name>vsvr1</name>
  <cpu>XXX</cpu>
  <memory>4GB</memory>
  <ipAddress>12.0.3.7</ipAddress>
  <status>normal</status>
  ...
 </record>
</item>
```

FIG. 49C
R1

```
<relationship id="Rel405" type="Dom0">
 <sourceItem>VServer005</sourceItem>
 <targetItem>Server001</targetItem>
 <record type="observed">
  ...
 </record>
</relationship>
```

FIG. 49B
C2

```
<item id="Server001" type="Server">
 <record type="observed">
  <name>svr1</name>
  <cpu>XXX</cpu>
  <memory>32GB</memory>
  <ipAddress>12.0.0.1</ipAddress>
  <status>normal</status>
  ...
 </record>
</item>
```

FIG. 49D

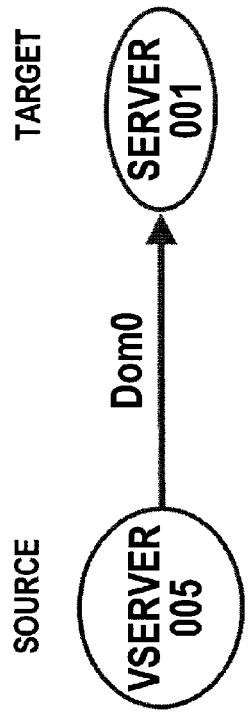

```
<item id="Switch001" type="Switch">
  <record type="observed">
    <name>sw1</name>
    <manufacture>XXX</manufacture>
    <model>XXX</model>
    <ipAddress>12.0.0.220</ipAddress>
    <status>normal</status>
    ...
  </record>
</item>
```

```
<relationship id="Rel001" type="LinkTo">
  <sourceItem>Switch001</sourceItem>
  <targetItem>Server001</targetItem>
  <record type="observed">
    ...
  </record>
</relationship>
```

FIG. 50C

SOURCE — LinkTo → TARGET
SWITCH 001 → SERVER 001

| ITEM NUMBER | PARTNER IP ADDRESS | TRANSMITTED PORT NUMBER OF TRANSMISSION SOURCE | TRANSMITTED PORT NUMBER OF TRANSMISSION DESTINATION | RECEIVED PORT NUMBER OF TRANSMISSION SOURCE | RECEIVED PORT NUMBER OF TRANSMISSION DESTINATION |
|---|---|---|---|---|---|
| 1 | 12.0.0.3, 12.0.0.5, 12.0.0.6, 12.0.0.9, 12.1.2.11, 12.1.2.12 | 161 OR - | ***** OR - | ***** | 161 |
| 2 | 12.1.2.14 | 162 | 162 | 162 | 162 |
| 3 | 12.1.2.61 | ***** | ***** | ***** | ***** |
| 4 | 12.0.3.6 | ***** | 56241 | 56241 | ***** |
| 5 | 12.3.0.142 | 9000 | ***** | ***** | 9000 |

ADMINISTRATION DEVICE, ADMINISTRATION CONTROL METHOD, AND PROGRAM

CROSS-REFERENCE TO RELATED APPLICATIONS

This application is based upon and claims the benefit of priority of the prior Japanese Patent Application No. 2012-269025, filed on Dec. 10, 2012 and the prior Japanese Patent Application No. 2013-208590, filed on Oct. 3, 2013, the entire contents of which are incorporated herein by reference.

FIELD

The embodiments discussed herein are related to an administration device, an administration control method, and a program.

BACKGROUND

In large-scale systems such as a cloud system, an administrator installs more hardware components for the cloud system in order to deal with an increase in resource requests due to an increase in the number of users for the cloud system. In the aforementioned installment, the administrator installs more hardware components in unit of partial system in which a plurality of hardware components are unified as one unit.

When the administrator installs one or more partial systems, a first constitution, that is included in the partial system to be added, is equally or approximately equally set to a second constitution included in the existing (already installed) partial system. The aforementioned first constitution and second constitution are constructed by hardware components and software components respectively, for example. There is a case where the administrator partially customizes various setting information that is set in the hardware components and software components in the existing partial system, for designing for the partial system to add. Then, the administrator sets customized various setting information to the hardware components and software components in the partial system to add.

Functions of the existing partial system and the functions of the partial system to be added are equal or approximately equal, the administrator equalizes or approximately equalizes the first constitution with the second constitution and further carries out the aforementioned partial customization.

When the administrator partially customizes the various setting information and sets the various setting information to the hardware components and the software components in the partial system to be added, there is a case where an error in settings (hereinafter, appropriately referred to as "setting error") occurs. This setting error is often involved with the settings of information (hereinafter, appropriately referred to as communication relating information) related to network communication (hereinafter, appropriately referred to as communication) such as IP addresses and port numbers.

Regarding a distributed system which is constituted in such a manner that a plurality of apparatuses are connected to a network, there has been proposed a technique by which the apparatuses are automatically set, thereby making it possible to establish mutual communications (see Patent Document 1: Japanese Unexamined Patent Application Publication No. 2000-269998).

In order to avoid the setting error above, it is conceivable that the aforementioned technique is utilized. However, it is difficult to set the IP addresses and the port numbers, which are partially customized for the partial system to be added, in the hardware components in the partial system to be added, based on the aforementioned technique.

Accordingly, the administrator manually customizes the communication relating information such as the IP addresses and the port numbers and sets the customized communication relating information in the hardware components. After the partial system is added, the administrator verifies whether the partial system appropriately operates prior to the operation of the partial system.

In the aforementioned verification, the administrator needs to expeditiously recognize the content of the setting error and correct the setting error. However, it is troublesome and difficult for the administrator to detect the setting error by manual. In particular, in a case where the setting errors often occur due to an increase in the scale of the systems to be added, it is significantly troublesome and difficult for the administrator to manually detect the setting error.

SUMMARY

According to an aspect of the embodiments, an administration device in a system in which a first device group and a second device group are connected with each other, includes a storage device configured to store relating information that maps devices of the first device group with devices of the second device group and a control unit configured to acquire first communication history of the first device group and second communication history of the second device group, compare first specific information, which specify a transmission source and a transmission destination in the first communication history, with second specific information, which specify a transmission source and a transmission destination in the second communication history by referring to the relating information, and detect a setting error of the second specific information set in the devices of the second device group based on a result of comparison.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram of construction of a first table to explain a communication log database in FIG. 5;

FIG. 7 is a diagram of construction of a second table to explain the communication log database in FIG. 5;

FIG. 8 is a diagram of construction of a table to explain a server correspondence database in FIG. 5;

FIG. 12 is a diagram of construction of a table to describe the conversion processing of the communication logs;

FIG. 13 is a diagram to explain a communication log table in which a correspondence presence column is added to the communication log table in FIG. 7;

FIG. 18A and FIG. 18B are diagrams to explain the extraction of a setting error candidate, which is executed at Step S14 in FIG. 14;

FIG. 19 A and FIG. 19B are first diagrams to explain the detection processing for the setting errors, which is executed at the Step S14 in FIG. 14;

FIG. 20 is a second diagram to explain the detection processing for the setting errors, which is executed at the Step S14 in FIG. 14;

FIG. 21 is a third diagram to explain the detection processing for the setting errors, which is executed at the Step S14 in FIG. 14;

FIG. 23 is a diagram illustrating construction of a table to describe a server correspondence database DB2 in the embodiment of the present invention;

FIG. 24 is a diagram illustrating a table illustrating a state where the communication logs of the first block A20*a* are merged, and the IP addresses are appropriately converted, as one example;

FIG. 25 is a diagram illustrating a table illustrating a state where the communication logs of the second block B20*b* are merged, and the IP addresses are appropriately converted, as one example;

FIG. 26 is a diagram illustrating a table illustrating a state where the communication logs of the third block C20*c* are merged, and the IP addresses are appropriately converted, as one example;

FIG. 27 is a diagram illustrating a table illustrating a state where a master communication log is stored, as one example;

FIG. 28 is a diagram illustrating a table illustrating a state where the communication logs of a fourth block are merged;

FIG. 30 is a diagram illustrating a table illustrating a state where the communication logs of the first block A20*a* are merged, and the IP addresses are appropriately converted, as another example;

FIG. 32 is a diagram illustrating a table illustrating a state where the communication logs of the third block C20*c* are merged, and the IP addresses are appropriately converted, as another example;

FIG. 33 is a diagram illustrating a table illustrating a state where a master communication log is stored, as one example;

FIG. 36 is a diagram illustrating a table illustrating a communication log of a setting error candidate including IP address of a target server;

FIG. 40 is a diagram illustrating a table to store the communication log of the setting error candidate which is shaped, as one example;

FIG. 43 is a diagram illustrating a state table in which the IP addresses included in the shaping log table in FIG. 40 are clustered;

FIG. 44 is a diagram illustrating a table to store the clustering log including a number of communications, as one example;

FIG. 45 is a diagram illustrating a table to store the communication log of the setting error candidate which is shaped, as another example;

FIG. 47 is a diagram illustrating a state table in which the IP addresses included in the shaping log table in FIG. 45 are clustered;

FIG. 48 is a diagram illustrating a state table in which the IP addresses included in the shaping log table in FIG. 44 are clustered without referring to the number of communication as a basis of a similarity;

FIG. 49A, FIG. 49B, FIG. 49C and FIG. 49D are first diagrams to illustrate a construction element, relating element information and a relationship between the construction element and the relating element information;

FIG. 50A, FIG. 50B and FIG. 50C are second diagrams to illustrate a construction element, a relating element information and a relationship between the construction element and the relating element information;

FIG. 58 is a diagram to explain a state that the clustering logs including six IP addresses belonging to same parent node N5 are aggregated in clustering logs which are illustrated in a narrow result table Tn1 in FIG. 43.

DESCRIPTION OF EMBODIMENTS (Information Processing System)

Figure 1:
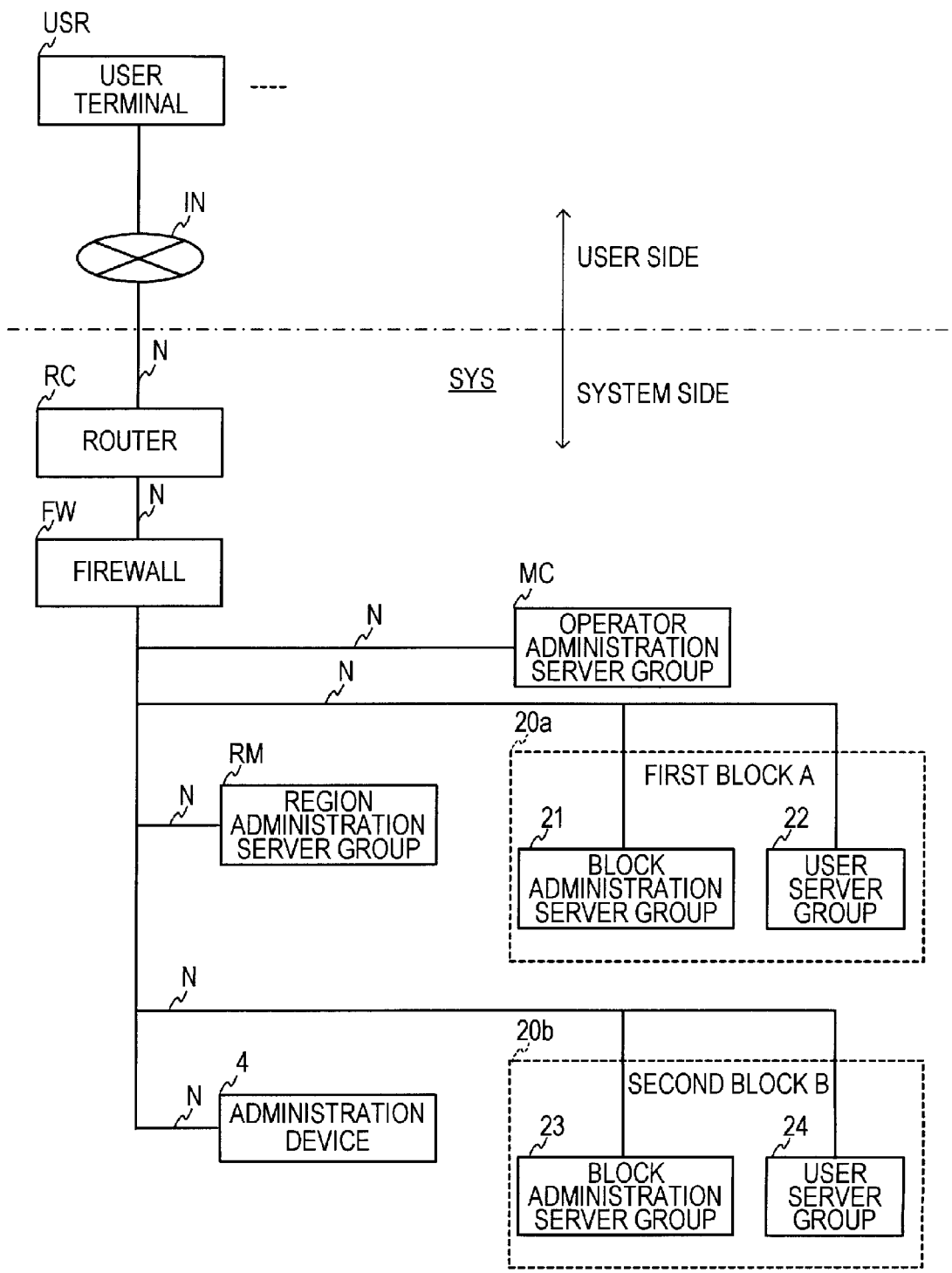
FIG. 1 is a hardware block diagram of an entire system as one example.

FIG. 1 is a hardware block diagram to describe an information processing system SYS of the embodiment as one example. In the description below, the same reference numbers are applied to elements having the same functions, and the detailed description of the elements is appropriately omitted. In the embodiment, the information processing system SYS is a cloud system. The information processing system SYS includes a router RC connected to a network N, a firewall FW, an operator administration server group MC, a region administration server group RM, a first block A20a, a second block B20b, and an administration device 4. The network N is exemplified by LAN (Local Area Network). It is noted that the block is also referred to as a data center.

The information processing system SYS connects a user terminal USR, which a user of the cloud system operates, via the Internet IN. The information processing system SYS executes data processing in response to a data processing request from the user terminal USR and transmits the processing results to the user terminal USR. For the illustrative convenience, FIG. 1 illustrates only one user terminal USR, but a magnitude of user terminals are connected to the information processing system SYS via the Internet IN. In the diagram, the upper side of FIG. 1 represents a user side with a dotted chain line as a reference, and the lower side of FIG. 1 represents an information processing system SYS side with the dotted chain line as the reference.

The router RC is a communication device that mutually connects the Internet IN with the network N in the information processing system SYS. The firewall FW is a device that includes a so-called firewall function of preventing an unauthorized access to the network N in the information processing system SYS. The operator administration server group MC is a server group for operating the information processing system SYS and includes a plurality of servers to execute the operating processing.

The first block A20a is the existing (already installed) partial system and includes a block administration server group 21 and a user server group 22. The user server group 22 includes a plurality of servers which execute various data processing in response to the request from the user terminal USR. The block administration server group 21 includes a plurality of servers to administrate the user server group 22. Regarding to the block administration server group 21 and the user server group 22 in the first block A20a, the operational verification has already been completed. The first block A20a is also referred to as operational verification-completed first block A20a or configuration-completed first block A20a. The words "operational verification-completed" means that the operational verification, in which the execution of an appropriate operation based on the design specifications is verified, has already been completed with respect to the server group (for example, the first block A20a).

The second block B20b is the partial system to be added, and the second block B20b includes a block administration server group 23 and a user server group 24. The user server group 24 includes a plurality of servers which execute various data processing in response to the request from the user terminal USR. The block administration server group 23 includes a plurality of servers to administrate the user server group 24. Regarding the block administration server group 23 and the user server group 24 in the second block B20b, the operational verification has not been completed. The second block B20b is also referred to as an operational-verification-target second block B20b or a second block B20b for which the operational verification has not been completed, or a second block B20b that is currently being configured.

The region administration server group RM is a device that administrates the first block A20a and the second block B20b and includes a plurality of servers to execute the administration processing.

The administration device 4 is a device that administrates the entire operational verification in a case where the operational verification for the partial system as a subject of the operational verification is carried out.

Figure 2:
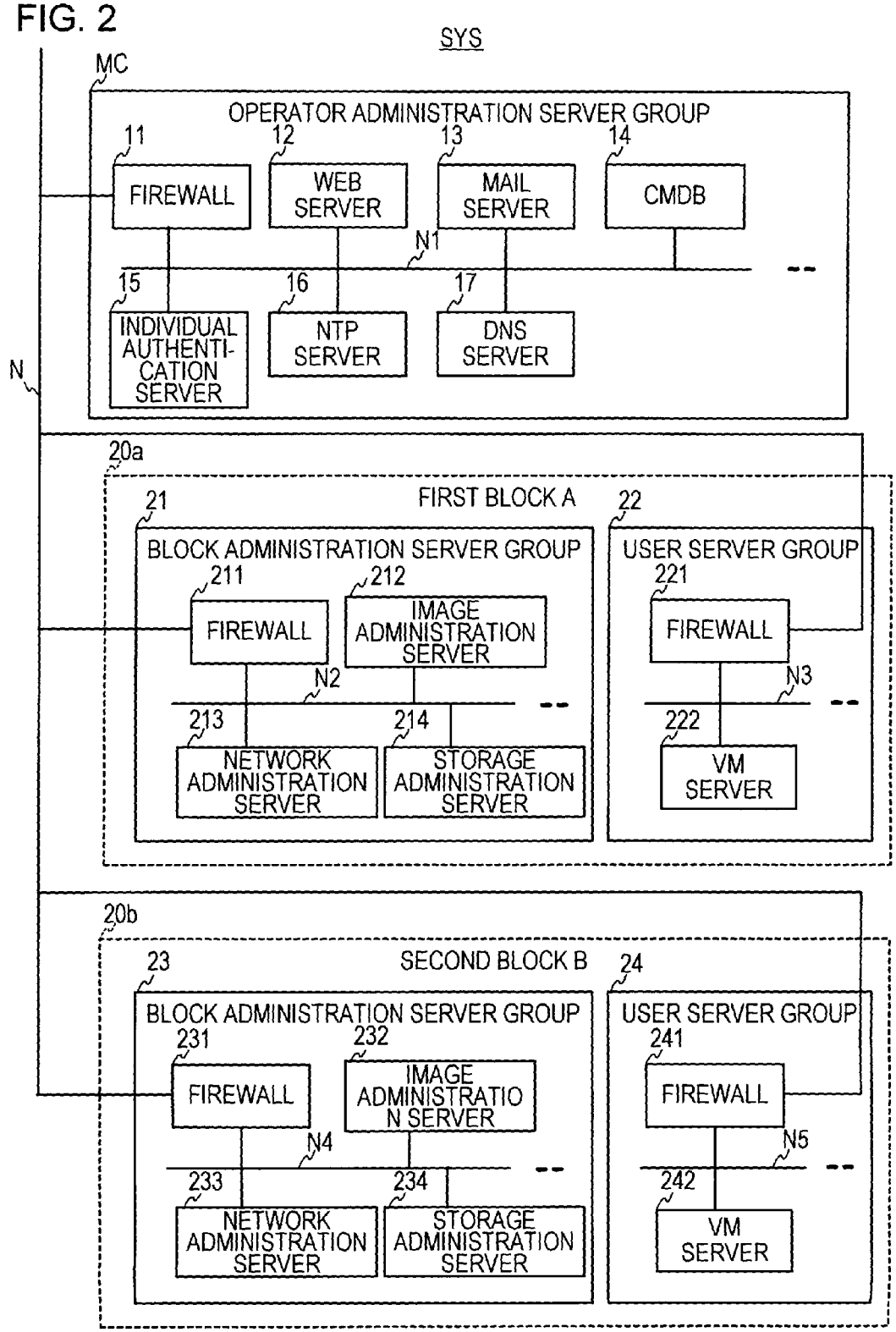
FIG. 2 is a hardware block diagram to explain an operator administration server group, a first block, and a second block in FIG. 1 as one example.

FIG. 2 is a hardware block diagram to describe the operator administration server group MC, the first block A20a, and the second block B20b in FIG. 1, as one example. The operator administration server group MC includes a firewall 11, which is connected to the network N1, a WEB server 12, a mail server 13, a CMDB (Configuration Management Database) 14, an individual authentication server 15, a NTP (Network Time Protocol) server 16, and a DNS (Domain Name System) server 17.

The firewall 11 is a device that includes a so-called firewall function of preventing an unauthorized access to the network N1 in the operator administration server group MC. The WEB server 12 provides HTML (Hyper Text Markup Language) data written in HTML in response to a request from the web browser of a client. The mail server 13 executes the transmission and reception of electronic mail, and for example, functions as a SMTP (Simple Mail Transfer Protocol) server or a POP (Post Office Protocol) server.

The CMDB 14 is a database that collects the constitutional information of constitutional elements constituting the information processing system SYS and administrates the constitutional information to be collected in an integrated way. The constitutional elements, for example, include the hardware components and software components. The hardware components, for example, include servers, which are information processing devices, network devices such as routers and switches, and storage devices such as HDD (Hard Disk Drive). The individual authentication server 15 authenticates users of the cloud system. The NTP server 16 synchronizes with a correct time that each server has. The DNS 17 is a server that administrates the correlation between the domain name of the server in the information processing system SYS and the IP address which is set to the server.

The user server group 22 of the first block A20a includes a firewall 221, which is connected to a network N, and a VM server 222. VM is an abbreviation of virtual machine (VM: Virtual Machine). For the illustrative convenience, in the user server group 22, one firewall 221 and one VM server 222 are respectively illustrated in the diagram. However, the user server group 22 may include a plurality of firewalls 221 and a plurality of VM servers 222. Moreover, the user server group 22 may include the network device and the storage device.

The firewall 221 is a device that includes the so-called firewall function of preventing an unauthorized access to the network N3 in the user server group 22. The VM server 222 virtualizes hardware resources in its own device, and for example, executes VM (virtual machines) that perform various data process in response to the request from the user. Besides, the VM server 222 may execute virtual routers (VR).

The block administration server group 21 includes a firewall 211, an image administration server 212, which is connected to the network N2, a network administration server 213, and a storage administration server 214. The firewall 211 is a device that includes the so-called firewall function of preventing an unauthorized access to the network N2 in the block administration server group 21.

The image administration server 212 administrates the VM image of the virtual machine executed by the VM server 222 of the user server group 22. The image administration server 212, for example, administrates the resource amount of hardware resources that are allotted to each virtual machine executed by the VM server 222 of the user server group 22. The network administration server 213 administrates communication devices in the user server group 22 and various setting information (IP addresses and the like) of the communication devices. For example, the network administration server 213 administrates the IP addresses set in the firewall 211 and the VM server 222 of the user server group 22 and the IP addresses set in the virtual machines executed by the VM server 222.

The storage administration server 214 administrates a storage system (not illustrated) of the user server group 22. For example, the storage administration server 214 administrates the constitutional information on the storage system (not illustrated) allotted to the virtual machines executed by the VM server 222 and the performance information such as storage capacity. Furthermore, it is noted that the block administration server group 21 may include various servers such as a WEB server, a mail server, a CMDB, and a DNS server.

The user server group 24 of the second block B20*b* includes a firewall 241, which is connected to a network N5, and a VM server 242. In the user server group 24, for the illustrative convenience, only one firewall 241 and one VM server 242 are illustrated. However, the user server group 24 may include a plurality of firewalls 241 and a plurality of VM servers 242. Besides, the user server group 24 may include network devices such as routers and switches and storage devices.

The firewall 241 is a device that includes the so-called firewall function of preventing an unauthorized access to the network N5 in the user server group 24. The VM server 242 virtualizes hardware resources in its own device, and for example, executes the virtual machines that perform various data process in response to the request from the user. Besides, the VM server 242 may execute virtual routers (VR: Virtual Router).

The block administration server group 23 includes a firewall 231, which is connected to the network N4, an image administration server 232, a network administration server 233, and a storage administration server 234. The firewall 231 is a device that includes the so-called firewall function of preventing an unauthorized access to the network N4 in the block administration server group 23.

The image administration server 232 administrates the VM images of the virtual machine executed by the VM server 242 of the user server group 24. The image administration server 232, for example, administrates the resource amount of hardware resources that are allotted to each virtual machine executed by the VM server 242 of the user server group 24. The network administration server 233 administrates communication devices in the user server group 24 and various setting information (IP addresses and the like) of the communication devices. For example, the network administration server 233 administrates the IP addresses set in the firewall 241 and the VM server 242 of the user server group 24 and the IP addresses set in the virtual machines executed by the VM server 242.

The storage administration server 234 administrates a storage system (not illustrated) of the user server group 24. For example, the storage administration server 234 administrates the constitutional information on the storage system (not illustrated) allotted to the virtual machines executed by the VM server 242 and the performance information such as storage capacity. Furthermore, it is noted that the block administration server group 23 may include various servers such as the WEB server, the mail server, the CMDB, and the DNS server.

The processing executed by the information processing system SYS in a case where the user utilizes a cloud service will be described based on FIGS. 1 and 2. The cloud service means an information processing service executed by the information processing system SYS. The user operates the user terminal USR in FIG. 1 and accesses to the information processing system SYS. Specifically, for example, the user operates the user terminal USR and transmits a user ID (identifier) and a password to the individual authentication server 15 in FIG. 2, thereby making an authentication request.

The individual authentication server 15 authenticates the user based on the user ID and the password to be transmitted. For example, when the individual authentication server 15 successfully completes the authentication, the image administration server 212 of the block administration server group 21 in FIG. 2 instructs the VM server 222 of the user server group 22 to activate and execute the virtual machine for the user. In response to the instruction, the VM server 222 activates the virtual machine for the user and puts the virtual machine into an operable state. Hereafter, the user accesses to the virtual machine via the user terminal USR, thereby performing various data processing.

Figure 3:
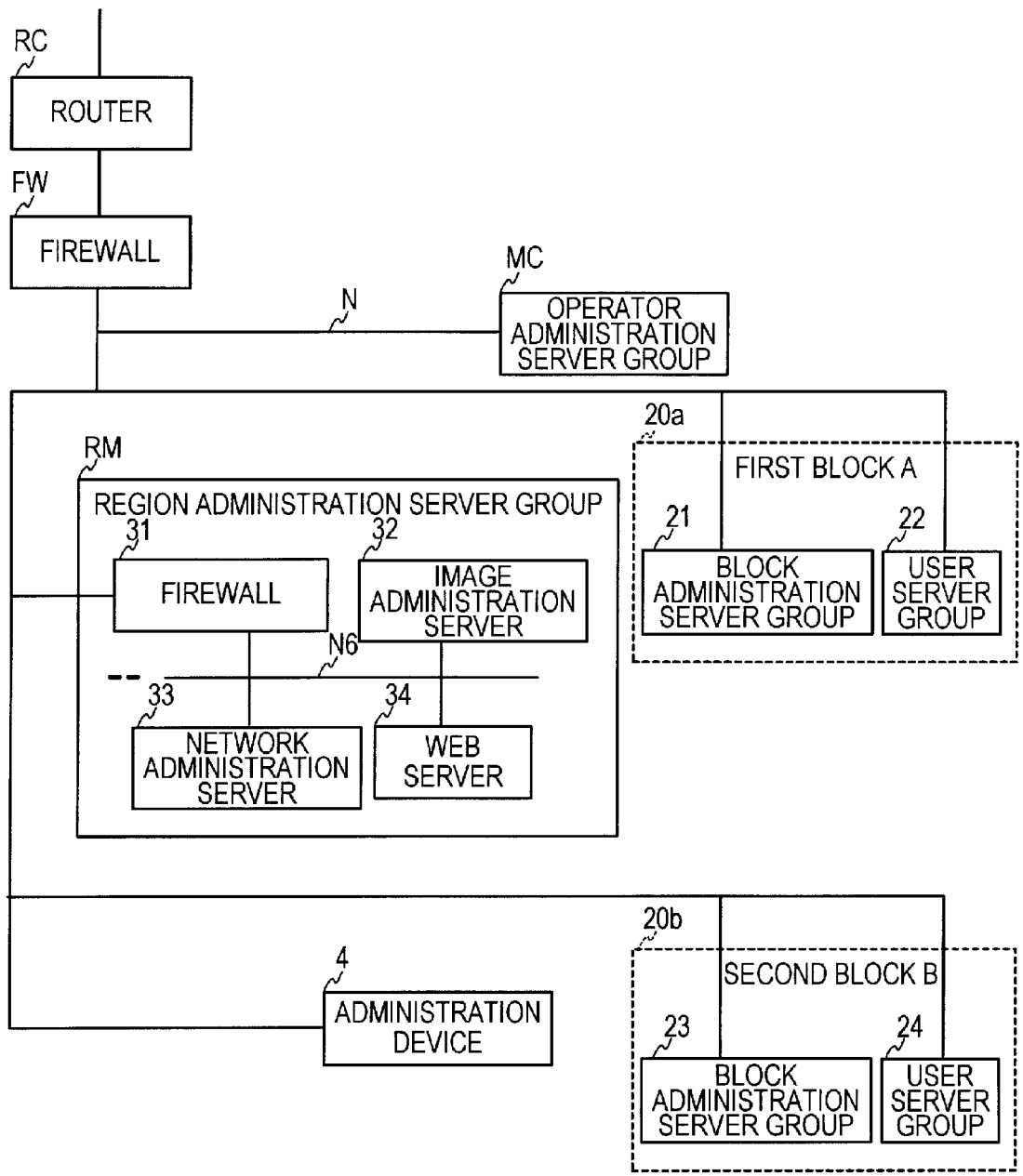
FIG. 3 is a hardware block diagram to explain a region administration server group in FIG. 1 as one example.

The information processing system SYS described in FIGS. 1 and 2 is further described. FIG. 3 is a hardware block diagram to describe the region administration server group RM in FIG. 1 as one example. The region administration server group RM includes a firewall 31, an image administration server 32, a network administration server 33, and a WEB server 34, each of which is connected to a network N6 in the region administration server group RM.

The firewall 31 is a device that includes the so-called firewall function of preventing an unauthorized access to the network N6 in the region administration server group RM. The image administration server 32 is a server that administrates the constitutional information of the virtual machine executed by the image administration server 212 of the block administration server group 21 and the constitutional information of the virtual machine executed by the image administration server 232 of the block administration server group 23. Besides, the image administration server 32 administrates the IP addresses of the image administration server 212 and the IP addresses of the image administration server 232.

The network administration server 33 is a server that administrates the IP addresses of the network administration server 213 of the block administration server group 21 and the IP addresses of the network administration server 233 of the block administration server group 23. The WEB server 34 provides HTML data written in HTML in response to a request from the web browser of a client.

Figure 4:
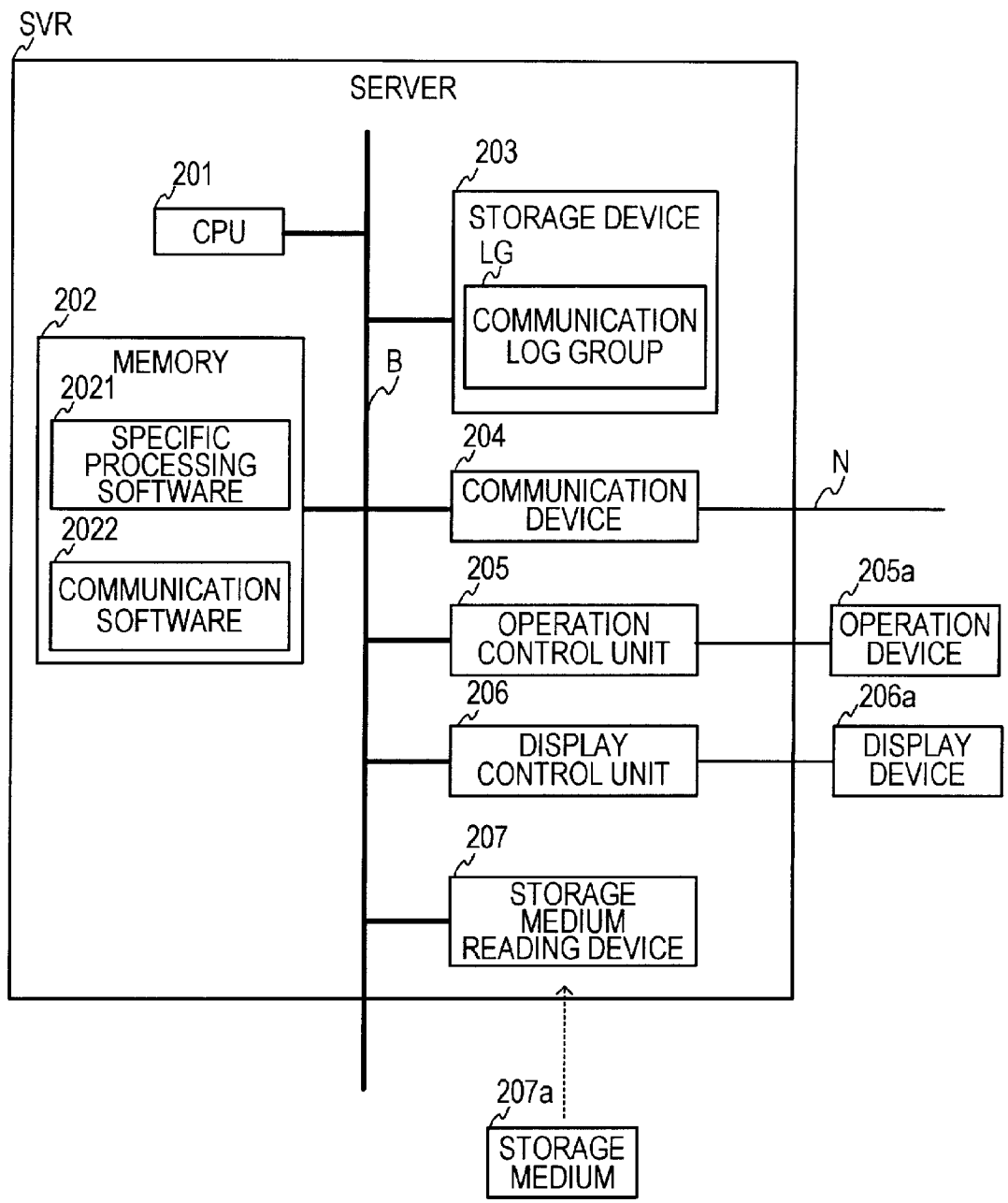
FIG. 4 is a hardware block diagram to explain various hardware components described in FIG. 2 as one example.

FIG. 4 is a hardware block diagram as one example to describe various hardware components described in FIGS. 1 to 3. In FIG. 4, a server is illustrated as one example of various hardware components. Besides, the similar constitution of the server may be applied to the firewalls and switches.

A server SVR is exemplified as a device for data processing and one device included in the device group. For example, the server SVR includes a CPU (Central Processing Unit) 201, a memory 202, a storage device 203, a communication device 204, an operation control unit 205, a display control unit 206, and a storage medium reading device 207, each of which is connected to each other via a bus B.

The CPU 201 is a computer (control unit) to control the entire server SVR. The memory 202 temporarily stores data processed in various information processing executed by the CPU 201 and various programs. The storage device 203, for example, is constructed by a magnetic storage device such as the HDD (Hard Disk Drive) and a non-volatile memory. The storage device 203 stores a variety of communication history described later. Hereinafter, the communication history is appropriately referred to as "communication log", and a plurality of communication logs is appropriately referred to as "communication log group". Then, the communication log group is illustrated by a reference number "LG" in FIG. 4.

The communication device 204, for example, is exemplified by NIC (Network Interface Card), thereby connecting to the network N, and performs network communications with various devices connected to the network N. Although the connection depends on the location where the server SVR is installed, there is a case where the communication device 204 connects to any of the networks N1 to N6.

Upon the reception of the operational instruction inputted from an operation device 205a, the operation control unit 205 executes various processing in response to the operational instruction. The operation device 205a, for example, is a keyboard or a mouse.

The display control unit 206 executes processing of displaying various images on a display device 206a. Herein, various images, for example, include setting images for the IP addresses and the port numbers. The display device 206a, for example, is a liquid crystal display.

The storage medium reading device 207 is a device to read data recorded in a storage medium 207a. The storage medium 207a is exemplified by a portable storage media such as CD-ROM (Compact Disc Read Only Memory), DVD (Digital Versatile Disc), and USB (Universal Serial Bus). It is noted that the later-described programs (referred to as software) may be stored in the storage medium 207a.

The specific processing software 2021 in the memory 202 is a software component to execute specific processing (function). When the server SVR is the DNS server, the specific processing software 2021 executes a so-called DNS function, wherein the correlation between the domain name and the IP address is administrated. When the server SVR is the mail server, the specific processing software 2021 executes a SMTP function and a POP function. Also, when the server SVR is the image administration server, the specific processing software 2021 executes an image administration function.

The communication software 2022, for example, is a software component to execute TCP/IP communications. The specific processing software 2021 executes network communications with software executed by other servers or the virtual machines with the use of communication software 2022. When the network communications are executed, the communication software 2022 records various information with regards to the communications to be executed and stores the various information in the storage device 203 as a communication log. The communication log is used when the administration device 4 automatically detects the setting error of the communication relating information.

For example, a case is assumed where the specific processing software 2021 utilizes the communication software 2022 and communicates with software that operates on other server (not illustrated). It is assumed that the IP address of the server SVR is "x1. y1. z1. w1" and the port number used by the specific processing software 2021 is "p1". Then, It is assumed that the IP address set by other server is "x2. y2. z2. w2" and the port number used by the software operated on the other server is "p2".

When systems are added, the administrator operates the operation device 205a in the server SVR to be added, and sets the aforementioned IP address ("x1. y1. z1. w1") in advance to the server SVR. Further, the administrator operates the operation device 205a in the server SVR and sets the port number ("p2") of a communication counterpart in advance to the specific processing software 2021 as a port number of a transmission destination. The administrator operates the operation device 205a in the server SVR and sets the port number in advance in the specific processing software 2021 in such a manner that the port number "p1" is used by the specific processing software 2021 as a port number of a transmission source. Also, when the other server is added, the administrator sets the aforementioned IP address ("x2. y2. z2. w2") to the other server in advance and sets the port number ("p2") in advance in specific processing software (not illustrated) executed by the other server.

The communication software 2022 creates communication packets in which the IP address of a transmission source is "x1. y1. z1. w1", and the port number of the transmission source is "p1", and the IP address of a transmission destination is "x2. y2. z2. w2", and the port number of the transmission destination is "p2". Then, the communication software 2022 transmits the communication packets (also referred to as "data transmission") inclusive of transmission data (also referred to as "payload") to the other server.

While the communication software 2022 transmits the communication packets, the communication software 2022 simultaneously generates the communication log in which the IP address of the transmission source is "x1. y1. z1. w1", and the port number of the transmission source is "p1", and the IP address of the transmission destination is "x2. y2. z2. w2", and the port number of the transmission destination is "p2", and stores the communication log in the storage device 203. Thus, the communication software 2022 records the specific information that specifies the transmission source and the transmission destination in terms of communications, as the communication log. The communication log is made up of at least data includes the specific information that specifies the transmission source and the transmission destination in terms of communications.

The communication software 2022 establishes the connection with the other server prior to the data transmission. When the connection is successfully established, the communication software 2022 adds "OK" as a state to the communication log. In contrast, when the connection with the other server is not established, the communication software 2022 stores "no response" as a state. Then, in response to the storage of "no response", the communication software 2022 stores the communication log in which the IP address of the transmission source is "x1. y1. z1. w1", and the port number of the transmission source is "p1", and the IP address of the transmission destination is "x2. y2. z2. w2", and the port number of the transmission destination is "p2". Also, the communication software 2022 stores the number of communications.

Subsequently, the administrator sets the IP address of the transmission source in the server of the second block B20b that is currently being configured. And the administrator further sets in advance the port number of the transmission destination, the port number of the transmission source, and the IP address of the transmission destination to the specific processing software operated on this server. However, the setting error often occurs at the time of settings. Accordingly, the administrator needs to perform the operational verification for the second block B20b and correct the setting error based on the verification results. Hereinafter, the administration device 4 that automatically detects the setting error will be described.

[First Embodiment of Administration Device]
(Hardware Block Diagram of Administration Device)

Figure 5:
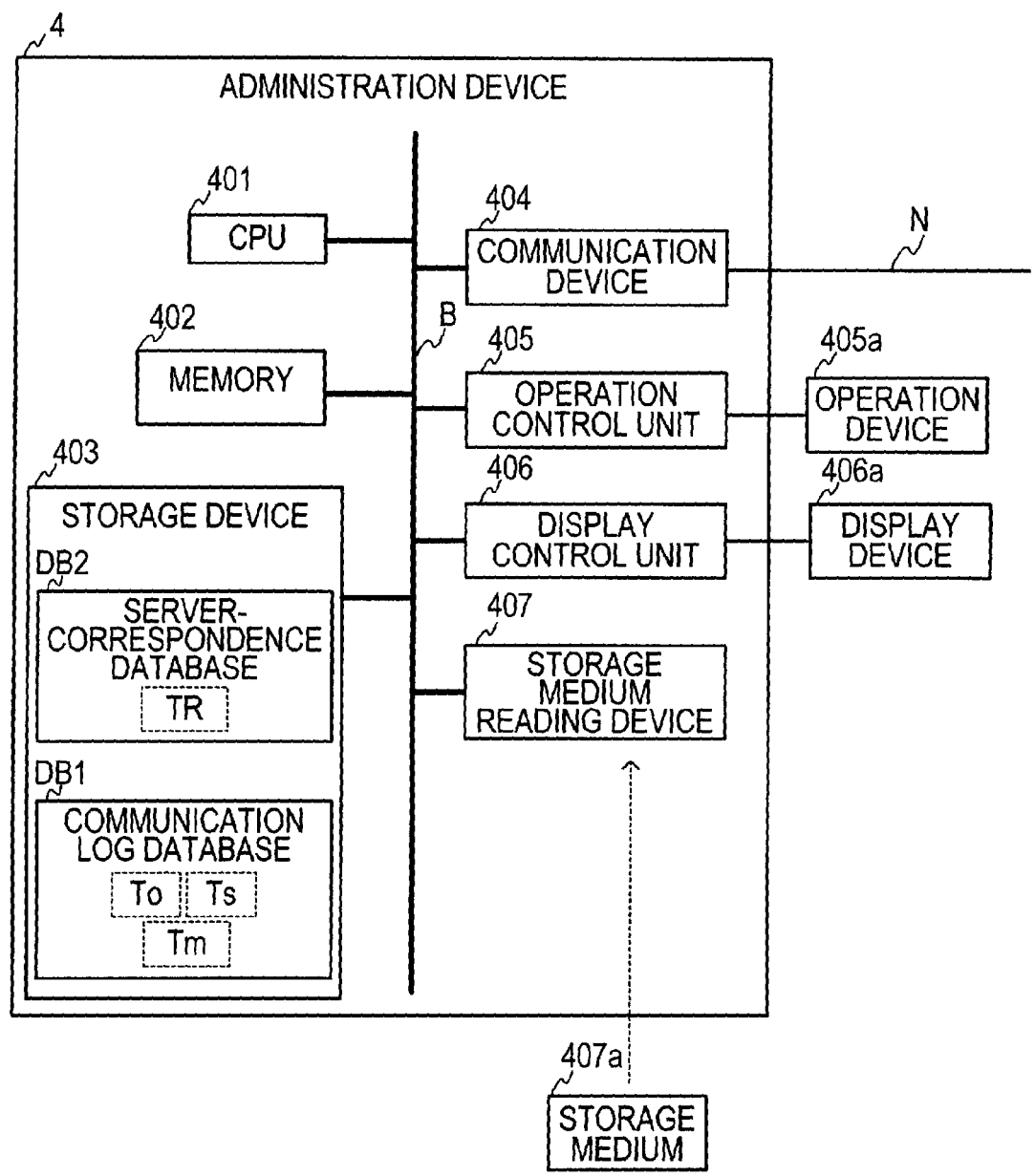
FIG. 5 is a hardware block diagram to explain an administration device in FIG. 1 as one example.

FIG. 5 is a hardware block diagram to describe the administration device 4 in FIG. 1 as one example. The administration device 4, for example, includes a CPU 401, a memory 402, a storage device 403, a communication device 404, an operation control unit 405, a display control unit 406, and a storage medium reading device 407, each of which is connected to each other via the bus B.

The CPU 401 is a computer (control unit) to control the entire administration device 4. The memory 402 temporarily stores data processed in various information processing executed by the CPU 401 and various programs. The storage device 403 is made up of a magnetic storage device such as the Hard Disk Drive and a non-volatile memory. The storage device 403 stores a communication log database DB1 and a server correspondence database DB2 described later.

The communication device 404 is exemplified by Network Interface Card and connected to the network N and communicates with various devices connected to the network N.

Upon the reception of the operational instruction inputted from an operation device 405a, the operation control unit 405 executes various processing in response to the operational instruction. The operation device 405a, for example, is a keyboard or a mouse.

The display control unit 406 executes processing of displaying various images on a display device 406a. Herein, various images, for example, include images including various information which is related to the setting error. The display device 406a, for example, is a liquid crystal display.

The storage medium reading device 407 is a device to read data recorded in a storage medium 407a. The storage medium 407a is exemplified by a portable storage media such as CD-ROM, DVD, and USB. It is noted that programs described in FIG. 9 may be stored in the storage medium 407a.

(Communication Log Database)

FIG. 6 is a first table to describe the communication log database DB1 in FIG. 5. A communication log table T1a is a table that stores the communication log of which the administration device 4 obtains from the first block A20a, as one example. A reference number "To" in FIG. 5 illustrates a state where the communication log database DB1 in FIG. 5 stores the communication log table T1a.

The communication log table T1a includes a transmission-source IP address column, a transmission-source port number column, a transmission-destination IP address column, and a transmission-destination port number column. In the communication log table T1a, each line stores one communication log. The content of each column will be described later.

FIG. 7 is a second table to describe the communication log database DB1 in FIG. 5. A communication log table T1b is a table that stores the communication log of which the administration device 4 obtains from the second block B20b, as one example. A reference number "Ts" in FIG. 5 illustrates a state where the communication log database DB1 in FIG. 5 stores the communication log table T1b.

The communication log table T1b includes the transmission-source IP address column, the transmission-source port number column, the transmission-destination IP address column, the transmission-destination port number column, and a state column. In the communication log table T1b, each line stores one communication log. The content of each column will be described later.

(Server Correspondence Database)

FIG. 8 is a table to describe the server correspondence database DB2 in FIG. 5. A reference number "TR" in FIG. 5 illustrates a state where the server correspondence database DB2 in FIG. 5 stores a server correspondence table TR1. The server correspondence table TR1 includes an IP address column (first block A) and an IP address column (second block B). The IP address column (first block A) stores an IP address set in the server that the first block A20a includes. The IP address column (second block B) stores an IP address set in the server that the second block B20b includes.

The server correspondence table TR1 is one example of relating information respectively related between the devices of the first device group, in which the operational verification has already been completed, and the devices of the second device group which is targeted for the operational verification. The storage device 403 in FIG. 5 stores the relating information. As is described in FIG. 19, an IP address "12. 0. 3. 7." is not stored in the IP address column (second block B) of the server correspondence table TR1.

The first device group, for example, is the first block A20a in FIG. 2. The devices of the first device group, for example, include the servers of the first block A20a, such as the image administration server 212, and the VM server 222. The second device group, for example, is the second block B20b in FIG. 2. The devices of the second device group, for example, include the servers of the second block B20b, such as the image administration server 232, and the VM server 242.

In FIG. 8, each server, whose the IP address stored in the same line in the diagram is set, has the same function. Herein, a server, in which the IP address "192. 168. 1. 23" stored in the IP address column (the first block A) is set, is referred to as "server A". The server A and a server (hereinafter referred to as "server B"), in which the IP address "192. 168. 1. 23" stored in the IP address column (the second block B) is set at the same line as that of the aforementioned IP address ("192. 168. 1. 23") of the server A, are servers having similar functions. For example, when the server A is the DNS server, the server B is similarly the DNS server.

That is, the server correspondence table TR1 includes the IP address, which is set in the devices of the first device group in which operational verification has already been completed, and the IP address, which is set in the devices of the second device group which is targeted for the operational verification. And the devices of the second device group have the same functions as those of the devices of the first device group.

The administrator operates the operation device 405a (see FIG. 5) and produces the server correspondence table TR1 in advance, and stores the server correspondence table TR1 in the server correspondence database DB2 in FIG. 5. It is assumed that the IP address stored in the server correspondence table TR1 is a correct IP address. Incidentally, the method of producing the server correspondence table is not limited, but a manual or automatic (mechanical) method may be applied.

(Block Diagram of Software Module of Administration Device)

Figure 9:
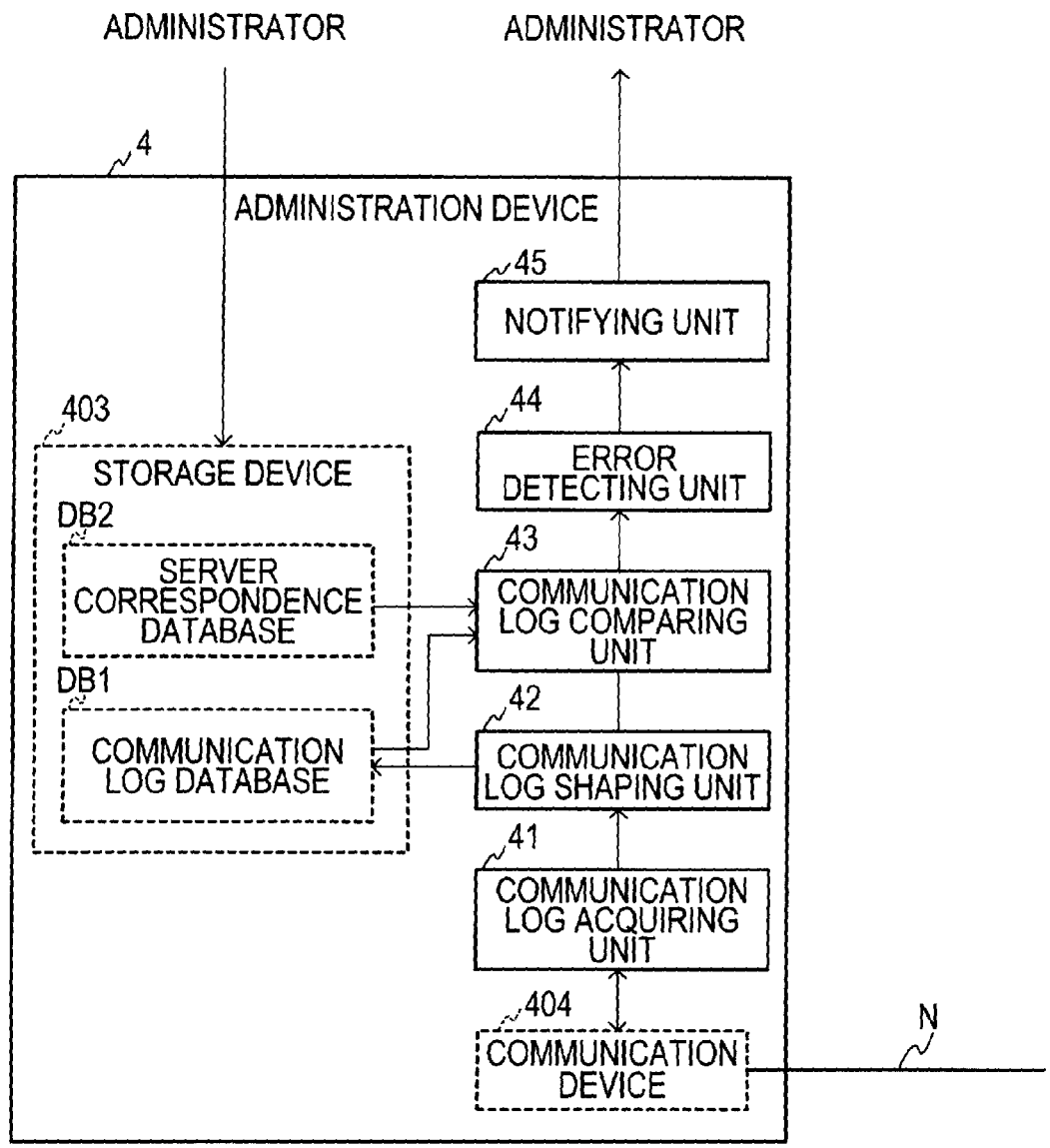
FIG. 9 is a block diagram of a software module of the administration device in FIG. 5.

FIG. 9 is a block diagram of the software module of the administration device 4 in FIG. 5. In the diagram, the storage device 403 and the communication device 404, which are the hardware components in the administration device 4, are illustrated in a dotted line.

The administration device 4 is one example of a device that detects the setting error in the specific information to specify the transmission source and the transmission destination in terms of communications in the information processing system SYS (see FIG. 1) in which the first device group and the second device group are connected to the network. Herein, the specific information includes the IP addresses of the transmission source and the transmission destination and the port numbers of the transmission source and the transmission destination.

In order to detect the aforementioned setting error in the specific information and notify the administrator of the setting error, the administration device 4 includes a communication log acquiring unit 41, a communication log shaping unit 42, a communication log comparing unit 43, an error detecting unit 44, and a notifying unit 45.

The communication log acquiring unit 41 acquires the first communication log of the network communication of the first device group (e.g., the first block A20a), in which operational verification has already been completed. Further, the communication log acquiring unit 41 acquires the second communication log of the network communication of the second device group (for example, the second block B20b), which is targeted for the operational verification. As is described in FIG. 4, the second communication log includes communication state information which represents that the network communication has normally been executed (communication state "OK") or that the network communication has not normally been executed ("no response").

The communication log shaping unit 42 shapes the first and second communication logs acquired by the communication log acquiring unit 41 and stores the communication logs, in order to reduce the amount of storage regarding the communication logs. The communication log comparing unit 43 refers to the server correspondence table TR1 and compares the first specific information of the first communication log with the second specific information of the second communication log corresponding to the first communication log.

The error detecting unit 44 detects the setting error (also referred to as a setting mistake) of the specific information set in the devices (for example, servers) of the second device group based on the comparison results of the aforementioned first specific information and the aforementioned second specific information. The notifying unit 45 notifies the administrator of the setting error detected by the error detecting unit 44 via the display control unit 406 and the display device 406a (see FIG. 5).

The communication log acquiring unit 41, the communication log shaping unit 42, the communication log comparing unit 43, the error detecting unit 44, and the notifying unit 45 are so-called programs. These programs, for example, are stored in the storage device 403. Upon the activation, the CPU 401 in FIG. 5 reads out these programs from the storage device 403 and expands the programs in the memory 402, thereby functioning these programs as a software module.

(Addition of Hardware Components and Operational Verification)

The addition of hardware components will specifically be described based on FIGS. 1, 2 and 4. When the resource request increases due to an increase in the number of users of the information processing system SYS, the administrator, for example, adds the hardware components in unit of the aforementioned partial system.

The aforementioned partial system may be made up of the block administration server group 21 or the block administration server group 23. In this case, the partial system to be added is the block administration server group 23, and the existing partial system is the block administration server group 21.

Regarding the addition of the hardware components in unit of the aforementioned partial system, the administrator equalizes or approximately equalizes the first constitution of the partial system to be added with the second constitution of the existing partial system. The aforementioned first and second constitutions are made up of the hardware components and the software components. The hardware components, for example, include servers, network devices, and storage devices.

When the first and second constitutions are made up of hardware components, the equivalence of the first and second constitutions is represented as follows. That is, the equivalence means that, when the hardware components included in the existing partial system are made up of the first to An-th (An is an integer of two or more) servers, the hardware components included in the partial system to be added are also made up of the first to An-th servers. Also, when the first and second constitutions are made up of hardware components, the approximate equivalence of the first and second constitutions is represented as follows. That is, the approximate equivalence means that, when the hardware components included in the existing partial system are made up of the first to An-th servers, the partial system to be added includes the servers having functions that are equal to the functions of 80 percent of the first to An-th servers.

When the first and second constitutions are made up of software components, the equivalence of the first and second constitutions is represented as follows. That is, the equivalence means that, when the first to Bn-th (Bn is an integer of two or more) software components operate in each server in the existing partial system, the first to Bn-th software components operate in each server in the partial system to be added. Also, when the first and second constitutions are made up of software components, the approximate equivalence of the first and second constitutions is represented as follows. That is, the approximate equivalence means that, when the first to Bn-th software components operate in each server in the existing partial system, the partial system to be added executes software components that are equal to 80 percent of the first to Bn-th software components in each server on its own system. It is noted that the aforementioned 80 percent is a mere, exemplified numerical value.

The reasons that the administrator equalizes or approximately equalizes the first constitution with the second constitution are as follows. For example, the first reason is that the administrator partially customizes various setting information which are set in the hardware components and the software components of the existing partial system, for the purpose of designing the partial system to be added. And the administrator sets the partially-customized setting information to the hardware components and the software components of the partial system to be added. In other words, this is because the administrator utilizes (also referred to as "reuse") the various setting information set in the hardware components and the software components of the existing partial system, for the purpose of designing the partial system to be added. The utilization allows the administrator to reduce the number of processing steps in the operation of adding servers.

Also, the second reason is that the administrator equalizes or approximately equalizes the first constitution with the second constitution, thereby utilizing the experience cultivated through the administration of the existing partial system, for the purpose of administrating the partial system to be added. This utilization allows the administrator to reduce the workload of administrating the partial system to be added When the administrator adds the hardware components and sets various settings for the hardware components to be added or the software components executed by the hardware components, there is a case where the settings regarding the communication association information are erroneously set.

For example, as is described above, when the administrator adds the partial system, the administrator utilizes various setting information set in the hardware components and the software components of the existing partial system, with regards to the partial system to be added. This various setting information means the communication relating information such as the aforementioned IP addresses and port numbers.

Regarding the utilization of the communication relating information, the administrator partially customizes the IP addresses and the port numbers in the communication relating information that has been used for the existing partial system. Then, the administrator sets the IP addresses and the port numbers to be customized, to the hardware components and the software components of the partial system to be added.

For example, there is a case where the administrator sets a different IP address or a different port number to a server having the same function in a different administration server group, in order to correspond to an individual specification defined for each block administration server group. Accordingly, the administrator customizes the IP address or the port number.

In the example in FIG. 2, the administrator customizes the IP address or the port number set in the image administration server 212 of the first block A20a. And the administrator sets the customized IP address or port number to the image administration server 232, which has the same function as that of image administration server 212, of the second block B20b. For example, it is assumed that the administrator sets the IP address "12. 0. 3. 7" in the image administration server 212 of the first block A20a. In this case, the administrator sets an IP address "12. 4. 3. 7", which is a product of the customization of the IP address "12. 0. 3. 7", in the image administration server 232, which has the same function as that of image administration server 212, of the second block B20b.

However, in the processing steps in the operation of adding the partial system, there is a case where the administrator fails to appropriately customize the communication relating information such as the IP addresses, or commits the setting error in the communication relating information due to an inadvertent oversight with regard to the customization of the communication association information. As a result, appropriate data processing is not performed in the partial system to be added (the second block B20b in the example in FIG. 2). Accordingly, the administrator verifies whether the partial system to be added appropriately operates prior to the operation of the partial system to be added and corrects the setting error.

(Operational Verification)

The operational verification of the partial system to be added will be described based on FIGS. 1, 2, and 4. For example, the administrator allows the second block B20b to execute processing which is equivalent to the processing executed by the first block A20a, as the operational verification. The processing executed by the first block A20a includes the activation and execution of the virtual machine for the user and the stoppage of the virtual machine to be activated.

Specifically, the administrator instructs the image administration server 232 of the second block B20b to activate and execute the virtual machine for the operational verification. In response to the instruction, the image administration server 232 transmits a communication packet (hereinafter, merely referred to as "command") including a command for instructing the transmission of the network information that is used to activate and execute the virtual machine for the operational verification, to the network administration server 233. In response to the command, the network administration server 233 transmits the network information to the image administration server 232. Simultaneously, the image administration server 232 transmits a command for instructing the transmission of the storage information that is used to activate and execute the virtual machine for the operations verification, to the storage administration server 234. In response to the command, the storage administration server 234 transmits the storage information to the image administration server 232.

The image administration server 232 transmits virtual machine activation information that is administrated by its own device, the network information and the storage information to be received, along with the virtual machine activation command, to the VM server 242 of the user server group 24. In response to the virtual machine activation command, the VM server 242 activates and executes the virtual machines corresponding to the virtual machine activation information, the network information, and the storage information to be received. The administrator allows the virtual machines, which are activated and executed by the VM server 242, to execute various information process, and verifies whether operations are appropriately performed.

Upon the completion of the verification, the administrator instructs the image administration server 232 of the second block B20b to stop the virtual machine for the operational verification. In response to the instruction, the image administration server 232 transmits a command that is used to stop the virtual machine for the operational verification, to the VM server 242. In response to the command, the VM server 242 stops the virtual machines that have been executed. Upon the transmission and reception of the commands between the aforementioned servers, each server produces the communication log and stores the communication log in its own device.

When correct communication relating information is set in the hardware components and the software components of the second block B20b, the communications between the servers are appropriately performed in the course of the verification. In contrast, when correct communication relating information is not set in the hardware components and the software components of the second block B20b, the communications between the servers is not appropriately performed.

For example, a case is assumed where the software components (specific processing software) of the image administration server 232 communicates with the network administration server 233. In this case, when the partial system is added to the second block B20b, the administrator needs to correctly set the communication relating information for the network administration server 233 of the transmission destination, in the software components of the image administration server 232. The aforementioned communication relating information, for example, includes the IP address of the network administration server 233 of the transmission destination, and the port number for services executed by the network administration server 233. When correct communication relating information is not set in the image administration server 232, the image administration server 232 is unable to execute communications with the network administration server 233. As a result, the activation and execution of the aforementioned virtual machine are not carried out, which ends in failure in the operational verification of the second block B20b. When the verification of operations fails, the administrator analyzes the cause of the failure in the operational verification.

The hardware components and the software components that are included in the second block B20b targeted for the operational verification are equal or approximately equal to the hardware components and the software components that are included in the first block A20a in which the operational verification has already been executed and its operation is appropriately performed. Also, the administrator partially customizes the communication relating information set in the server of the first block A20a and sets the partially-customized communication relating information in the server of the second block B20b.

Herein, when the second block B20b executes the processing that is equivalent to the processing executed by the first block A20a, as the operational verification, it is assumed that communication processing is appropriately operated in the second block B20b targeted for the operational verification. On this presumption, it can be assumed that there is a high probability that a communication log that corresponds or approximately corresponds to the communication log existed in the first block A20a, in which the operational verification has already been completed, exists in the second block B20b targeted for the operational verification.

In this time, according to study of the inventors, there is a high probability that there occurs a setting error in the communication relating information related to the communication log that only exists in the first device group (for example, the first block A20a) in which the operational verification has already been completed.

Furthermore, according to the study of the inventors, even when there is a communication log that corresponds to the communication log which exist in the first device group, in which the operational verification has already been completed, among the communication logs which exist in the second device group (for example, the second block B20b) which targeted for the operational verification, there is a high probability that there occurs the setting error in the communication relating information which is related to this communication log. The reason for this is that there is a case where the communication processing successfully performed by an accident, which is described later.

Furthermore, there is a case where a communication log indicating the communication failure (communication state information is "no response") is recorded in the communication logs existed in the second block B20b targeted for the operational verification. Similarly regarding to this communication log, there is a high probability that there occurs the setting error in the communication relating information associated with this communication log. Hereinafter, the communication log, in which there is a high probability that there occurs the setting error in the communication relating information, is appropriately referred to as a communication log of a setting error candidate.

Therefore, the administration device 4 compares the communication log, existed in the first device group in which the operational verification has already been completed, with the communication log, existed in the second device group targeted for the operational verification, in the course of the operational verification. Subsequently, the administration device 4 detects the communication log of the setting error candidate based on the comparison results. The administration device 4 determines that there occurs the setting error in the communication relating information related to the communication log of the setting error candidate to be detected and notifies the administrator to the effect that there occurs the setting error. Hereinafter, the comparison of the communication logs and the detection and notification of the setting error, each of which is executed by the administration device 4, will be described in detail.

(Acquisition Processing and Merging processing of Communication Log)

The communication log acquiring unit 41 of the administration device 4 in FIG. 9 acquires the communication log of the first device group in which the operational verification has already been completed, prior to the operational verification, and the communication log shaping unit 42 appropriately shapes (also referred to as "merge") the communication log to be acquired. Then, in the operational verification, the communication log acquiring unit 41 acquires the communication log of the second device group targeted for the operational verification, and the communication log shaping unit 42 appropriately merges the communication log to be acquired.

Figure 10:
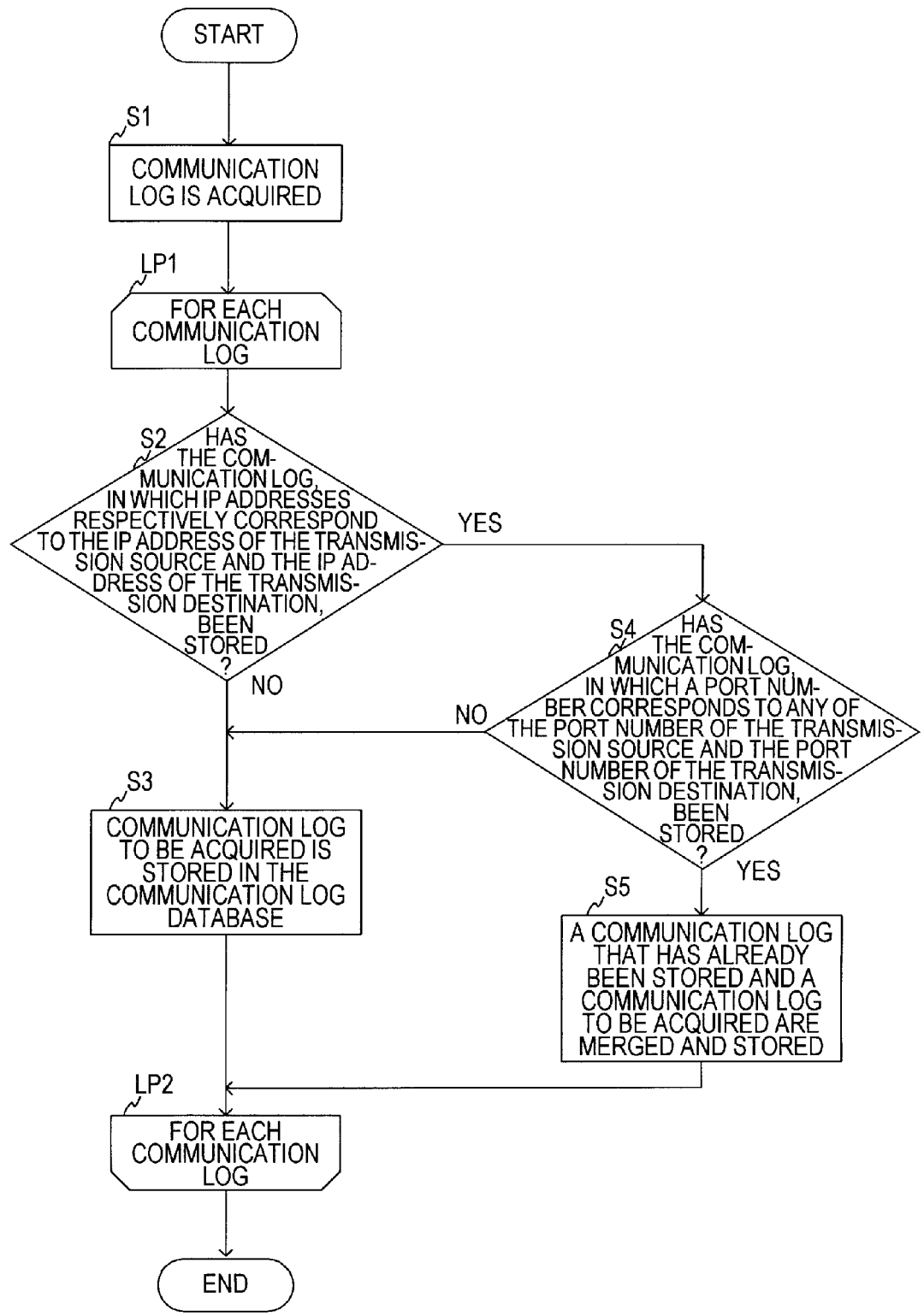
FIG. 10 is a flowchart to explain the flow of acquisition processing and merging processing of communication logs.

FIG. 10 is a flowchart to describe the flow of the acquisition processing of communication logs and the merging processing of the communication logs by the administration device in FIG. 9. The flow of processing executed by the communication log acquiring unit 41 and the communication log shaping unit 42 in FIG. 9 will be described referring to FIG. 10.

Step S1: the communication log acquiring unit 41 acquires the communication log of the first device group in which the operational verification has already been completed, or acquires the communication log of the second device group targeted for the operational verification. That is, the communication log acquiring unit 41 acquires the communication log of the first block A20a in which the operational verification has already been completed, or the communication log of the second block B20b targeted for the operational verification. The communication log acquiring unit 41 outputs the communication log to be acquired to the communication log shaping unit 42. The communication log acquiring unit 41 acquires the communication log that has not been acquired yet, from the communication log group (see the reference number "LG" in FIG. 4) in the storage device of the server included in the first block A20a, in which the operational verification has already been completed, prior to the operational verification for the second block B20b. Also, at the time of the operational verification, the communication log acquiring unit 41 acquires the communication log that has not been acquired yet, from the communication log group (see the reference number "LG" in FIG. 4) stored in the storage device of the server included in the second block B20b targeted for the operational verification.

Step S2: the communication log shaping unit 42 determines whether a communication log, in which IP addresses respectively correspond to the IP address of the transmission source and IP address of the transmission destination in the communication log to be acquired, has already been stored in the communication log database DB1.

Specifically, when the communication log acquiring unit 41 acquires the communication log of the first block A20a in which the operational verification has already been completed, the communication log shaping unit 42 determines whether a communication log, in which the IP addresses respectively correspond to the IP addresses of the transmission source and IP address of the transmission destination in the communication log to be acquired, has already been stored in the communication log table T1a. In contrast, when the communication log acquiring unit 41 acquires the communication log of the second block B20b targeted for the operational verification, the communication log shaping unit 42 determines whether a communication log, in which the IP addresses respectively correspond to the IP addresses of the transmission source and IP address of the transmission destination in the communication log to be acquired, has already been stored in the communication log table T1b.

When the communication log shaping unit 42 determines that the communication log, in which the IP addresses respectively correspond to the IP address of the transmission source and IP address of the transmission destination in the communication log to be acquired, has not already been stored in the communication log database DB1 (Step S2, NO), the process proceeds to Step S3.

Step S3: the communication log shaping unit 42 stores the communication log acquired by the communication log acquiring unit 41 in the communication log database DB1. Specifically, when the communication log acquiring unit 41 acquires the communication log of the first block A20a in which the operational verification has already been completed, the communication log shaping unit 42 stores the IP address of the transmission source, the IP address of the transmission destination, the port number of the transmission source, and the port number of the transmission destination in the communication log to be acquired, in the communication log table T1a.

In contrast, at the Step S2, when the communication log shaping unit 42 determines that a communication log, in which the IP addresses respectively correspond to the IP address of the transmission source and IP address of the transmission destination in the communication log acquired by the communication log acquiring unit 41, has already been stored in the communication log database DB1 (Step S2, YES), the process proceeds to Step S4.

Step S4: the communication log shaping unit 42 determines whether a communication log, in which a port number corresponds to any of the port number of the transmission source and the port number of the transmission destination in the communication log acquired by the communication log acquiring unit 41, has already been stored in the communication log database DB1. Specifically, when the communication log acquiring unit 41 acquires the communication log of the first block A20a, the communication log shaping unit 42 determines whether a communication log, in which a port number corresponds to any of the port number of a transmission source and the port number of a transmission destination in the communication log to be acquired, has already been stored in the communication log table T1a in FIG. 6. In contrast, when the communication log acquiring unit 41 acquires the communication log of the second block B20b, the communication log shaping unit 42 determines whether a communication log, in which a port number corresponds to any of the port number of a transmission source and the port number of a transmission destination in the communication log to be acquired, has already been stored in the communication log table T1b in FIG. 7.

At the Step S4, when the communication log shaping unit 42 determines that the communication log, in which the port number corresponds to any of the port number of the transmission source and the port number of the transmission destination in the communication log acquired by the communication log acquiring unit 41, has already been stored in the communication log database DB1 (Step S4, YES), the process proceeds to Step S5. Hereinafter, in the communication logs that have already been stored in the communication log database DB1, the communication log, of which the IP addresses respectively correspond to the IP addresses of the transmission source and the transmission destination in the communication log acquired by the communication log acquiring unit 41 and the port number corresponds to any of the port number of the transmission source and the port number of the transmission destination in the communication log acquired by the communication log acquiring unit 41, is appropriately referred to as a merging source communication log.

Step S5: the communication log shaping unit 42 merges the merging source communication log, which has already been stored in the communication log database DB1, with the communication log acquired by the communication log acquiring unit 41. The merging of the two communication logs at the Step S5 will specifically be described in FIG. 19.

At the Step S4, when the communication log shaping unit 42 determines that the communication log, in which the port number corresponds to any of the port number of the transmission source and the port number of the transmission destination in the communication log acquired by the communication log acquiring unit 41, has not been stored in the communication log database DB1 (Step S4, NO), the process proceeds to Step S3.

When the communication log shaping unit 42 acquires a plurality of communication logs at the Step S1, as is illustrated at the loops LP1 and LP2, the communication log shaping unit 42 executes the processing at the Steps S1 to S5 with respect to each communication log acquired by the communication log acquiring unit 41.

Figure 11:
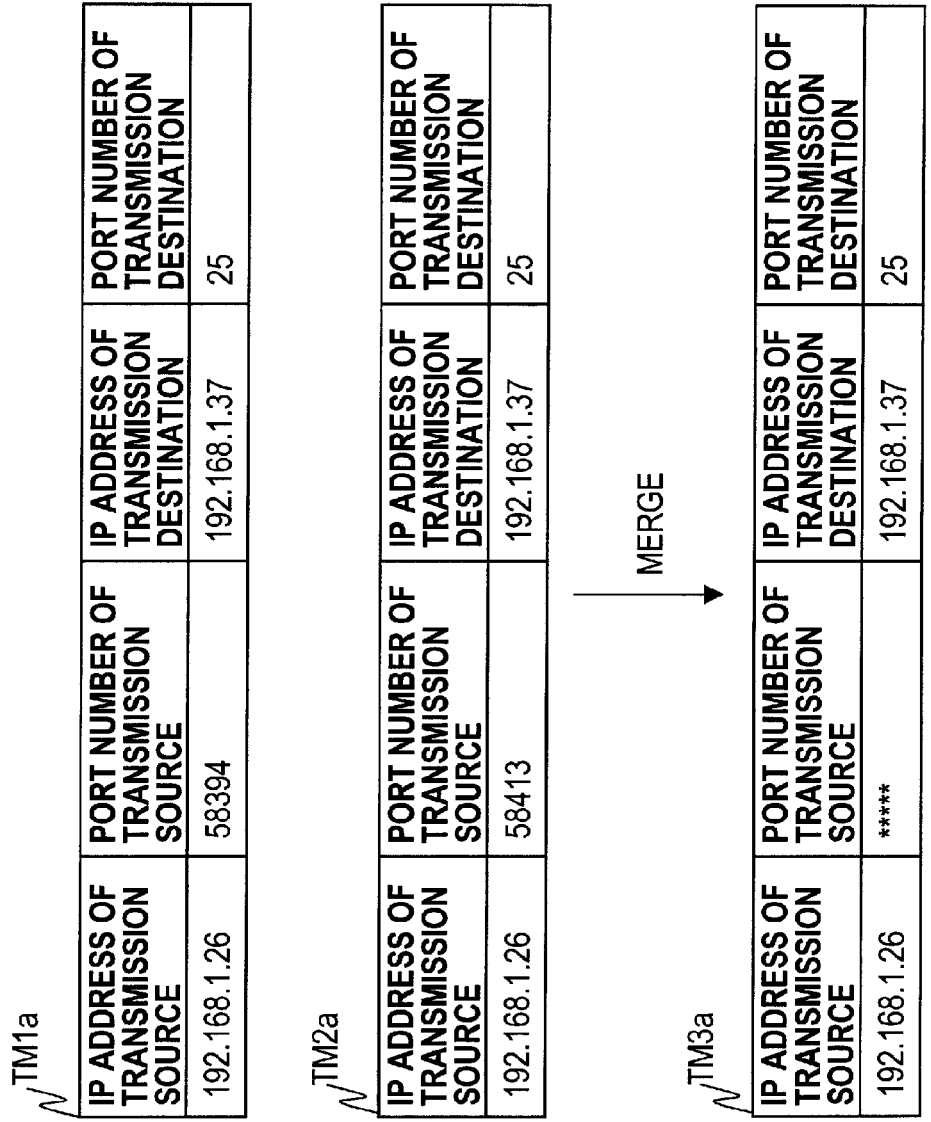
FIG. 11 is a diagram to explain the acquisition processing and the merging processing of the communication logs.

FIG. 11 is a diagram to describe the acquisition processing and the merging processing of the communication logs. In FIG. 11, a communication log TM1a is the communication log of the first block A20a, which is acquired by the communication log acquiring unit 41. A communication log TM2a is the communication log of the first block A20a, which is acquired by the communication log acquiring unit 41 after the acquisition of the communication log TM1a. The communication logs TM1a and TM2a are represented in a table format. Further, in FIG. 11, a merge communication log TM3a is a diagram illustrating a state where the communication logs TM1a and TM2a are merged by the communication log shaping unit 42, in a table format.

The flow of the processing in FIG. 10 will specifically be described referring to FIGS. 6, 10, and 11. The communication log acquiring unit 41, for example, acquires the first and second communication logs from a certain server (for example, the image administration server 212) in the block administration server group 21 of the first block A20a (Step S1 in FIG. 10).

The first communication log, for example, is the communication log TM1a in FIG. 11. The communication log TM1a is a communication log that includes the IP address "192. 168. 1. 26" of the transmission source, the port number "58394" of the transmission source, the IP address "192. 168. 1. 37" of the transmission destination, and the port number "25" of the transmission destination. The second communication log, for example, is the communication log TM2a in FIG. 11. The communication log TM2a is a communication log that includes the IP address "192. 168. 1. 26" of the transmission source, the port number "58413" of the transmission source, the IP address "192. 168. 1. 37" of the transmission destination, and the port number "25" of the transmission destination.

Herein, when the communication log, in which the IP addresses respectively correspond to the IP address "192. 168. 1. 26" of the transmission source, and the IP address "192. 168. 1. 37" of the transmission destination in the communication log TM1a, has not been stored in the communication log table T1a of the communication log database DB1 in FIG. 9 (Step S2, NO), the communication log shaping unit 42 executes the following processing. That is, as is illustrated in the communication log TM1a in FIG. 11, the communication log shaping unit 42 stores the communication log TM1a in the communication log table T1a of the communication log database DB1 (Step S3).

Subsequently, the processing returns from the loop LP2 to the loop LP1 and proceeds to the Step S2. At the Step S2, when the communication log shaping unit 42 determines that the communication log, in which the IP addresses respectively correspond to the IP address of the transmission source and the IP address of the transmission destination in the communication log TM2a, has already been stored in the communication log database DB1 (Step S2, YES), the processing proceeds to the Step S4. In this case, the communication log TM1a is the merging source communication log.

The reason for "YES" determined at the Step S2 is given in that the IP address ("192. 168. 1. 26") of the transmission source and the IP address ("192. 168. 1. 37") of the transmission destination are respectively corresponded in the communication log TM2a and the communication log TM1a, and further, the communication log TM1a has been stored in the communication log database DB1.

At the Step S4, when the communication log shaping unit 42 determines that the communication log, in which the port number corresponds to any of the port number of the transmission source and the port number of the transmission destination in the communication log TM2a, has already been stored in the communication log database DB1 (Step S4, YES), the process proceeds to the Step S5. The reason for "YES" determined at the Step S4 is given in that the port number ("25") of the transmission destination in the communication log TM1a corresponds to the port number of the transmission destination in the communication log TM2a.

The communication log shaping unit 42 merges the communication log TM1a, which has already been stored in the communication log database DB1, with the communication log TM2a (Step S5). At the Step S5, the communication log shaping unit 42 merges the port number "58394" of the transmission source in the communication log TM1a with the port number "58413" of the transmission source in the communication log TM2a. The merged state is represented in the merge communication log TM3a in FIG. 11. Herein "*****" in the transmission-source port number column in the merge communication log TM3a schematically illustrates a state where the port numbers are merged. Then, as is illustrated at the highest tier on the communication log table T1a in FIG. 6, the communication log shaping unit 42 stores the port numbers to be merged in the communication log database DB1.

The merging at the Step S5 means that both communication logs that meet the conditions (Step S2, Step S4, YES) described in the Step S2 and the Step S4 in FIG. 10 are integrated en masse, as one communication log.

Specifically, with regards to the merging at Step S5, when the port number of the transmission source of the merging source communication log corresponds to the port number of the transmission source of the communication log to be acquired, the port number of the transmission source of the merging source communication log is converted into arbitrary character strings (for example, "*****"). Also, with regards to the merging, when the port number of the transmission destination of the merging source communication log corresponds to the port number of the transmission destination of the communication log to be acquired, the port number of the transmission destination of the merging source communication log is converted into arbitrary character strings. In place of these character strings, the port number of the transmission destination of the merging source communication log may be converted into arbitrary numerical values (for example, 0xFFFFFF (hexadecimal number)).

As is described in FIGS. 10 and 11, when the following conditions are satisfied, the communication log shaping unit 42 integrates two first communication logs (communication logs of the first block A20a) into one first communication log and stores the one first communication log in the storage device 24. That is, the conditions mean that the IP addresses of the transmission source and the transmission destination included in the two first communication logs respectively correspond to each other, and further that the port numbers of the transmission source and the transmission destination included in the two first communication logs respectively correspond to each other.

Also, as is described in FIGS. 10 and 11, when the following conditions are satisfied, the communication log shaping unit 42 integrates two second communication logs (communication logs of the second block B20b) into one second communication log and stores the one second communication log in the storage device 24. That is, the conditions mean that the IP addresses of the transmission source and the transmission destination included in the two second communication logs respectively correspond to each other, and further that the port numbers of the transmission source and the transmission destination included in the two second communication logs respectively correspond to each other.

Hereinafter, the reason for the merging of the communication logs will be described. The reason for this is given in that the amount of communication logs stored in the database needs to be reduced. For example, it is assumed that the first and second software components executed by a certain server request the third software component executed by other server to perform data processing (also referred to as "service"). Herein, the third software component is a software component that executes the transfer processing of electronic mail based on SMTP and communicates with the first and second software components.

The first software component, for example, utilizes the port number "58394" of the transmission source and the port number "25" of the transmission destination, thereby requesting the third software component to transfer the electronic mail. Also, the second software component, for example, utilizes the port number "58413" of the transmission source and the port number "25" of the transmission destination, thereby requesting the third software component to transfer the electronic mail.

At the time of communication processing, because the software component which requests a service utilizes a specific port number ("25" in the aforementioned example) and waits for the request for services, the port number of the transmission destination is fixed. In contrast, the software components that request the services are normally made up of a plurality of software components, and the port numbers utilized by the plurality of software components are different. Even when the same software components request the service, there is a case where a different port number is utilized every time the service is requested. In other words, the port numbers of the transmission source are frequently changed.

Further, there is a case where the software component which requests a service transmits the response message to the different software components that request the service. It is noted that the response message is also recorded as a communication log. Thus, when the software components that request the service transmits the response message to the different software components for which the service is requested, the port numbers of the transmission source are identical, but the port numbers of the transmission destination are respectively different.

Thus, there occurs the communication processing wherein unspecific port numbers are utilized as the port numbers of the transmission source, and specific port numbers are utilized as the port numbers of the transmission destination. Also, there is a case where there occurs the communication processing wherein specific port numbers are utilized as the port numbers of the transmission source, and unspecific port numbers are utilized as the port numbers of the transmission destination. Accordingly, regarding the merging of the communication logs, in a state where the unspecific port numbers are merged, the communication logs are stored in the communication log database DB1. This merging allows the amount of data for the communication logs stored in the communication log database DB1 to be reduced. Also, as for the later-described comparison of the communication logs, it is possible to rapidly execute the comparison process.

Subsequently, the communication log comparing unit 43 executes the comparison of the communication logs, and the error detecting unit 44 executes the detection of setting errors related to communications.

(Conversion of IP Addresses of Communication Log)

The communication log comparing unit 43 executes the conversion of IP addresses of the communication logs based on the server correspondence table TR1 in FIG. 8, in order to execute the detection of setting errors with high accuracy, prior to the detection of setting errors associated with communications.

As described above, the server correspondence table TR1 stores the IP addresses which are set in the devices of the first device group, in which the operational verification has already been completed, and the IP addresses which are set in the devices of the second device group which has same function as that of the devices of the first device group and which is a target of the operational verification.

In the operation verification, the communication log comparing unit 43 compares the first communication log which exists in the first device group, in which the operational verification has already been completed, with the second communication log which exists in the second device group which is a target of the operational verification, and determines whether both of the first and second communication logs have same content. The communication log comparing unit 43 compares the IP address included in the first communication log with the IP address included in the second communication log and determines whether both of IP address is matched in a front portion of the comparison.

When the IP address which is set in the first device group, in which the operational verification has already been completed, corresponds with the IP address which is set in the devices of the second device group, which has same function as that of the devices of the first device group and which is a target of the operational verification, one by one when determining whether first and second communication logs is matched, it is possible to execute the determination with a high accuracy. The meaning that the IP address which is set in the first device group, in which the operational verification has already been completed, corresponds with the IP address which is set in the devices of the second device group, which is a target of the operational verification, one by one, is that both of IP addresses just match each other.

However, as described above, the administrator sets the customized various set information (for example, IP address) to the devices in the second device group which is a target of the operation verification. That is, there is a case that the IP address which is set in the first device group, in which the operational verification has already been completed, does not match to the IP address which is set in the devices of the second device group, which has same function as that of the devices of the first device group and which is a target of the operational verification.

Accordingly, the communication log comparing unit 43 executes a conversion process of the IP address so that the IP address which is set in the first device group, in which the operational verification has already been completed, matches to the IP address which is set in the devices of the second device group, which has same function as that of the devices of the first device group and which is a target of the operational verification, as described below.

That is, the communication log comparing unit 43 converts the IP addresses of the transmission source and the transmission destination in the first communication log into the IP addresses that are set in the devices of the second device group targeted for the operational verification, corresponding to the IP addresses of the transmission source and the transmission destination, based on the server correspondence table TR1. The conversion processing will specifically be described referring to FIG. 12. The communication log comparing unit 43 may convert the IP addresses of the transmission source and the transmission destination in the second communication log into the IP addresses that are set in the devices of the first device group in which the operational verification has already been completed, corresponding to the IP addresses of the transmission source and the transmission destination, based on the server correspondence table TR1.

FIG. 12 is a table to describe the conversion processing of the communication logs. The conversion processing of the communication logs will be described referring to FIGS. 6, 8, and 12. Firstly, the communication log comparing unit 43 reproduces copies of the communication log table in FIG. 6 and produces a correspondence presence column in which a flag is stored, on the right side of the transmission-destination port number column. A table including the correspondence presence column is illustrated as a master communication log table T1m in FIG. 12. A reference number Tm in FIG. 5 illustrates a state where the communication log database DB1 in FIG. 5 stores the master communication log table T1m in FIG. 12.

Subsequently, the communication log comparing unit 43 selects an IP address to be converted one by one on the diagram from the IP addresses of the transmission source, which are stored in the transmission-source IP address column of the master communication log table T1m in FIG. 12. The communication log comparing unit 43 searches an IP address that corresponds to the selected IP address, from the IP addresses which are stored in the IP address (first block A) column of the server correspondence table TR1 in FIG. 8.

Then, the communication log comparing unit 43 specifies an IP address on the same line as that of the IP address to be searched, from the IP addresses which are stored in the IP address (second block B) column of the server-accessible table TR1 in FIG. 8. That is, the communication log comparing unit 43 specifies the IP addresses in the IP address (second block B) column, corresponding to the IP address to be searched. Then, the communication log comparing unit 43 converts the IP address selected in the master communication log table T1m in FIG. 12 into the IP address to be specified. The communication log comparing unit 43 executes the conversion of the IP addresses in the transmission-source IP address column of the master communication log table T1m in FIG. 12, for example, in such a manner that the IP address "12. 0. 3. 6" is converted into the IP address "12. 4. 3. 6".

The communication log comparing unit 43 executes the selection processing, the search processing, the specifying processing, and the conversion processing of the aforementioned IP addresses with respect to all the IP addresses of the transmission sources stored in the transmission-source IP address column. When the IP address to be selected and the IP address to be specified are identical, the communication log comparing unit 43 does not have to execute the aforementioned conversion.

Further, the communication log comparing unit 43 selects an IP address to be converted one by one on the diagram from the IP addresses of the transmission destination, which are stored in the transmission-destination IP address column of the master communication log table T1*m* in FIG. 12. The communication log comparing unit 43 searches an IP address that corresponds to the selected IP address, from the IP addresses which are stored in the IP address (first block A) column of the server correspondence table TR1 in FIG. 8. Then, the communication log comparing unit 43 specifies an IP address on the same line as that of the IP address to be searched, from the IP addresses which are stored in the IP address (second block B) column of the server correspondence table TR1 in FIG. 8. Then, the communication log comparing unit 43 converts the IP address selected in the master communication log table T1*m* in FIG. 12 into the IP address to be specified. The communication log comparing unit 43 executes the conversion of the IP addresses in the transmission-destination IP address column of the master communication log table T1*m* in FIG. 12, for example, in such a manner that the IP address "12. 0. 0. 5" is converted into the IP address "12. 4. 0. 5", and the IP address "12. 4. 3. 7" is converted into the IP address "12. 0. 3. 7".

The communication log comparing unit 43 executes the selection processing, the search processing, the specifying processing, and the conversion processing of the aforementioned IP addresses with respect to all the IP addresses of the transmission destinations stored in the transmission-destination IP address column. "Presence" of the flag stored in the correspondence presence column in FIG. 12 will be described in FIGS. 16 and 17. It is noted that the communication log comparing unit 43 does not have to execute the aforementioned conversion, in order to restrain an increase in processing load due to conversion processing.

(Addition of Correspondence Presence Column)

FIG. 13 is a diagram to describe a communication log table wherein the correspondence presence column is added to the communication log table T1*b* in FIG. 7. The communication log comparing unit 43 produces the correspondence presence column in which a flag is stored, on the right side of the state column of the communication log table T1*b* in FIG. 7. A table including the correspondence presence column is illustrated as a communication log table T11*b* in FIG. 13. Herein, "presence" of the flag is not stored at the time of producing the correspondence presence column. "Presence" of the flag stored in the correspondence presence column in FIG. 12 will be described in FIGS. 16 and 17. A reference number Ts in FIG. 5 illustrates a state where the communication log database DB1 in FIG. 5 stores the communication log table T11*b*.

(Detection Processing for Setting Error)

Figure 14:
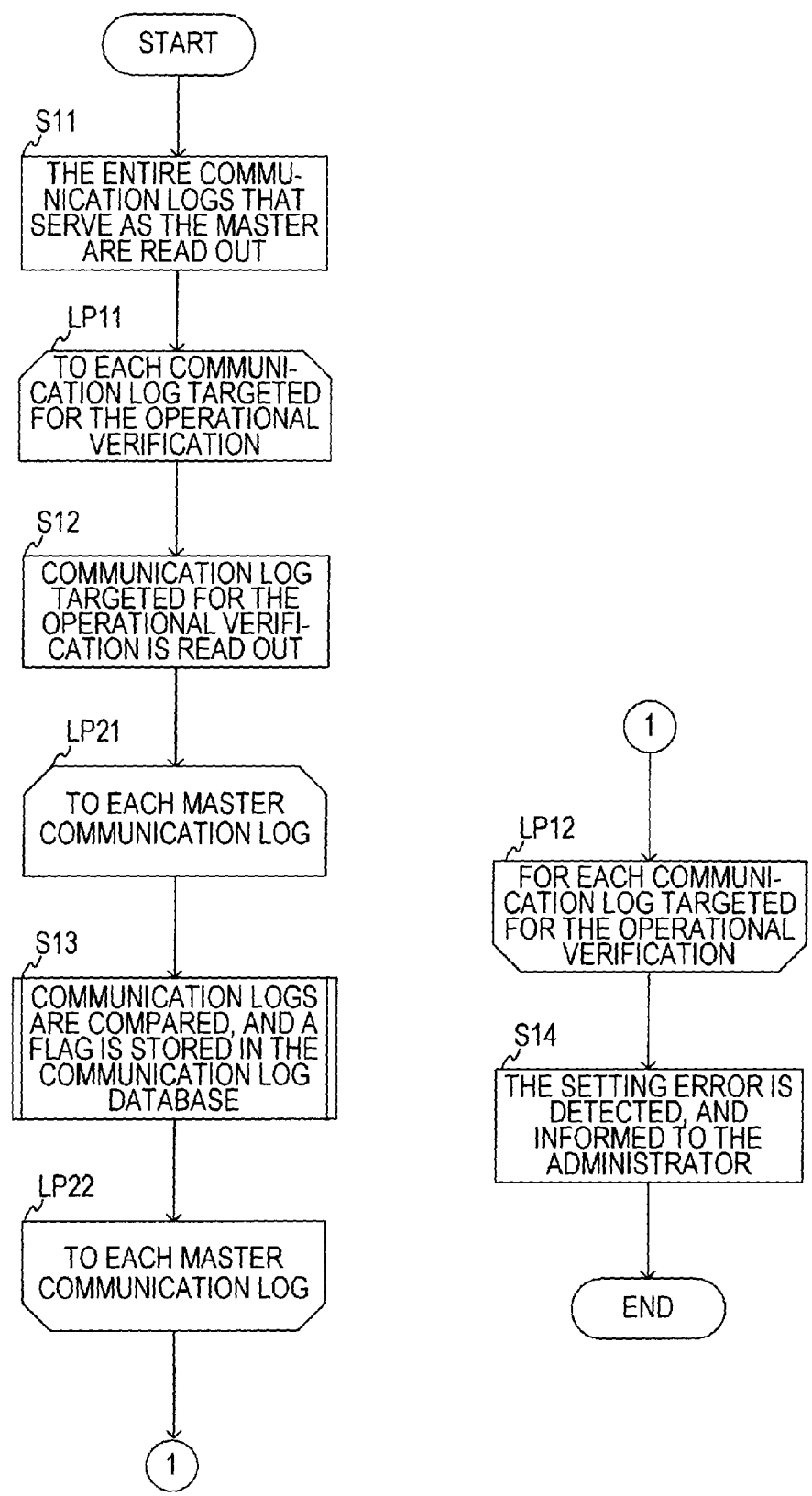
FIG. 14 is a first flowchart to explain the entire flow of the comparison processing of the communication logs and the detection processing for the setting errors.

FIG. 14 is a first flowchart to describe the entire flow of the comparison processing of the communication logs and the detection processing for the setting errors.

Step S11: the communication log comparing unit 43 reads out the entire communication logs which serve as a master (reference) for the comparison processing from the communication log database DB1. Hereinafter, the communication log that serves as the master is appropriately referred to as a master communication log. Specifically, the communication log comparing unit 43 reads out the specific information (the IP addresses of the transmission source and the transmission destination and the port numbers of the transmission source and the transmission destination) of the entire communication logs stored in the master communication log table T1*m* in FIG. 12.

Step S12: the communication log comparing unit 43 reads out the communication log targeted for the operational verification, from the communication log database DB1. The communication log targeted for the operational verification is the communication log of the second block B20*b*. Specifically, the communication log comparing unit 43 reads out the specific information of the communication log, which has not been read out yet, from the specific information of the communication logs stored in the communication log table T11*b* in FIG. 13.

Step S13: the communication log comparing unit 43 compares the communication log targeted for the operational verification, which is read out at the Step S12, with each master communication log, and sets a flag, which indicates that both communication logs correspond to each other, to respective communication logs. The processing at the Step S13 will be described in detail in FIG. 15. The communication log comparing unit 43 executes the processing of comparing the communication log targeted for the operational verification, which is read out at the Step S12, with each master communication log, with respect to the entire master communication logs (loops LP 21 to LP22).

Step S14: the error detecting unit 44 detects the setting error related to communications, and the notifying unit 45 notifies the administrator of the setting error related to communications, which is detected by the error detecting unit 44.

The communication log comparing unit 43 executes the processing at the Step S12 and Step S13 until the communication log comparing unit 43 reads out all the communication logs from the communication log table T11*b* in FIG. 13 at the Step S12 (loops LP11 to LP12).

Figure 15:
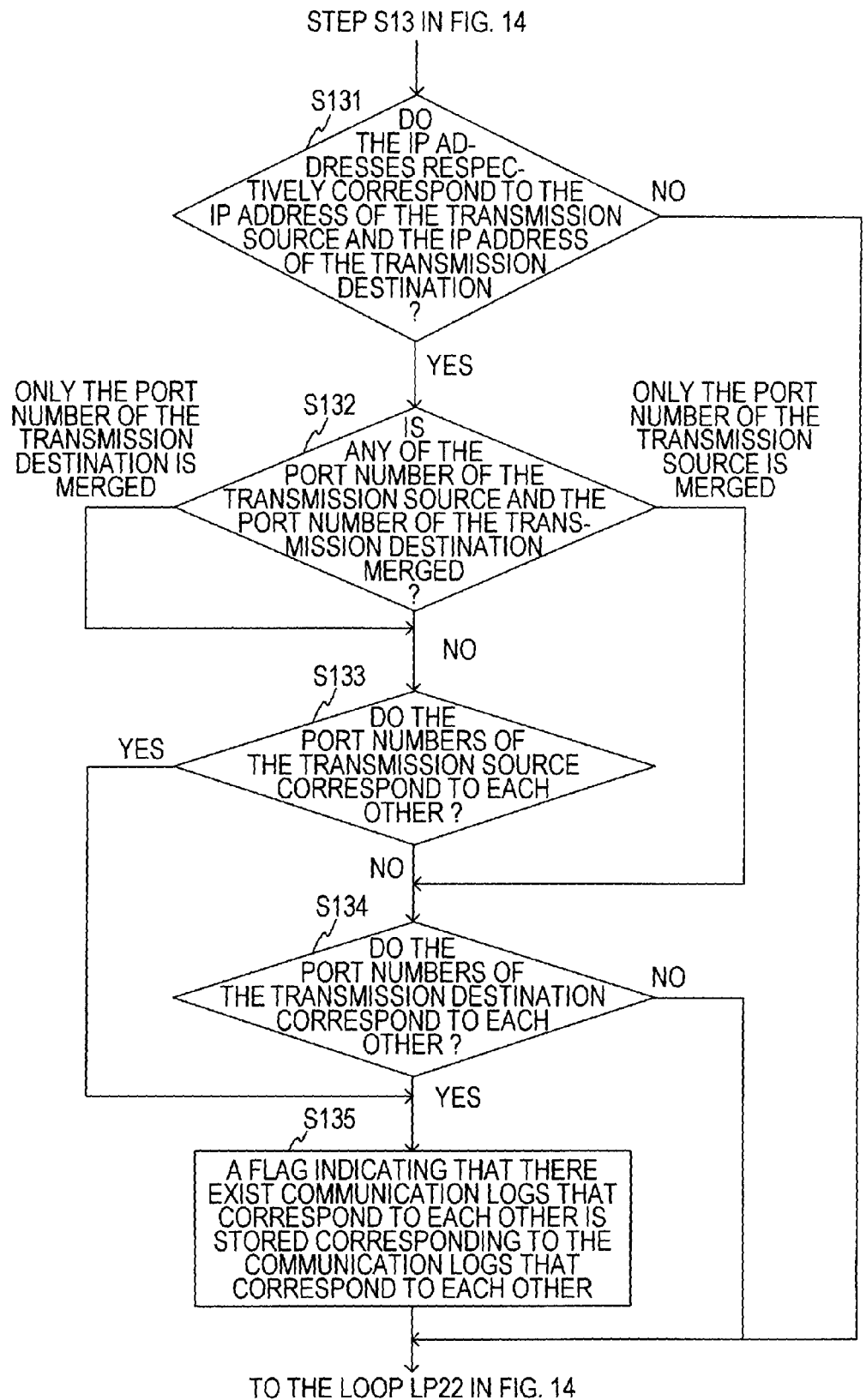
FIG. 15 is a flowchart to explain the comparison of the communication logs and the detection of the setting errors at Step S13 in FIG. 14.

FIG. 15 is a flowchart to describe the comparison of the communication logs and the detection of the setting error at the Step S13 in FIG. 14.

Step S131: the communication log comparing unit 43 determines whether the IP addresses of the transmission source and the transmission destination of the master communication log respectively correspond to the IP addresses of the transmission source and the transmission destination of the communication log targeted for the operational verification. When the IP addresses of the transmission source and the transmission destination in the master communication log do not correspond to the IP addresses of the transmission source and the transmission destination of the communication log targeted for the operational verification (S131, NO), the processing proceeds to the loop LP22 in FIG. 14. In contrast, the IP addresses of the transmission source and the transmission destination of the master communication log respectively correspond to the IP addresses of the transmission source and the transmission destination of the communication log targeted for the operational verification (Step S131, YES), the processing proceeds to the Step S132.

Step S132: the communication log comparing unit 43 determines whether the port number of the transmission source of the master communication log and the port number of the transmission source of the communication log targeted for the operational verification are merged, or whether the port number of the transmission destination of the master communication log and the port number of the transmission destination of the communication log targeted for the operational verification are merged.

Hereinafter, a case where the port number of the transmission source of the master communication log and the port number of the transmission source of the communication log targeted for the operational verification are merged is referred to as a first case. Also, a case where the port number of the transmission destination of the master communication log and the port number of the transmission destination of the communication log targeted for the operational verification are merged is referred to as a second case.

Herein, in the second case (Step S132, only the port numbers of the transmission destination are merged), the processing proceeds to the Step S133. In the first case, (Step S132, only the port numbers of the transmission source are merged), the processing proceeds to the Step S134. In a third case where the first and second cases are not applied, the processing proceeds to the Step S133. In a case where any of the first to third cases are not applied, the processing proceeds to the loop LP22 in FIG. 14.

Step S133: the communication log comparing unit 43 determines whether the port number of the transmission source of the master communication log corresponds to the port number of the transmission source of the communication log targeted for the operational verification. When the port number of the transmission source of the master communication log corresponds to the port number of the transmission source of the communication log targeted for the operational verification (Step S133, YES), the process proceeds to the Step S135. In contrast, when the port number of the transmission source of the master communication log does not correspond to the port number of the transmission source of the communication log targeted for the operational verification (Step S133, NO), the process proceeds to the Step S134.

Step S134: the communication log comparing unit 43 determines whether the port number of the transmission destination of the master communication log corresponds to the port number of the transmission destination of the communication log targeted for the operational verification. When the port number of the transmission destination of the master communication log does not correspond to the port number of the transmission destination of the communication log targeted for the operational verification (Step S134, NO), the process proceeds to the loop LP22 in FIG. 14. In contrast, when the port number of the transmission destination of the master communication log corresponds to the port number of the transmission destination of the communication log targeted for the operational verification (Step S134, YES), the process proceeds to the Step S135.

Step S135: the communication log comparing unit 43 sets a flag, which indicates that there exist communication logs that correspond to each other, in the communication logs that correspond to each other. The communication logs that correspond to each other include the master communication log and the communication log targeted for the operational verification, both of which satisfy the condition at the Step S131 (Step S131, YES) and the condition at the Step S133 or the Step S134 (Step S133, YES or Step S134, YES).

(Setting for Flag)

Figure 16:
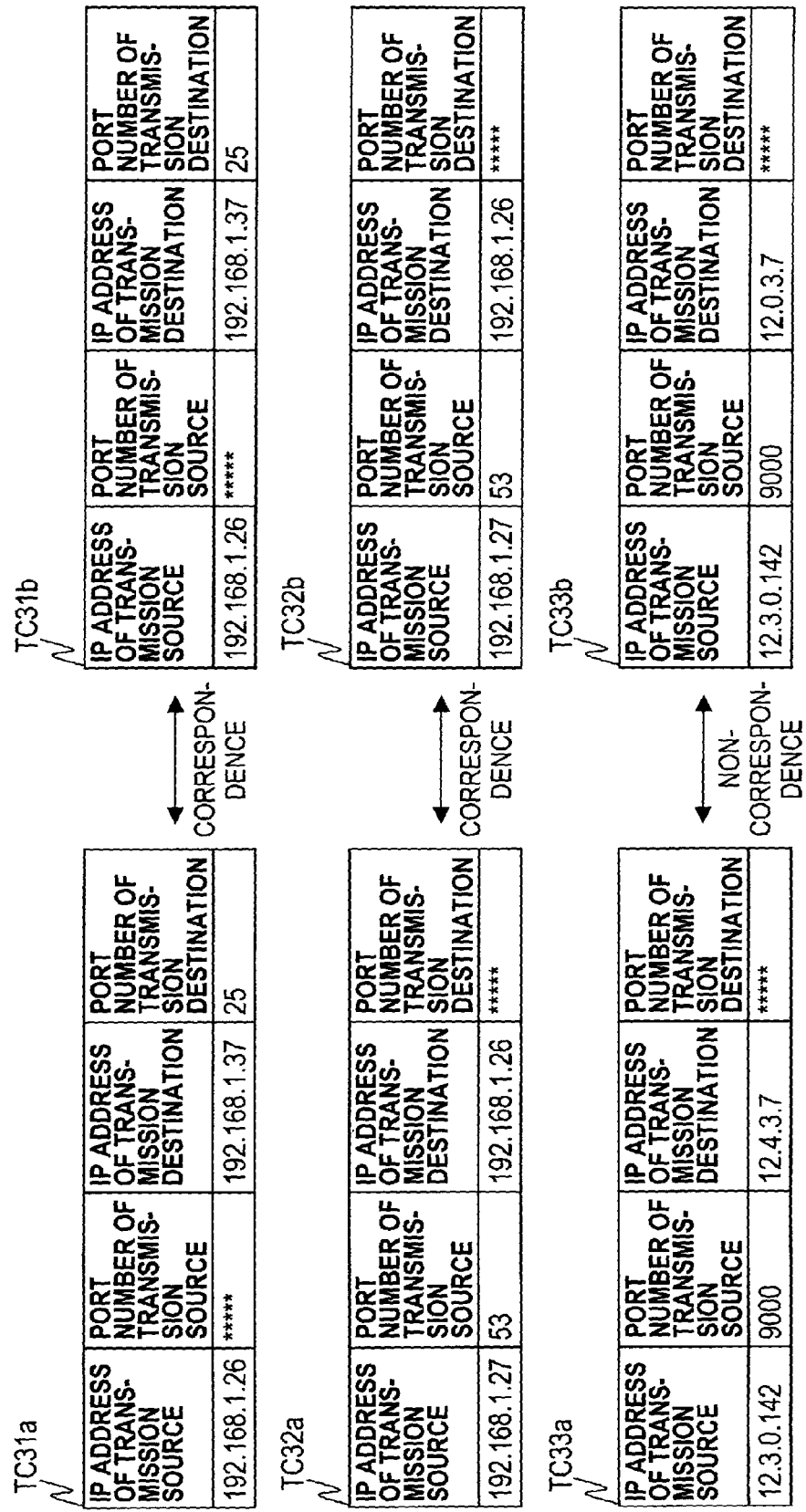
FIG. 16 is a diagram to explain correspondence and non-correspondence between the communication logs in a state where the port number of a transmission source and the port number of a transmission destination are both merged.

The setting for the flag described in FIG. 15 will be described referring to FIGS. 16 and 17. FIG. 16 is a diagram to describe the correspondence and non-correspondence between the communication logs in a state where the port number of the transmission source and the port number of the transmission destination are both merged.

A communication log TC31*a* is the master communication log illustrated by a reference number "P1" in FIG. 12. A communication log TC31*b* is the communication log targeted for the operational verification, which is illustrated by the reference number "P1" in FIG. 13. A communication log TC32*a* is the master communication log illustrated by a reference number "P2" in FIG. 12. A communication log TC32*b* is the communication log targeted for the operational verification, which is illustrated by the reference number "P2" in FIG. 13. A communication log TC33*a* is the master communication log illustrated by a reference number "P3" in FIG. 12. A communication log TC33*b* is the communication log targeted for the operational verification, which is illustrated by the reference number "P3" in FIG. 13.

The communication log comparing unit 43, for example, compares the communication log TC31*a* with the communication log TC31*b*. Herein, the IP addresses of the transmission source ("192. 168. 1. 26") and the transmission destination ("192. 168. 1. 37") included in the communication log TC31*a* respectively correspond to the IP addresses of the transmission source and the transmission destination included in the communication log TC31*b*. Also, the port numbers of the transmission source included in the communication logs TC31*a* and TC31*b* are merged ("*****"). Then, the port number ("25") of the transmission destination included in the communication logs TC31*a* corresponds to the port number ("25") of the transmission destination included in the communication logs TC31*b*. Accordingly, regarding to the aforementioned comparison of the communication logs, the communication log comparing unit 43 determines that a decision is YES at the Step S131, and that only the port number of the transmission source is merged at the Step S132, and that a decision is YES at the Step S134 in FIG. 15, and the process proceeds to the Step S135.

With respect to the correspondence presence column in the master communication log table T1*m* in FIG. 12, the communication log comparing unit 43 stores "presence" of the flag in the corresponding line of the communication log TC31*a* (see the reference number "P1" in FIG. 12) (Step S135).

Then, with respect to the correspondence presence column in the communication log table T11*b* in FIG. 13, the communication log comparing unit 43 stores "presence" of the flag in the corresponding line of the communication log TC31*b* (see the reference number "P1" in FIG. 13) (Step S135).

Subsequently, the communication log comparing unit 43, for example, compares the communication log TC32*a* with the communication log TC32*b*. With respect to the comparison of the communication logs, the communication log comparing unit 43 determines that a decision is YES at the Step S131, and that only the port number of the transmission destination is merged at the Step S132, and that a decision is YES at the Step S133 in FIG. 15, and the processing proceeds to the Step S135.

With respect to the correspondence presence column in the master communication log table T1*m* in FIG. 12, the communication log comparing unit 43 stores "presence" of the flag in the corresponding line of the communication log TC32*a* (see the reference number "P2" in FIG. 12) (Step S135).

Then, with respect to the correspondence presence column in the communication log table T11*b* in FIG. 13, the communication log comparing unit 43 stores "presence" of the flag in the corresponding line of the communication log TC32*b* (see the reference number "P2" in FIG. 13) (Step S135).

The processing of the aforementioned comparison is repeatedly executed (see loops LP11 to LP12 in FIG. 14). As a result, the communication log comparing unit 43, for example, compares the communication log TC33*a* with the communication log TC33*b*. Herein, the IP address ("12. 4. 3. 7") of the transmission destination included in the communication log TC33*a* does not correspond to the IP address ("12. 0. 3. 7") of the transmission destination included in the communication log TC33*b*. Accordingly, with respect to the aforementioned comparison of the communication logs, the communication log comparing unit 43 determines that a decision is NO at the Step S131 in FIG. 15 and does not execute the processing at the Step S135. As a result, with respect to the correspondence presence column in the master communication log table T1*m* in FIG. 12, the communication log comparing unit 43 does not store "presence" of the flag in the corresponding line of the communication log TC33*a* (see the reference number P3 in FIG. 12). That is, the flag is maintained to a blank. With respect to the correspondence presence column in the communication log table T11*b* in FIG. 13, the communication log comparing unit 43 does not store "presence" of the flag in the corresponding line of the communication log TC33*b* (see the reference number P3 in FIG. 13). That is, the flag is maintained to a blank.

Figure 17:
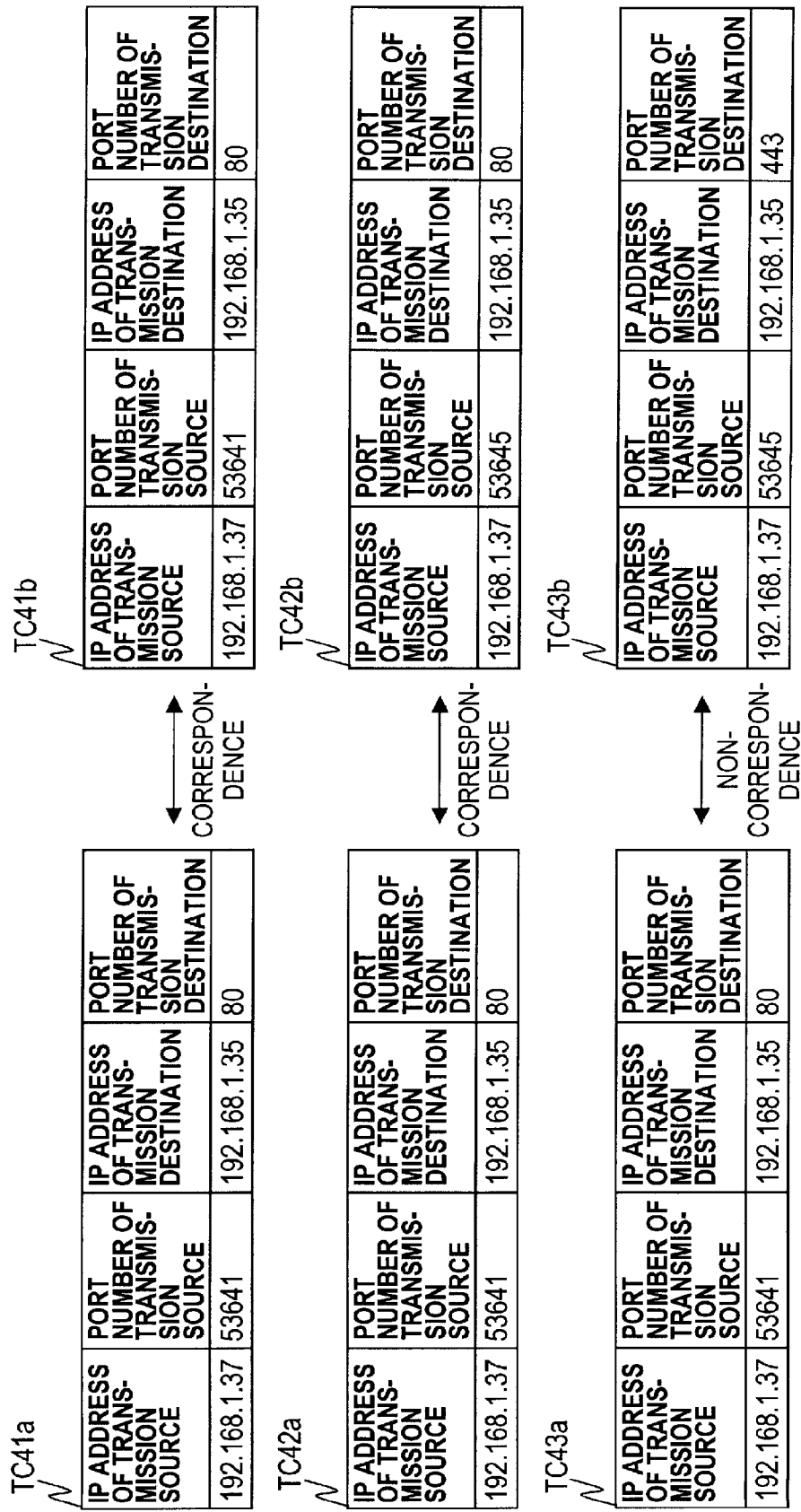
FIG. 17 is a diagram to explain correspondence and non-correspondence between the communication logs in a state where the port number of the transmission source and the port number of the transmission destination both are not merged.

FIG. 17 is a diagram to describe the correspondence and non-correspondence between the communication logs in a state where the port number of the transmission source and the port number of the transmission destination are not both merged.

Communication logs TC41*a* to TC43*a* are represented as one example of the master communication log. Communication logs TC41*b* to TC43*b* are represented as one example of the communication log targeted for the operational verification.

The communication log comparing unit 43, for example, compares the communication log TC41*a* with the communication log TC41*b*. Herein, the IP address ("192. 168. 1. 37") of the transmission source and the IP address ("192. 168. 1. 35") of the transmission destination included in the communication log TC41*a* respectively correspond to the IP address of the transmission source and the IP address of the transmission destination included in the communication log TC41*b*. Then, the port number ("53641") of the transmission source and the port number ("80") of the transmission destination included in the communication log TC41*a* respectively correspond to the port number of the transmission source and the port number of the transmission destination included in the communication log TC41*b*. Accordingly, with respect to the aforementioned comparison of the communication logs, the communication log comparing unit 43 determines that a decision is YES at the Step S131, and a decision is NO at the Step S132, and a decision is YES at the Step S133 in FIG. 15, and the processing proceeds to the Step S135.

With respect to the correspondence presence column in the master communication log table T1*m* in FIG. 12, the communication log comparing unit 43 stores "presence" of the flag in the corresponding line (not illustrated) of the communication log TC41*a* (Step S135). Then, with respect to the correspondence presence column in the communication log table T11*b* in FIG. 13, the communication log comparing unit 43 stores "presence" of the flag in the corresponding line (not illustrated) of the communication log TC41*b* (Step S135).

The communication log comparing unit 43, for example, compares the communication log TC42*a* with the communication log TC42*b*. Herein, the IP address ("192. 168. 1. 37") of the transmission source and the IP address ("192. 168. 1. 35") of the transmission destination included in the communication log TC42*a* respectively correspond to the IP address of the transmission source and the IP address of the transmission destination included in the communication log TC42*b*. In contrast, the port number ("53641") of the transmission source included in the communication log TC42*a* does not correspond to the port number ("53645") of the transmission source included in the communication log TC42*b*. However, the port number ("80") of the transmission destination included in the communication log TC42*a* corresponds to the port number ("80") of the transmission destination included in the communication log TC42*b*.

Accordingly, with respect to the aforementioned comparison of the communication logs, the communication log comparing unit 43 determines that a decision is YES at the Step S131, and a decision is NO at the Step S132 and the Step S133, and a decision is YES at the Step S134 in FIG. 15, and the processing proceeds to the Step S135. The processing at the Step S135 has been described in the case of the comparison of the communication log TC42*a* with the communication log TC42*b*, so that its description is omitted.

The communication log comparing unit 43, for example, compares the communication log TC43*a* with the communication log TC43*b*. Herein, the IP address ("192. 168. 1. 37") of the transmission source and the IP address ("192. 168. 1. 35") of the transmission destination included in the communication log TC43*a* respectively correspond to the IP address of the transmission source and the IP address of the transmission destination included in the communication log TC43*b*. However, the port number ("53641") of the transmission source included in the communication log TC43*a* does not correspond to the port number ("53645") of the transmission source included in the communication log TC43*b*. Further, the port number ("80") of the transmission destination included in the communication log TC43*a* does not correspond to the port number ("443") of the transmission destination included in the communication log TC43*b*.

Accordingly, with respect to the aforementioned comparison of the communication logs, the communication log comparing unit 43 determines that a decision is YES at the Step S131 and that a decision is NO at the Steps S132 to S134 in FIG. 15, and does not execute the processing at the Step S135.

As is described above, the communication log comparing unit 43 repeats the aforementioned comparison of the master communication log with the communication log targeted for the operational verification. Specifically, the communication log comparing unit 43 reads out the entire master communication logs stored in the master communication log table T1*m* in FIG. 12. Then, the communication log comparing unit 43 compares the master communication log to be read out with each communication log stored in the communication log table T11*b* in FIG. 13. When the master communication log to be read out corresponds to each communication log stored in the communication log table T11*b*, the communication log comparing unit 43 stores "presence" of the flag in the corresponding line of the communication logs which correspond to each other, with respect to the correspondence presence columns in the communication log tables T1*m* and T11*b*.

(Extract of Setting Error Candidate)

According to the execution of the processing at the Steps S11 to S13 in FIG. 14, the communication log comparing unit 43 stores the flag in the correspondence presence column in the master communication log table T1*m* in FIG. 12 and further stores the flag in the correspondence presence column in the communication log table T11*b* in FIG. 13. Then, the processing proceeds from the loop LP12 to the Step S14 in FIG. 14.

The error detecting unit 44 extracts a setting error candidate based on the master communication log table T1*m* in FIG. 12 and the communication log table T11*b* in FIG. 13. The communication log of the setting error candidate is a communication log stored in a line (blank) in which "presence" of the flag is not stored with respect to the correspondence presence columns of the master communication log table T1*m* in FIG. 12 and the communication log table T11*b* in FIG. 13. Also, the communication log of the setting error candidate is a communication log stored in a line in which "no response" is stored with respect to the state column of the communication log table T11*b* in FIG. 13.

The error detecting unit 44 detects the setting error based on the setting error candidate to be extracted and analyzes the cause of the setting error. Then, the notifying unit 45 notifies the administrator of the content of the setting error and the cause of the setting error. First, the extraction of the setting error candidate will be described based on FIG. 18.

FIG. 18 is a diagram to describe the extraction of the setting error candidate, which is executed at the Step S14 in FIG. 14.

The error detecting unit 44 extracts the setting error candidate as a preliminary stage of the detection of the setting error. The error detecting unit 44 detects the communication log that does not correspond to the second specific information included in the plurality of second communication logs (see FIG. 13), from the plurality of first communication logs (see FIG. 12), as a communication log having the setting error.

Specifically, the error detecting unit 44 detects the communication log in which the IP addresses do not correspond to the IP addresses of the transmission source and the transmission destination included in the plurality of second communication logs, from the plurality of first communication logs, as the communication log having the first setting error. Similarly, the error detecting unit 44 detects the communication log in which IP addresses respectively correspond to the IP addresses of the transmission source and the transmission destination included in the plurality of second communication logs, and in which port numbers do not correspond to the port numbers of the transmission source and the transmission destination included in the plurality of second communication logs, from the plurality of first communication logs, as the communication log having the first setting error. Hereinafter, the communication log having the first setting error is appropriately referred to as a communication log of the first setting error candidate.

In the example of FIG. 12, the error detecting unit 44 extracts the communication log of the first setting error candidate from the communication log group stored by the master communication log table T1*m* in FIG. 12. The communication log of the first setting error candidate is a communication log in which "presence" of the flag is not stored in the correspondence presence column. A reference number "TE1*a*" in FIG. 18A illustrates a table representing two communication logs of the first setting error candidate, which is extracted by the error detecting unit 44.

Further, the error detecting unit 44 detects the communication log in which IP addresses do not correspond to the IP addresses of the transmission source and the transmission destination included in the plurality of first communication logs, from the plurality of second communication logs, as the communication log having the second setting error. Similarly, the error detecting unit 44 detects the communication log in which IP addresses respectively correspond to the IP addresses of the transmission source and the transmission destination included in the plurality of first communication logs, but in which port numbers do not correspond to the port numbers of the transmission source and the transmission destination included in the plurality of first communication logs, from the plurality of second communication logs, as the communication log having the second setting error. Hereinafter, the communication log having the second setting error is appropriately referred to as a communication log of second setting error candidate.

In the example of FIG. 13, the error detecting unit 44 extracts the communication log of the second setting error candidate from the communication log group stored by the communication log table T11*b* in FIG. 13. The communication log of the second setting error candidate is a communication log in which "presence" of the flag is not stored in the correspondence presence column. Further, the error detecting unit 44 detects (also referred to as "extract") a second communication log including communication information indicating that the communication state information is not normally executed, for example, a communication log in which "no response" is stored in the state column.

A reference number "TE1*b*" in FIG. 18B illustrates a table representing the communication log of the second setting error candidate, which is extracted by the error detecting unit 44, and the second communication log including the communication information indicating that the communication state information is not normally executed.

Then, the error detecting unit 44 detects the setting error in the specific information that specifies the transmission source and the transmission destination, which is associated with the communication logs of the first and second setting errors, with regards to the devices of the second device group.

FIGS. 19 to 21 are the first to third diagrams to describe the detection processing for the setting errors, which is executed at the Step S14 in FIG. 14.

The error detecting unit 44 separately executes the first to third detection processing, thereby detecting the setting errors. Firstly, the first detection processing will be described.

Regarding the first detection processing, the following presumption will be applied. The administrator sets the IP address "12. 3. 0. 142" of the transmission source in the server (hereinafter, referred to as "server S1") of the first device group in which the operational verification has already been completed (for example, the first block A20*a*). Further, the administrator sets the IP address "12. 0. 3. 7" of the transmission destination to the communication software component executed by the server S1. Herein, the server of the transmission destination, in which the IP address "12. 0. 3. 7" of the transmission destination is set, is referred to as a server D1.

Then. the administrator sets the IP address "12. 3. 0. 142" of the transmission source in the server (hereinafter, referred to as "server S2"), which has the same function as that of the server S1, in the second device group targeted for the operational verification (for example, the second block B20*b*). Then, it is assumed that the administrator needs to set the IP address "12. 4. 3. 7", which is a product of the customization of the IP address "12. 0. 3. 7" of the transmission destination, to the communication software component executed by the server S2. However, the administrator actually does not carry out the aforementioned customization and erroneously sets the IP address "12. 0. 3. 7" of the transmission destination, in place of the IP address"12. 4. 3. 7". Herein, the server of the transmission destination, in which the IP address "12.4. 3. 7" of the transmission destination is set, is referred to as a server D2.

In the server correspondence table TR1 in FIG. 8, the IP address "12. 0. 3. 7" and the IP address "12. 4. 3. 7" are respectively stored on the same line in the IP address (the first block A) column and the IP address (the second block B) column. In other words, the server D1 and the server D2 have the same functions.

When the administrator executes the operational verification for the second device group targeted for the operational verification, the communication software component of the server S2 generates communication packets and transmits the communication packets. The communication packets, for example, include the IP address "12. 3. 0. 142" of the transmission source, the port number "9000" of the transmission source, the IP address "12. 0. 3. 7" (erroneous setting) of the transmission destination, and a predetermined port number of the transmission destination. The IP address "12. 0. 3. 7" (erroneous setting) of the transmission destination in the communication packets is not stored in the IP address (the second block B) column in the server correspondence table TR1 in FIG. 8. Accordingly, the communication packets are transmitted to a block (for example, the first block A20a) except for the second block B20b, and the server of the block receives the communication packets. Then, the server that received the communication packets returns an affirmative response packet (also referred to as ACK packet) to the communication software component of the server S2. As a result, the communication software component of the server S2 stores the communication log that includes the IP address "12. 3. 0. 142" of the transmission source, the port number "9000" of the transmission source, the IP address "12. 0. 3. 7" (erroneous setting) of the transmission destination, the predetermined port number of the transmission destination, and a communication state "OK" (see the reference number TE1b in FIG. 18B).

The communications described above are attributed to the erroneous setting for the IP addresses, so that it is requisite to correct the erroneous setting for the IP addresses. Accordingly, the error detecting unit 44 of the administration device 4 executes the following processing.

The error detecting unit 44 detects a communication log in which its IP address corresponds to the IP address of the transmission source, and its port number corresponds to the port number of the transmission source, as the communication log of the third setting error, from the communication log of the first setting error and the communication log of the second setting error. Otherwise the error detecting unit 44 detects a communication log in which its IP address corresponds to the IP address of the transmission destination, and its port number corresponds to the port number of the transmission destination, as the communication log of the fourth setting error.

Then, the error detecting unit 44 detects the setting error regarding the IP addresses of the transmission source and the transmission destination, which is associated with the communication logs of the third and fourth setting errors, with regards to the devices of the second device group. Then, the notifying unit 45 notifies the administrator of the setting error detected by the error detecting unit 44.

Hereinafter, specific embodiments will be described. The error detecting unit 44 compares the communication log of the first setting error candidate with the communication log of the second setting error candidate. Then, the error detecting unit 44 extracts a communication log in which its IP address corresponds to the IP address of the transmission source, and its port number corresponds to the port number of the transmission source, or a communication log in which its IP address corresponds to the IP addresses of the transmission destination, and its port number corresponds to the port number of the transmission destination, from the communication logs of the first and second setting error candidates. In the case exemplified in FIG. 18A and FIG. 18B, the error detecting unit 44 extracts the communication log that includes the IP addresses "12. 3. 0. 142" of the transmission source and the port number "9000" of the transmission source, as the communication log in which its IP address corresponds to the IP addresses of the transmission source, and its port number corresponds to the port number of the transmission source, from the communication logs of the first and second setting error candidates.

Specifically, the error detecting unit 44 extracts the communication log TM1a in FIG. 19A from the two communication logs illustrated by the reference number "TE1a". The communication log TM1a includes the IP addresses "12. 3. 0. 142" of the transmission source, the port number "9000" of the transmission source, the IP address "12. 4. 3. 7" of the transmission destination, and the port number "***" of the transmission destination. Further, the error detecting unit 44 extracts the communication log TM1b in FIG. 19B from the two communication logs illustrated by the reference number TE1b. The communication log TM1b includes the IP addresses "12. 3. 0. 142" of the transmission source, the port number "9000" of the transmission source, the IP address "12. 0. 3. 7" of the transmission destination, and the port number "***" of the transmission destination.

As is described above, the IP address "12. 0. 3. 7" of the transmission destination included in the communication log TM1b in FIG. 19B is not stored in the IP address (the second block B) column in the server correspondence table TR1 in FIG. 8. Thus, when there is an IP address that is not stored in the IP address (the second block B) column in FIG. 8, in the IP addresses included in the communication log TM1b in FIG. 19B, the error detecting unit 44 assumes that there occurs the setting error associated with the IP address. The IP address, for which it is assumed that the setting error occurs, is the IP address "12. 0. 3. 7" of the transmission destination.

Accordingly, the error detecting unit 44 assumes that there occurs the setting error at the time of setting the communication association information in the server in which the IP addresses "12. 3. 0. 142" of the transmission source in the communication log TM1b is set. Further, the IP address "12. 0. 3. 7" of the transmission destination is stored in the IP address (the first block A) column in the server correspondence table TR1 in FIG. 8, so that the error detecting unit 44 assumes that the IP address "12. 4. 3. 7" corresponding to the IP address is correct.

Then, the notifying unit 45 informs the administrator that there occurs the setting error at the time of setting the communication association information in the server in which the IP addresses "12. 3. 0. 142" of the transmission source is set, and that the IP address "12. 4. 3. 7" is a correct IP address.

Next, the second detection processing will be described. The error detecting unit 44 detects the communication log of the fifth setting error except for the communication logs of the third and fourth setting error, from the communication logs of the first setting error. The notifying unit 45 detects the setting error in the IP address of the transmission source, which is associated with the communication log of the fifth setting error in the devices of the second device group, and informs the administrator of the setting error to be detected.

Hereinafter, specific embodiments will be described. The error detecting unit 44 detects the presence or absence of the communication log, which exists only in the first device group (for example, the first block A20a) in which the operational verification has already been completed. As is described above, the hardware components and the software components included in the second device group (for example, the second block B20b) targeted for the operational verification are equal or approximately equal to the hardware components and the software components included in the first block A20a. If so, with regard to the first block A20a and the second block B20b, there is a high probability that the communications are executed wherein the transmission source and transmission destination are deemed to be identical.

Accordingly, when there is the communication log that exists only in the first block A20a, there is a high probability that the communications associated with this communication log have not been executed in the second block B20b. More specifically, in the server of the transmission source which executes the communications associated with this communication log in the second block B20b, there is a high probability that the software component, which executes the services that the server needs to provide, has not operated. Furthermore, there is a high probability that there occurs the setting error such as an omission of setting regarding the communication setting information in the server.

Specific processing of detecting the presence or absence of the communication log that exists only in the first block A20a will be described. The error detecting unit 44 extracts a communication log except for the communication logs extracted in the first detection processing, from two communication logs illustrated by the reference number TE1a in FIG. 18. The communication log to be extracted is represented as one example of the communication log of the fifth setting error and is exemplified by a communication log TM11a in FIG. 20. The communication log TM11a is a communication log that includes the IP address "192. 168. 0. 12" of the transmission source, the port number "*****" of the transmission source, the IP address "192. 168. 1. 23" of the transmission destination, and the port number "9002" of the transmission destination.

The communication log TM11a is the communication log that exists only in the first block A20a.

The notifying unit 45 informs the administrator that there occurs the setting error associated with the communication log detected by the error detecting unit 44. The notifying unit 45 informs the administrator that it needs to be verified whether the software component, which executes the services that the server needs to provide, is operated in the server, in which the IP address "192. 168. 0. 12" of the transmission source is set and executes the communications related to this communication log in the second block B20b. Also, the notifying unit 45 informs the administrator that it needs to be verified whether the server is correct and whether the communication setting information is correct that is set in the software component executed by the server.

Next, the third detection processing will be described. The error detecting unit 44 extracts the communication log of second setting error candidate in which "no response" is stored in the state column. Regarding the communication log that stores "no response", there is a high probability that the communication packets are transmitted from the server of the transmission source to the server of the transmission destination, but the communication packets have not arrived at the server of the transmission destination. As the cause of this failure, for example, it is conceivable that the firewall provided on a network interposed between the server of the transmission source and the server of the transmission destination has blocked the aforementioned communication packets. Moreover, as another cause of this failure, it is conceivable that there occurs the setting error in a routing table provided in the router on the aforementioned network.

Specifically, the error detecting unit 44 extracts the communication log in which "no response" is stored in the state column, from the two communication logs illustrated by the reference number "TE1b" in FIG. 18. The communication log to be extracted is a communication log TM11b in FIG. 21. The communication log TM11b includes the IP addresses "192. 168. 1.37" of the transmission source, the port number "*****" of the transmission source, the IP address "192. 168. 1. 35" of the transmission destination, and the port number "9004" of the transmission destination.

According to the communication log in which "no response" is stored in the state column, it can be assumed that there is a probability that the communication packets are blocked that are transmitted from the server of the transmission source in which the IP addresses "192. 168. 1. 37" of the transmission source is set, to the port number "9004" of the server of the transmission destination in which the IP address "192. 168. 1. 35" of the transmission destination is set.

Accordingly, the notifying unit 45 informs the administrator that it needs to be verified whether the settings are correct in the firewall arranged on the network (communication channel) from the server of the transmission source to the server of the transmission destination.

As is described above, the administration device of the embodiment of the present invention not only automatically detects the setting error in the communication related information and informs the administrator of the setting error, but also assumes the cause of the setting error and informs the administrator of the cause of the setting error. Accordingly, it is easy for the administrator to specify the setting error and analyze the cause of the setting error, which enhances convenience of the administrator. Also, the processes and time of correcting the setting error can be reduced, thereby rapidly completing the operational verification. As a result, this not only enhances the convenience of users for the information processing system but also improves the economic profits of business persons.

Also, the administration device of the embodiment executes the detection processing of the setting error with the use of the IP addresses, the port numbers, and communication states of the communication logs which are recorded in the communication processing executed by the software components in the servers.

Accordingly, apart from the administration device, it is not requisite to separately include complicated software components that is used to detect the setting error, thereby restraining the complication of systems and an increase in expense of system configuration. Moreover, the communication logs are recorded on the server, so that an increase in processing load in the server can be restrained. Also, the administration device also obtains the communication logs and executes the simplified processing of comparison of the communication logs to be obtained, so that an increase in processing load can be restrained.

Also, the administration device of the embodiment obtains the communication log that serves the master communication log in the course of comparison of the communication logs, from the first block A20a in operation. Accordingly, it is possible that the administration device performs the operational verification for the second block B20b in the course of comparison of the communication logs, without interrupting the operation of the first block A20a. Therefore, it is possible that the first block A20a operates during the operational verification for the second block B20b, thereby continuously providing services for the users of the cloud system.

It is noted that the administration device 4 may obtain the specific information that specifies the transmission source and the transmission destination in terms of communications, as the communication log of the first block A20a, from the header information of the communication packet that is transmitted and received on the network of the first block A20a. Similarly, the administration device 4 may obtain the specific information that specifies the transmission source and the transmission destination in terms of communications, as the communication log of the second block B20b, from the header information of the communication packet that is transmitted and received on the network of the second block B20b.

[Second Embodiment of Administration Device]

In the first embodiment, the first device group in which the operational verification has already been completed is made up of one device group (the first block A20a). In the second embodiment, in a case where there are a plurality of device groups in which the operational verification has already been completed, the detection processing for the setting error executed by the administration device 4 will be described. Preferably, when the administration device 4 detects a magnitude of setting errors, the administration device 4 informs the setting errors to the administrator in accordance with priority. In other words, it is preferable that the setting error with the high degree of importance be preferentially informed to the administrator.

Accordingly, the administration device 4 allows the communication log, which is obtained from a plurality of first device groups in which the operational verification has already been completed, to include a value of certainty (hereinafter, appropriately referred to as "certainty"). More specifically, the communication log comparing unit 43 allows the first communication log in the plurality of first device groups to include the value of certainty, which indicates emergence frequency of the first communication log in the plurality of first device groups. The administration device 4 determines the priority based on the certainty and determines the order of notification of the setting errors based on the priority to be determined. Hereinafter, specific details will be described.

(Hardware Block Diagram of Information Processing System SYS')

Figure 22:
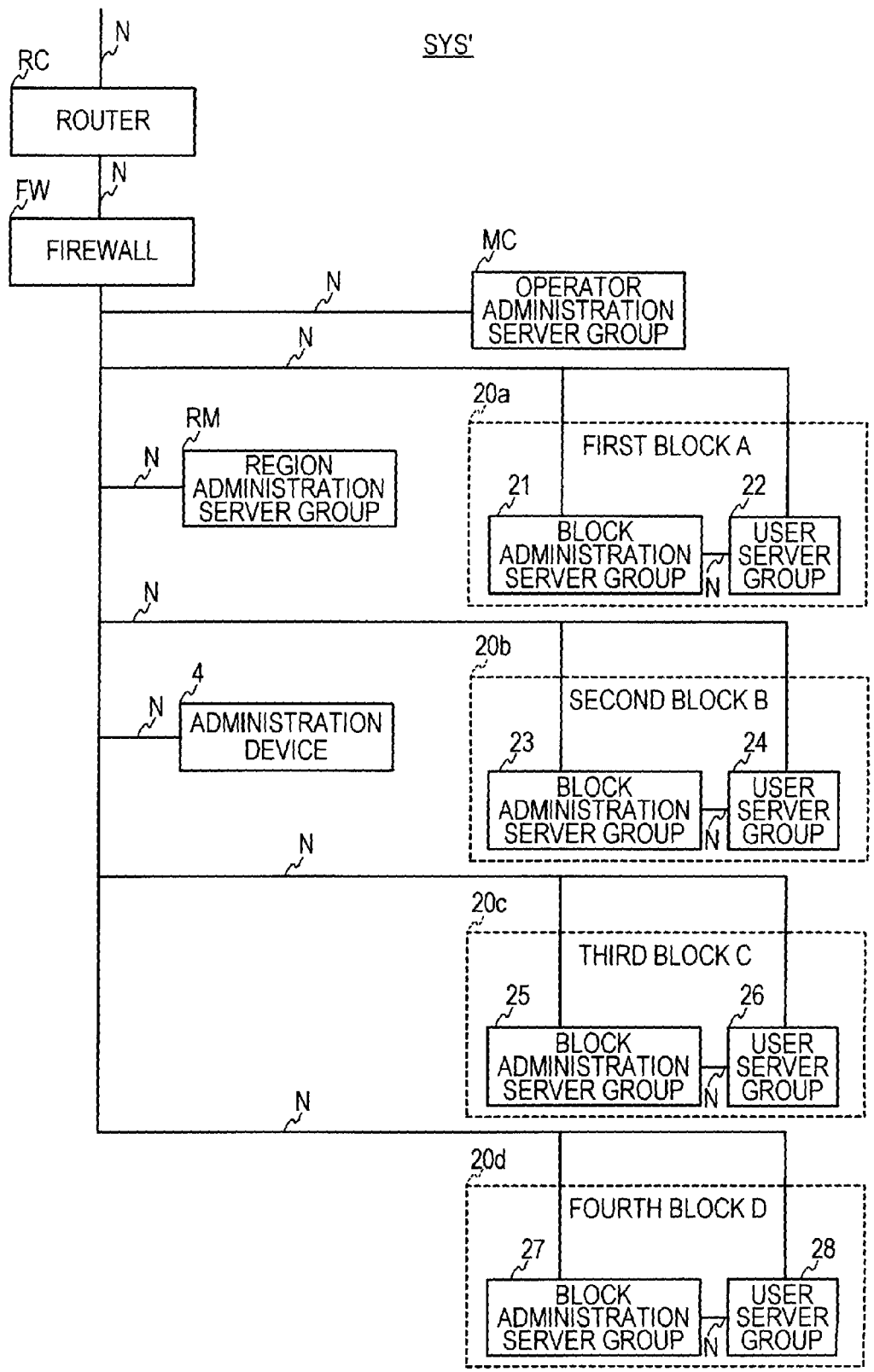
FIG. 22 is a hardware block diagram of an information processing system SYS that includes a plurality of first device groups in which the operational verification has already been completed, as one example.

FIG. 22 is a hardware block diagram of an information processing system SYS' that includes the plurality of first device groups in which the operational verification has already been completed, as one example. FIG. 22 illustrates the constitution in which a third block C20c and a fourth block D20d are added to the information processing system SYS described in FIG. 1. Herein, the first block A20a, the second block B20b, and the third block C20c are the first device groups in which the operational verification has already been completed (also referred to as "first device group in which the configuration has already been completed"). A fourth block D20d is the second device group targeted for the operational verification (also referred to as "the second device group that is currently being configured").

In the second embodiment, as is the same case with the first embodiment, the hardware components and the software components are equal or approximately equal in respective blocks. Specifically, the hardware components and the software components of the first block A20a are equal or approximately equal to the hardware components and the software components of the second block B20b, the third block C20c, and the fourth block D20d. The hardware components and the software components of the second block B20b are equal or approximately equal to the hardware components and the software components of the third block C20c and the fourth block D20d. The hardware components and the software components of the third block C20c are equal or approximately equal to the hardware components and the software components of the fourth block D20d.

In the second embodiment, the block administration server group 25 of the third block C20c and the block administration server group 27 of the fourth block D20d include servers that are equal or approximately equal to the servers of the block administration server group 21 of the first block A20a or the block administration server group 23 of the second block B20b. Then, the user server group 26 of the third block C20c and the user server group 28 of the fourth block D20d include servers that are equal or approximately equal to the servers of the user server group 22 of the first block A20a or the user server group 24 of the second block B20b.

Hereinafter, the operation of the administration device 4 of the second embodiment will be described. The administration device 4 includes the hardware components described in FIGS. 4 and 5 and the software module components described in FIG. 9.

(Server Correspondence Table)

FIG. 23 is a table to describe a server correspondence database DB2 in the second embodiment. The reference number "TR" in FIG. 5 illustrates a state where the server correspondence database DB2 in FIG. 5 stores a server correspondence table TR2. The server correspondence table TR2 is a table corresponding to the server correspondence table TR1 in FIG. 8.

The server correspondence table TR2 includes an IP address column (for first block A), an IP address column (for second block B), an IP address column (for third block C), and an IP address column (for fourth block D). The IP address column (for first block A) stores IP addresses set in the server that the first block A20a includes. The IP address column (for second block B) stores IP addresses set in the server that the second block B20b includes. The IP address column (for third block C) stores IP addresses set in the server that the third block C20c includes. The IP address column (for fourth block D) stores IP addresses set in the server that the fourth block D20d includes.

The server correspondence table TR2 is one example of relating information that includes the IP addresses set in the devices in the plurality of first device groups in which the operational verification has already been completed, and the IP addresses set in the devices, which have the same functions as those of devices in the plurality of first device groups, in the second device group which is targeted for operational verification.

For example, the plurality of first device groups are exemplified by the first block A20a to the third block C20c in FIG. 22. The devices of the first device group, for example, include the servers included in the block administration server group 21, the servers included in the block administration server group 23, and the servers included in the block administration server group 25. Furthermore, the devices of the first device group, for example, include the servers included in the user server group 22, the servers included in the user server group 24, and the servers included in the user server group 26.

The second device group targeted for the operational verification, for example, is the fourth block D20d in FIG. 22. The devices of the second device group, for example, include the servers of the block administration server group 27 and the servers of the user server group 28.

As is described in FIG. 8, in FIG. 23, each of servers, in which the IP address stored in the same line of the diagram and stored in each IP address column (the first block A to the fourth block D) is set, has the same functions.

Herein, a server, in which the IP address "12. 0. 0. 5" stored in the IP address column (the first block A) is set, is referred to as "server A1". The server A1 and a server (hereinafter referred to as "server B1"), in which the IP address "12. 4. 0. 5" stored in the IP address column (the second block B) is set at the same line as that of the IP address ("12. 0. 0. 5") of the server A1, are servers having the similar functions. The server A1 and a server (hereinafter referred to as "server C1"), in which the IP address "12. 8. 0. 5" stored in the IP address column (the third block C) is set at the same line as that of the IP address ("12.0. 0. 5") of the server A1, are servers having the similar functions. Further, the server A1 and a server (hereinafter referred to as "server D1"), in which the IP address "12. 12. 0. 5" stored in the IP address column (the fourth block D) is set at the same line as that of the IP address ("12. 0. 0. 5") of the server A1, are servers having the similar functions.

For example, when the server A1 is the DNS server, the server B1, the server C1, and the server D1 are also the DNS servers.

The administrator produces the server correspondence table TR2 in advance, and stores the server correspondence table TR2 in the server correspondence database DB2 in FIG. 5. It is assumed that the IP address stored in the server correspondence table TR2 is a correct IP address. It is noted that the method of producing the server correspondence table TR2 is not limited, but a manual or automatic (mechanical) method may be applied.

(Acquisition of Master Communication Log)

The acquisition of the communication logs and the merging of the communication logs to be acquired will be described referring to FIG. 10 and FIGS. 24 to 26.

FIG. 24 is a table illustrating a state where the communication logs of the first block A20a are merged, and the IP addresses are appropriately converted, as one example. As is described in FIG. 10, the communication log acquiring unit 41 acquires the communication log from the first block A20a, and the communication log shaping unit 42 stores the communication log acquired by the communication log acquiring unit 41 in the communication log table T21a in FIG. 24. As is described in FIG. 11, the communication log shaping unit 42 appropriately performs the merging processing at the time of storing the communication log.

For example, the communication log shaping unit 42 determines whether the communication log, in which IP addresses respectively correspond to the IP addresses of the transmission source and the transmission destination in the communication log acquired by the communication log acquiring unit 41, has already been stored in the communication log table T21a in FIG. 24 (Step S2). When the communication log shaping unit 42 determines that the communication log, in which the IP addresses respectively correspond to the IP addresses of the transmission source and the transmission destination in the communication log acquired by the communication log acquiring unit 41, has not been stored in the communication log table T21a in FIG. 24 (Step S2, NO), the communication log shaping unit 42 stores the communication log acquired by the communication log acquiring unit 41 in the communication log table T21a in FIG. 24 (Step S3).

When the communication log shaping unit 42 determines that the communication log, in which the IP addresses respectively correspond to the IP addresses of the transmission source and the transmission destination in the communication log acquired by the communication log acquiring unit 41, has already been stored in the communication log table T21a in FIG. 24 (Step S2, YES), the communication log shaping unit 42 determines whether the communication log, in which a port number corresponds to any of the port number of the transmission source and the port number of the transmission destination in the communication log acquired by the communication log acquiring unit 41, has already been stored in the communication log table T21a in FIG. 24 (Step S4). When the communication log shaping unit 42 determines the communication log, in which the port number corresponds to any of the port number of the transmission source and the port number of the transmission destination in the communication log acquired by the communication log acquiring unit 41, has already been stored in the communication log table T21a (Step S4, YES), the communication log shaping unit 42 merges the merging source communication log, which has already been stored in the communication log table T21a in FIG. 24, with the communication log acquired by the communication log acquiring unit 41. In contrast, when the communication log shaping unit 42 determines the communication log, in which the port number corresponds to any of the port number of the transmission source and the port number of the transmission destination in the communication log acquired by the communication log acquiring unit 41, has not been stored in the communication log table T21a in FIG. 24 (Step S4, NO), the process proceeds to the Step S3.

Further, after the completion of the merging the communication logs, the communication log comparing unit 43 converts the IP addresses stored in the transmission-source IP address column and the transmission-destination IP address column in the communication log table T21a in FIG. 24, into IP addresses corresponding to the second device group targeted for the operational verification (for example, the fourth block D) based on the server correspondence table TR2 in FIG. 23.

Specifically, the communication log comparing unit 43 selects the IP address to be converted, from the IP addresses stored in the transmission-source IP address column and the transmission-destination IP address column in the communication log table T21a in FIG. 24. The communication log comparing unit 43 searches an IP address corresponding to the IP address to be selected, from the IP addresses stored in the IP address column (the first block A) of the server correspondence table TR2 in FIG. 23.

Then, the communication log comparing unit 43 specifies an IP address disposed at the same line as that of the IP address to be searched, from the IP addresses stored in the IP address column (the fourth block D) of the server correspondence table TR2 in FIG. 23. Then, the communication log comparing unit 43 converts the IP address selected in the communication log table T21a in FIG. 24 into the IP address to be specified. When the IP address selected and the IP address specified are identical, the communication log comparing unit 43 does not execute the aforementioned conversion.

For example, the communication log comparing unit 43 assumes that the IP address of the transmission source in the communication log illustrated by the reference number P11 in the communication log table T21a in FIG. 24 is "12. 0. 3. 6" prior to the conversion. In this case, the communication log comparing unit 43 converts the IP address "12. 0. 3. 6" into the IP address "12. 12. 3. 6" based on the server correspondence table TR2 in FIG. 23.

FIG. 25 is a table illustrating a state where the communication logs of the second block B20b are merged, and the IP addresses are appropriately converted, as one example. As is described in FIG. 10, the communication log acquiring unit 41 acquires the communication log from the second block B20b, and the communication log shaping unit 42 stores the communication log acquired by the communication log acquiring unit 41 in the communication log table T21b in FIG. 25. As is described in FIG. 11, the communication log shaping unit 42 appropriately performs the merging processing at the time of storing the communication log.

Further, after the completion of the merging the communication logs, the communication log comparing unit 43 converts the IP addresses stored in the transmission-source IP address column and the transmission-destination IP address column in the communication log table T21b in FIG. 25, into IP addresses corresponding to the second device group targeted for the operational verification (for example, the fourth block D) based on the server correspondence table TR2 in FIG. 23.

The acquisition processing, the storage processing, the merging processing of communication logs described above, and further the conversion processing of the IP addresses have been described in detail in FIG. 24. Accordingly, their descriptions are omitted.

FIG. 26 is a table illustrating a state where the communication logs of the third block C20c are merged, and the IP addresses are appropriately converted, as one example. As is described in FIG. 10, the communication log acquiring unit 41 acquires the communication log from the third block C20c, and the communication log shaping unit 42 stores the communication log acquired by the communication log acquiring unit 41 in the communication log table T21c in FIG. 26. As is described in FIG. 11, the communication log shaping unit 42 appropriately performs the merging processing at the time of storing the communication log.

Further, after the completion of the merging the communication logs, the communication log comparing unit 43 converts the IP addresses stored in the transmission-source IP address column and the transmission-destination IP address column in the communication log table T21c in FIG. 26, into IP addresses corresponding to the second device group targeted for the operational verification (for example, the fourth block D) based on the server correspondence table TR2 in FIG. 23. The acquisition processing, the storage processing, the merging processing of communication logs described above, and further the conversion processing of the IP addresses have been described in detail in FIG. 24. Accordingly, their descriptions are omitted.

The reference number "To" in FIG. 5 illustrates a state where the communication log database DB1 in FIG. 5 stores the communication log tables T21a, T21b, and T21c.

As is described above, the communication log comparing unit 43 converts the IP addresses of the transmission source and the transmission destination of the first communication log in the plurality of first device groups into the IP addresses set in the devices of the second device group, corresponding to the IP addresses of the transmission source and the transmission destination, based on the server correspondence table TR2 in FIG. 23.

(Generation of Master Communication Log Table)

FIG. 27 is a table illustrating a state where a master communication log is stored, as one example. A master communication log table T21m includes the transmission-source IP address column, the transmission-source port number column, the transmission-destination IP address column, the transmission-destination port number column, a block number column (hereinafter, referred to as "DC number"), and a certainty column.

The master communication log table T21m is a table that stores the communication log as a comparison source. The master communication log table T21m stores each communication log and the certainty of each communication log. A reference number "Tm" in FIG. 5 illustrates a state where the communication log database DB1 in FIG. 5 stores the master communication log table T21m. Hereinafter, the generation of the master communication log table T21m will be described.

The communication log comparing unit 43 reproduces the communication log tables T21a in FIG. 24 and generates the DC number column and the certainty column on the right side of the transmission-destination port number column in the table to be reproduced. Herein, the communication log comparing unit 43 stores "1" in the DC number column corresponding to each communication log. The table including the DC number column and the certainty column is a first master communication log table (not illustrated) that is currently being generated.

Subsequently, the communication log comparing unit 43 takes out the entire communication logs from the communication log table T21b in FIG. 25 and the communication log table T21c in FIG. 26. The communication log comparing unit 43 stores the communication logs that correspond to each other, from the entire communication logs, as one communication log in the master communication log table T21m. Further, the communication log comparing unit 43 stores the number of blocks, in which there exist the communication logs that correspond to each other, in the DC column of the master communication log table T21m corresponding to the communication logs that correspond to each other.

Herein, the communication logs that correspond to each other mean the communication logs in which the IP address of the transmission source, the IP address of the transmission destination, the port number of the transmission source, and the port number of the transmission destination are all mutually corresponded. Moreover, the communication logs that correspond to each other are applied to communication logs in which the following first and second requirements are satisfied. The first requirement is such that the IP address of the transmission source and the IP address of the transmission destination are mutually corresponded in respective communication logs. The second requirement is such that, when the port numbers of the transmission source are merged, the port numbers of the transmission destination are mutually corresponded in respective communication logs, or such that, when the port numbers of the transmission destination are merged, the port numbers of the transmission source are mutually corresponded in respective communication logs.

Also, the communication log comparing unit 43 stores the communication logs, which do not correspond to each other in the entire communication logs, in the master communication log table T21m. Further, the communication log comparing unit 43 stores "1" in the DC number column of the master communication log table T21m corresponding to the communication logs which do not correspond to each other.

For example, in the case of FIGS. 24 to 26, respective communication logs illustrated by the reference numbers "P1a", "P1b", and "P1c" include the IP address "192. 168. 1. 26" of the transmission source, the port number "*****" of the transmission source, the IP address "192. 168. 1. 37" of the transmission destination, and the port number "25" of the transmission destination. Accordingly, each communication log satisfies the first and second requirements. Furthermore, as is illustrated by the reference number P1m in FIG. 27, the communication log comparing unit 43 stores the aforementioned communication log in the master communication log table T21m in FIG. 27. Moreover, the blocks in which the aforementioned communication log exists are the three blocks (the number of blocks is three), which are the first block A20a, the second block B20b, and the third block C20c. Accordingly, the communication log comparing unit 43 stores "3" in the DC number column of the master communication log table T21m corresponding to the aforementioned communication log.

Also, for example, in the case of FIGS. 24 and 25, respective communication logs illustrated by reference numbers "P2a" and "P2b" include the IP address "192. 168. 1.37" of the transmission source, the port number "*****" of the transmission source, the IP address "192. 168. 1. 31" of the transmission destination, and the port number "2952" of the transmission destination. Accordingly, each communication log satisfies the first and second requirements. Furthermore, as is illustrated by the reference number P2m in FIG. 27, the communication log comparing unit 43 stores the aforementioned communication log in the master communication log table T21m in FIG. 27. Moreover, the blocks in which the aforementioned communication log exists are the two blocks (the number of blocks is two), which are the first block A20a and the second block B20b. Accordingly, the communication log comparing unit 43 stores "2" in the DC number column of the master communication log table T21m corresponding to the aforementioned communication log.

Also, for example, in the case of FIG. 26, the communication log illustrated by a reference number "P3c" includes the IP address "192. 168. 1. 37" of the transmission source, the port number "*****" of the transmission source, the IP address "192. 168. 1. 31" of the transmission destination, and the port number "2685" of the transmission destination. As is obvious in FIGS. 24 and 25, a communication log that corresponds to this communication log illustrated by the reference number "P3c" is not stored in the communication log table T21a and the communication log table T21b. In other words, this communication log does not correspond to any communication log in the entire communication logs. Accordingly, as illustrated by a reference number "P3m" in FIG. 27, the communication log comparing unit 43 stores this communication log in the master communication log table T21m in FIG. 27. Further, the communication log comparing unit 43 stores "1" in the DC number column of the master communication log table T21m corresponding to this communication log.

According to the above-described storage processing executed by the communication log comparing unit 43, the communication logs are stored in the transmission-source IP address column, the transmission-source port number column, the transmission-destination IP address column, and the transmission-destination port number column of the master communication log table T21m, and the numerical values are stored in the DC number column.

When the storage processing of the aforementioned communication logs and numerical values is completed, the communication log comparing unit 43 carries out the calculation of the certainty. More specifically, the communication log comparing unit 43 stores a value that is obtained by the numerical value divided by the number of entire blocks in which the operational verification has already been completed, in the certainty column corresponding to the numerical value stored in the DC number column of the master communication log table T21m. The number of entire blocks in which the operational verification has already been completed is also the total number of first device groups in which the operational verification has already been completed.

In the examples of FIGS. 24 to 26, the number of entire blocks in which the operational verification has already been completed is "3". Accordingly, when the numerical value stored in the DC number column of the master communication log table T21m is "3", the communication log comparing unit 43 stores "1" (3 (numerical value in the DC number column)/3 (the number of entire blocks in which the operational verification has already been completed)) on the line of the certainty column corresponding to the numerical value. Moreover, when the numerical value stored in the DC number column of the master communication log table T21m is "2", the communication log comparing unit 43 stores "2/3" (2 (numerical value in the DC number column)/3 (the number of entire blocks in which the operational verification has already been completed)) on the line of the certainty column corresponding to the numerical value.

At the time point when the storage processing of the certainty described in FIGS. 24 to 26 is completed, the correspondence presence column is in a state (blank) where nothing is stored.

(Operational Verification of Fourth Block D20d)

When the storage processing of the certainty described in FIGS. 24 to 26 is completed, as is described in the first embodiment, the administrator verifies whether the fourth block D20d appropriately operates prior to the operation of the fourth block D20d. Each server of the fourth block D20d stores various communication logs in its own device based on the operational verification. As is described in FIG. 10, the communication log acquiring unit 41 of the administration device 4 acquires the communication log from the fourth block D20d. The communication log shaping unit 42 stores the communication log acquired by the communication log acquiring unit 41 in the communication log table. As is described in FIG. 11, the communication log shaping unit 42 appropriately performs the merging processing at the time of storing the communication log.

FIG. 28 a table illustrating a state where the communication logs of the fourth block D20d are merged. A communication log table T21d in FIG. 28 includes the same columns as those of the communication log table described in FIG. 13. The communication log table T21d, for example, as is illustrated by the reference number "P1d", stores the IP address "192. 168. 1. 26" in the transmission-source IP address column, the port number "*****" in the transmission-source port number column, the IP address "192. 168. 1. 37" in the transmission-destination IP address column, and the port number "25" in the transmission-destination port number column. Further, the communication log table T21d, as is illustrated by the reference number "P1d", stores the state "OK" in the state column. It is noted that the reference number Ts in FIG. 5 illustrates a state where the communication log database DB1 in FIG. 5 stores the communication log table T21d.

Subsequently, the communication log comparing unit 43 executes the comparison of the communication logs, and the error detecting unit 44 executes the detection of the setting error associated with communications. At the time point prior to the detection of the setting error, the correspondence presence column is in a state (blank) where nothing is stored.

(Detection Processing of Setting Error)

Figure 29:
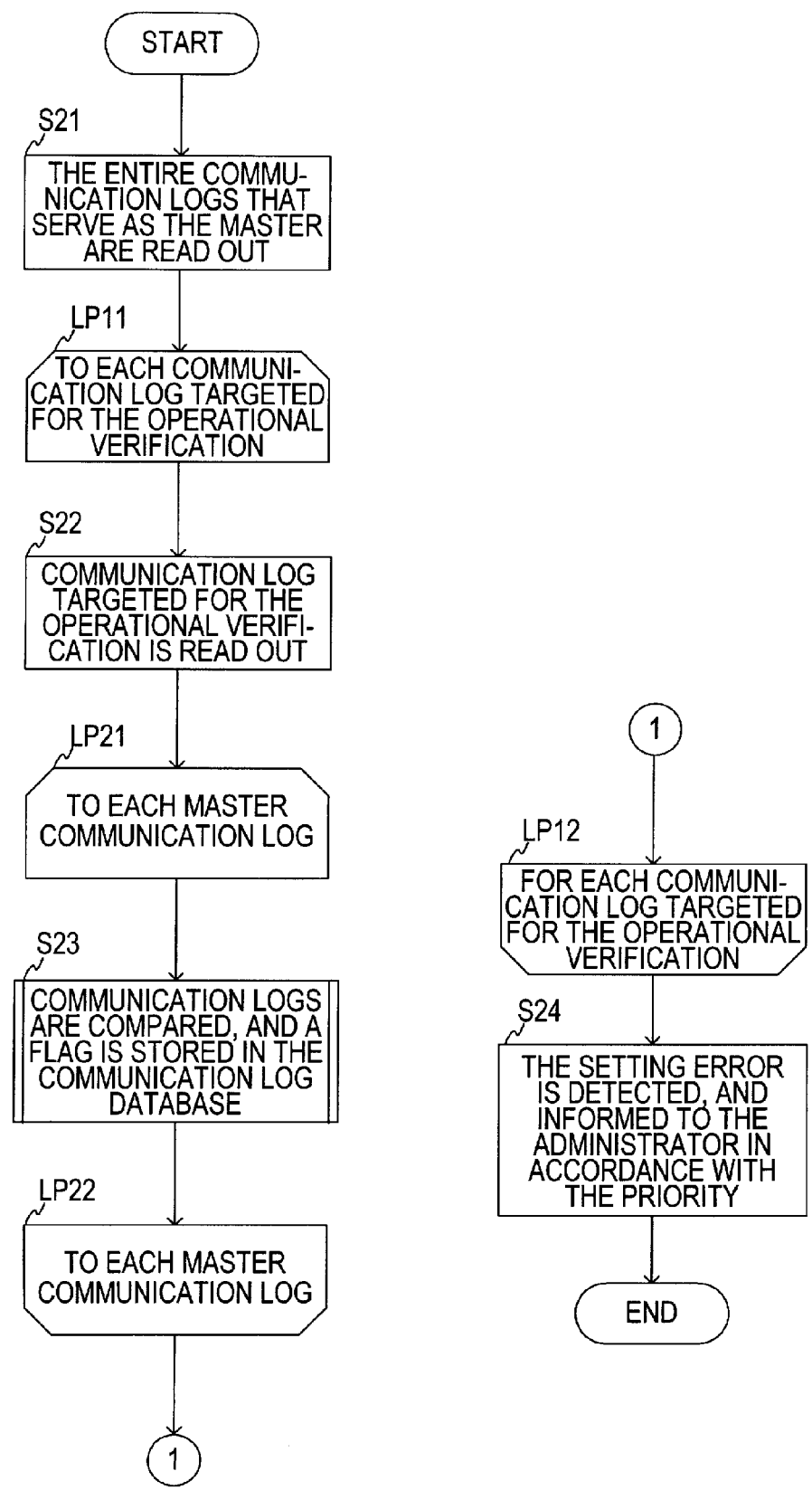
FIG. 29 is a second flowchart to explain the entire flow of the comparison processing of the communication logs and the detection processing for setting errors.

FIG. 29 is a second flowchart to describe the entire flow of the comparison processing of the communication logs and the detection processing for setting errors. In FIG. 29, the processing at the Steps S21 to S23 is similar to that of the Steps S11 to S13 described in FIG. 14.

Step S21: the communication log comparing unit 43 reads out the entire communication logs which serve as a master (reference) for the comparison processing from the communication log database DB1. Specifically, the communication log comparing unit 43 reads out the specific information (the IP addresses of the transmission source and the transmission destination and the port numbers of the transmission source and the transmission destination) of the entire communication logs stored in the master communication log table T21m in FIG. 27.

Step S22: the communication log comparing unit 43 reads out the communication log targeted for the operational verification, from the communication log database DB1. The communication log targeted for the operational verification is the communication log of the fourth block D20d. Specifically, the communication log comparing unit 43 reads out the specific information of the communication log, which has not been read out yet, from the specific information of the communication logs stored in the communication log table T21*d* in FIG. 28.

Step S23: the communication log comparing unit 43 compares the communication log targeted for the operational verification, which is read out at the Step S22, with each master communication log, and sets a flag, which indicates that both communication logs correspond to each other, to both communication logs. The processing at the Step S23 corresponds to the Step S13 in FIG. 14. The details of the Step 13 have been described in FIG. 15, and the description of the process at the Step S23 is omitted.

Step S24: the error detecting unit 44 detects the setting error associated with communications, and the notifying unit 45 notifies the administrator of the setting error associated with communications, which is detected by the error detecting unit 44 in accordance with the priority. Regarding the aforementioned notification, the notifying unit 45 preferentially notifies the administrator of the setting error associated with communications, with respect to the communication log having a high degree of certainty at the time of notifying the setting error.

The communication log comparing unit 43 executes the processing at the Step S22 and Step S23 until the communication log comparing unit 43 reads out all the communication logs from the communication log table T21*d* in FIG. 28 at the Step S22 (loops LP11 to LP12).

The processing of setting the flag (Step S23) will specifically be described referring to FIGS. 27 and 28. For example, as is described in FIG. 16, the communication log illustrated by the reference number "P1*m*" in FIG. 27 corresponds to the communication log illustrated by the reference number "P1*d*" in FIG. 28. Accordingly, the communication log comparing unit 43 stores "presence" of the flag in the correspondence presence column of the communication log.

In contrast, regarding the communication log illustrated by the reference number P2*m*, a communication log, in which its IP addresses respectively correspond to the IP address ("192. 168. 1. 37") of the transmission source and the IP address ("192. 168. 1. 31") of the transmission destination included in the communication log illustrated by the reference number "P2*m*", and its port number corresponds to the port number ("2952") of the transmission destination included in the communication log illustrated by the reference number "P2*m*", has not been stored in the communication log table T21*d* in FIG. 28. Accordingly, the communication log comparing unit 43 does not store "presence" (blank) of the flag in the correspondence presence column of the communication log.

When the aforementioned processing of setting the flag is completed, the error detecting unit 44 proceeds to the detection processing (see the first to third processing) of the setting error described in the first embodiment.

Specifically, the error detecting unit 44 detects the communication log in which IP addresses do not correspond to the IP addresses of the transmission source and the transmission destination included in the plurality of second communication logs, from the plurality of first communication logs, as the communication log having the setting error. Similarly, the error detecting unit 44 detects the communication log in which the IP addresses respectively correspond to the IP addresses of the transmission source and the transmission destination included in the plurality of second communication logs, but port numbers do not correspond to the port numbers of the transmission source and the transmission destination included in the plurality of first communication logs, from the plurality of first communication logs, as the communication log having the setting error. Further, the error detecting unit 44 detects the communication log in which the IP addresses do not correspond to the IP addresses of the transmission source and the transmission destination included in the plurality of first communication logs, from the plurality of second communication logs, as the communication log having the setting error. Similarly, the error detecting unit 44 detects the communication log in which the IP addresses respectively correspond to the IP addresses of the transmission source and the transmission destination included in the plurality of first communication logs, but port numbers do not correspond to the port numbers of the transmission source and the transmission destination included in the plurality of first communication logs, from the plurality of second communication logs, as the communication log having the setting error.

It is noted that the first communication logs, for example, are the communication logs regarding the network communication in the first device groups (the first block A20*a* to the third block C20*c*) in which the operational verification has already been completed. The second communication logs, for example, are the communication logs regarding the network communication in the second device groups (the fourth block D20*d*) targeted for the operational verification.

The error detecting unit 44 detects the setting error in the specific information associated with the communication log having the setting error, in the devices of the second device group.

Hereinafter, the detection processing and the notification processing for the setting error will be described. In the second embodiment, only the second detection processing described in the first embodiment will be described. In the examples of FIGS. 27 to 28, the error detecting unit 44 executes the processing (second detection processing) of detecting the presence or absence of communication executed only in the first device groups (the first block A20*a* to the third block C20*c*) in which the operational verification has already been completed. In other words, the error detecting unit 44 detects the communication log that exists only in the first device groups in which the operational verification has already been completed, as the communication log having the setting error.

Based on the second detection processing, the error detecting unit 44 detects a plurality of communication logs illustrated by the reference numbers P2*m* and P4*m* in FIG. 27, as the communication log that exists only in the first device groups in which the operational verification has already been completed.

As is described in the first embodiment, the notifying unit 45 informs the administrator that there occurs the setting error associated with the communication logs illustrated by the reference numbers "P2*m*" and "P4*m*" in FIG. 27. Specifically, when the error detecting unit 44 detects the communication logs having the plurality of the setting errors, the notifying unit 45 sequentially informs the administrator that there occur the setting errors in the specific information associated with the communication logs (see the reference numbers P2*m* and P4*m*) having the setting errors, for every communication log having the setting errors. The specific example regarding the content of the notification has been described in the first embodiment, and its description is omitted.

Thus, when there occur the plurality of the setting errors, it is preferable that the setting errors associated with the communication log having a high degree of importance, that is, a high degree of certainty be preferentially informed to the administrator. To be more specific, the certainty stored corresponding to the communication log of the first device group in which the operational verification has already been completed indicates the emergence frequency of the communication log with respect to the entire blocks in which the operational verification has already been completed. When the setting error is detected based on the results of comparison between the communication log having a high degree of emergence frequency, in other words, the communication log having a high degree of certainty (master communication log) and the communication log targeted for the operational verification, it is determined that it is requisite to rapidly correct the setting error. Then, the administration device 4 preferentially notifies the administrator of the setting error associated with the communication log having the high degree of certainty.

Accordingly, when the notifying unit 45 sequentially informs the administrator that there occurs the setting error, for every communication log having the setting error, the notifying unit 45 changes the orders of sequential notification based on the certainty of the first communication logs respectively corresponding to the communication logs having the setting error. In the examples of FIGS. 27 to 28, the first communication logs, respectively corresponding to the communication logs having the setting errors, are exemplified by communication logs illustrated by the reference numbers "P2m" and "P4m" in FIG. 27.

For example, the certainty of the communication log illustrated by the reference number "P2m" is "2/3", and the certainty of the communication log illustrated by the reference number "P4m" is "1". That is, the certainty of the communication log illustrated by the reference number "P4m" is higher than the certainty of the communication log illustrated by the reference number "P2m". Accordingly, after the notifying unit 45 informs the administrator that there occurs the setting error associated with the communication log illustrated by the reference number "P4m", the notifying unit 45 informs the administrator that there occurs the setting error associated with the communication log illustrated by the reference number "P2m".

According to the administration device of the second embodiment, when a magnitude of setting errors are detected, it is possible that the setting error is informed to the administrator in accordance with the priority. Accordingly, it is not requisite for the administrator to determine the correction order of the setting errors by himself, so that the setting errors can be corrected in accordance with the priority informed by the administration device.

[Third Embodiment of Administration Device]

In the administration device of the third embodiment, the number of times of communication (also referred to as "the number of times to be used") that indicates the number of times of execution of communication associated with the first communication log is reflected on the certainty of the first communication log described in the second embodiment. The meaning of the number of times of communication will be described later. The description of the third embodiment is based on the presumption that the hardware block diagram in FIG. 22 and the server correspondence table TR2 in FIG. 23 described in the second embodiment are provided.

First, the number of times of communication will be described based on FIG. 4. The communication software 2022 of the server SVR in FIG. 4 generates communication packets in which the IP address of the transmission source is "x1. y1. z1. w1", and the port number of the transmission source is "p1", and the IP address of the transmission destination is "x2 . y2 . z2. w2", and the port number of the transmission destination is "p2". Then, the communication software 2022 transmits the communication packets to other server in which the IP address "x2. y2. z2. w2" of the transmission destination is set. The communication software 2022 counts the number of times of transmission of the communication packets as the number of times of communication and stores the number of times in the communication log. For example, when the communication software 2022 transmits one hundred of communication packets, the communication software 2022 counts the number of times of communication as one hundred. When reply packets are transmitted from other servers to the SVR server, the number of reply packets may be included in the number of times of communication.

Furthermore, for example, the number of times of sessions established between the communication software 2022 of the SVR server and the communication software of other server may be provided as the number of times of communication. For example, when the sessions are established ten times between the communication software 2022 of the SVR server and the communication software of other server, the ten times serves as the number of times of communication.

As is described in the second embodiment, the administration device 4 acquires the communication logs and executes the merging of the communication logs to be acquired. When Cn sets (Cn is an integer of two or more) of communication logs are merged into one communication log, the communication log shaping unit 42 of the administration device 4 counts the sum of the number of times of communication of Cn sets of communication logs, as the number of times of communication of one merged communication log.

FIG. 30 is a table illustrating a state where the communication logs of the first block A20a are merged, and the IP addresses are appropriately converted, as another example. A communication log table T31a in FIG. 30 is a table in which a communication number-of-times column is added to the communication log table T21a in FIG. 24.

As is described in FIG. 10, the communication log acquiring unit 41 acquires the communication log from the first block A20a.

Herein, it is assumed that the communication software (not illustrated) of the server of the first block A20a generates a first communication log that includes the IP address "192. 168. 1. 26" of the transmission source, the port number "58394" of the transmission source, the IP address "192. 168. 1. 37" of the transmission destination, the port number "25" of the transmission destination, and the number of times "eight times" of communication. Further, it is assumed that the communication software (not illustrated) of the server of the first block A20a generates a second communication log that includes the IP address "192. 168. 1. 26" of the transmission source, the port number "58413" of the transmission source, the IP address "192. 168. 1. 37" of the transmission destination, the port number "25" of the transmission destination, and the number "four times" of times of communication.

As is described in FIGS. 11 and 24, the communication log shaping unit 42 merges the first communication log with the second communication log and stores the merged communication log in the communication log table T31a in FIG. 30, as illustrated by the reference number P1a. In the aforementioned storage, the communication log shaping unit 42 stores the communication log in the communication log table T31a in FIG. 30, as illustrated by the reference number P1a, in such a manner that 12 (=8+4) is stored in the communication number-of-times column of the communication log table T31a.

Further, after the completion of the merging the communication logs, the communication log comparing unit 43 converts the IP addresses stored in the transmission-source IP address column and the transmission-destination IP address column in the communication log table T21a in FIG. 24, into IP addresses corresponding to the second device group targeted for the operational verification (for example, the fourth block D) based on the server correspondence table TR2 in FIG. 23. The detail of the conversion has been described in FIG. 24, and therefore, and its description is omitted.

Figure 31:
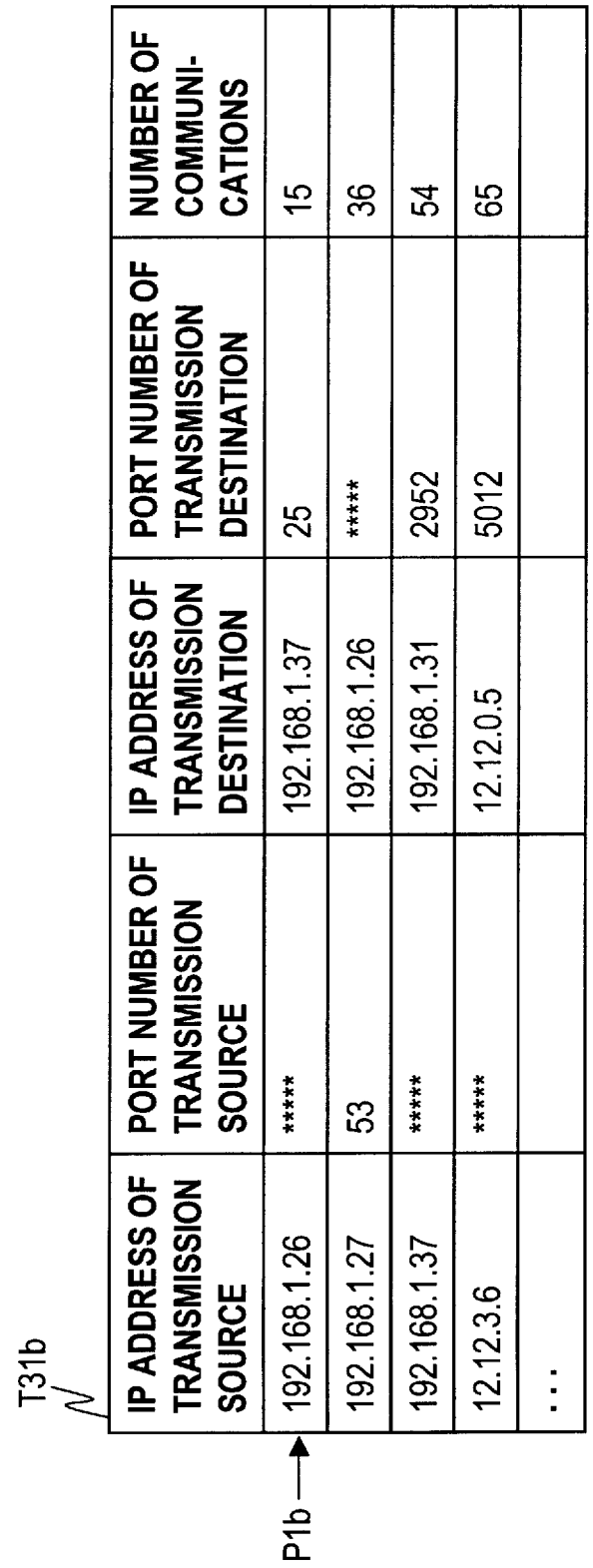
FIG. 31 is a diagram illustrating a table illustrating a state where the communication logs of the second block B20*b* are merged, and the IP addresses are appropriately converted, as another example.

FIG. 31 is a table illustrating a state where the communication logs of the second block B20b are merged, and the IP addresses are appropriately converted, as another example. As is described in FIG. 10, the communication log acquiring unit 41 acquires the communication logs from the second block B20b. Then, the communication log shaping unit 42 performs the storage processing and the merging processing of the communication logs to be acquired and the conversion processing of the IP addresses, and for example, generates the communication log table T31b in FIG. 31.

FIG. 32 is a table illustrating a state where the communication logs of the third block C20c are merged, and the IP addresses are appropriately converted, as another example. As is described in FIG. 10, the communication log acquiring unit 41 acquires the communication logs from the third block C20c. Then, the communication log shaping unit 42 performs the storage processing and the merging processing of the communication logs to be acquired and the conversion processing of the IP addresses, and for example, generates the communication log table T31c in FIG. 32.

At the time point when the storage processing of the number of times to be used, which described in FIGS. 30 to 32, is completed, the correspondence presence column is in a state (blank) where nothing is stored. The reference number "To" in FIG. 5 illustrates a state where the communication log database DB1 in FIG. 5 stores the communication log tables T31a, T31b, and T31c.

(Generation of Master Communication Log Table)

FIG. 33 is a table illustrating a state where a master communication log is stored, as one example. A master communication log table T31m is a table in which the communication number-of-times column is added to the master communication log table T21m in FIG. 27.

Herein, according to the processing described in FIG. 27, the communication log comparing unit 43 stores data in respective columns except the communication number-of-times column and the correspondence presence column of the master communication log table T31m in FIG. 33. Herein, when there are a plurality of communication logs that correspond to each other, as described in FIG. 27, in the communication logs of the first block A20a to the third block C20c, the communication log comparing unit 43 calculates the sum of the number of times of communication of the plurality of communication logs that correspond to each other. Then, as is described in FIG. 27, the communication log comparing unit 43 merges the communication logs that correspond to each other and stores the merged communication logs in the master communication log table T31m in FIG. 33. In the aforementioned storage, the communication log comparing unit 43 stores the sum to be calculated in the communication number-of-times column of the master communication log table T31m.

When there are communication logs that do not correspond to each other, as described in FIG. 27, in the communication logs of the first block A20a to the third block C20c, the communication log comparing unit 43 stores the number of times of communication of the communication log in the communication number-of-times column of the master communication log table T31m at the time of storing the communication logs in the master communication log table T31m in FIG. 33.

Lastly, in the master communication log table T31m in FIG. 33, the communication log comparing unit 43 multiplies the certainty stored in the certainty column by the number of times of communication in the communication number-of-times column stored on the same line as that of the certainty, and updates the multiplied value on the certainty stored in the certainty column. A numerical value in parentheses in the certainty column of the master communication log table T31m in FIG. 33 represents a numerical value prior to the updating.

For example, in the cases of FIGS. 30 to 32, respective communication logs illustrated by the reference numbers "P1a", "P1b", and "P1c" include the IP address "192. 168. 1. 26" of the transmission source, the port number "*****" of the transmission source, the IP address "192. 168. 1. 37" of the transmission destination, and the port number of "25" of the transmission destination. Accordingly, respective communication logs satisfy the first and second requirements (see the description regarding FIG. 27). Therefore, as is illustrated by the reference number P1m in FIG. 33, the communication log comparing unit 43 stores the aforementioned communication logs in the master communication log table T31m in FIG. 33. Furthermore, the blocks, in which the aforementioned communication logs exist, are three blocks (the number of blocks is three) such as the first block A20a, the second block B20b, and the third block C20c. Accordingly, the communication log comparing unit 43 stores "3" in the DC number column of the master communication log table T21m corresponding to the aforementioned communication log. Then, the communication log comparing unit 43 stores "1" (3 (numerical value in the DC number column)/3 (the number of entire blocks in which the operational verification has already been completed)) in the certainty column of the master communication log table T21m. Further, the numbers of times of communication in the aforementioned communication logs are respectively "12", "15", and "11", so that the communication log comparing unit 43 stores "38", which is the sum of the numbers of times of communication, in the communication number-of-times column of the master communication log table T21m corresponding to the aforementioned communication log.

Then, the communication log comparing unit 43 multiplies the certainty "1" by the number of times of communication "38" and rewrites the multiplied value "38" corresponding to the certainty "1". At the time point when the rewriting processing of the certainty described in FIG. 33 is completed, the correspondence presence column is in a state (blank) where nothing is stored.

(Operational Verification of Fourth Block D20d)

When the storage processing of the certainty described in FIGS. 30 to 32 is completed, as is described in the first and second embodiments, the administrator verifies whether the fourth block D20d appropriately operates prior to the management of the fourth block D20d. Each server of the fourth block D20d stores various communication logs in its own device based on the operational verification. As is described in FIG. 10, the communication log acquiring unit 41 of the administration device 4 acquires the communication log from the fourth block D20d. The communication log shaping unit 42 stores the communication log acquired by the communication log acquiring unit 41 in the communication log table. As is described in FIG. 11, the communication log shaping unit 42 appropriately performs the merging processing at the time of storing the communication log. As a result, the communication log shaping unit 42 generates the communication log table T21d described in FIG. 28.

Subsequently, the communication log comparing unit 43 executes the comparison of the communication logs, and the error detecting unit 44 executes the detection of the setting error associated with communications. The detail of the detection processing has been described in the second embodiment, and accordingly, its description is omitted.

According to the administration device of the embodiments, the number of times of communication of the communication log is reflected on the certainty of the communication log. As a result, it is possible to determine the priority correctly.

[Fourth Embodiment of Administration Device]

The administration device in the embodiment performs clustering of the communication log of the setting error candidate and displays the clustered communication log to the administrator in order that the administrator efficiently performs investigation of the setting error factor. The detail will be described as below. When building additional large data center, there is a case that same application program and middleware are set to a plurality of devices (for example, a server and a switch).

In order to make a setting efficiency with a high, there is a case that the administrator creates script file for setting and performs the created script file for setting to install the application program and middleware to the plurality of devices in one lump. Also, in order to make a setting efficiency with a high, there is a case that the administrator installs the application program and middleware to the plurality of devices in one lump by referring to a setting manual which was created in advance.

Here, it is assumed that there is an error description in a part of the script file or the manual for setting. When the administrator performs the script file for setting which has error description or installs the application program and middleware to the plurality of devices by referring to the setting manual which has error description, there is a case that the setting error of the communication relating information is occurred to the plurality of devices due to same factor.

For example, there is a script file (as described by script file X as below) which sets an application program (below, as described by application X) that utilize the port number "161" to twenty number of devices. Here, it is assumed that setting command, which sets the application X to four number of devices that have been set the IP addresses "12. 0. 0. 3", "12. 0. 0. 6", "12. 1. 2. 11" and "12. 1. 2. 12" respectively, is omitted in the script file X, due to the description error, for example.

In this case, when the administrator executes the script file X to the devices of the second device group (for example, the second block B20b in FIG. 2), it is not executed to set the application X to the aforementioned four number of devices.

In this case, two status is considered as below. The first state is that the corresponding four devices to the above four devices in the first device group (for example, the first block A20a in FIG. 2) which has already verified the operation is appropriately set and execute the application X. The second state is that the four devices in the second block B20b do not execute the application X because the four devices have not been set the application X.

When two status are established and the operation verification as explained by the first embodiment is performed and when the four devices in the first block A20a in FIG. 2 performs communication to the other devices, the communication logs are recorded into the four devices in the first block A20a. Note that the other devices is devices in which the IP address "12. 0. 3. 7" is set, for example.

Accordingly, as described in the first embodiment, these communication logs are informed to the administrator as the setting error candidate.

The administrator looks at these communication logs, finds the setting error factor of the communication relating information of each of the four devices and corrects the error factor. In this case, when the administration device 4 integrates the setting errors of the communication relating information due to same factor into one and displays the integrated setting error, it is possible that the administrator finds the setting error factor which is integrated about four devices and efficiently performs the investigation of the setting error factor. Below, the administration device will be explained.

(Block Diagram of Hardware and Software Module in Administration Device)

Figure 34:
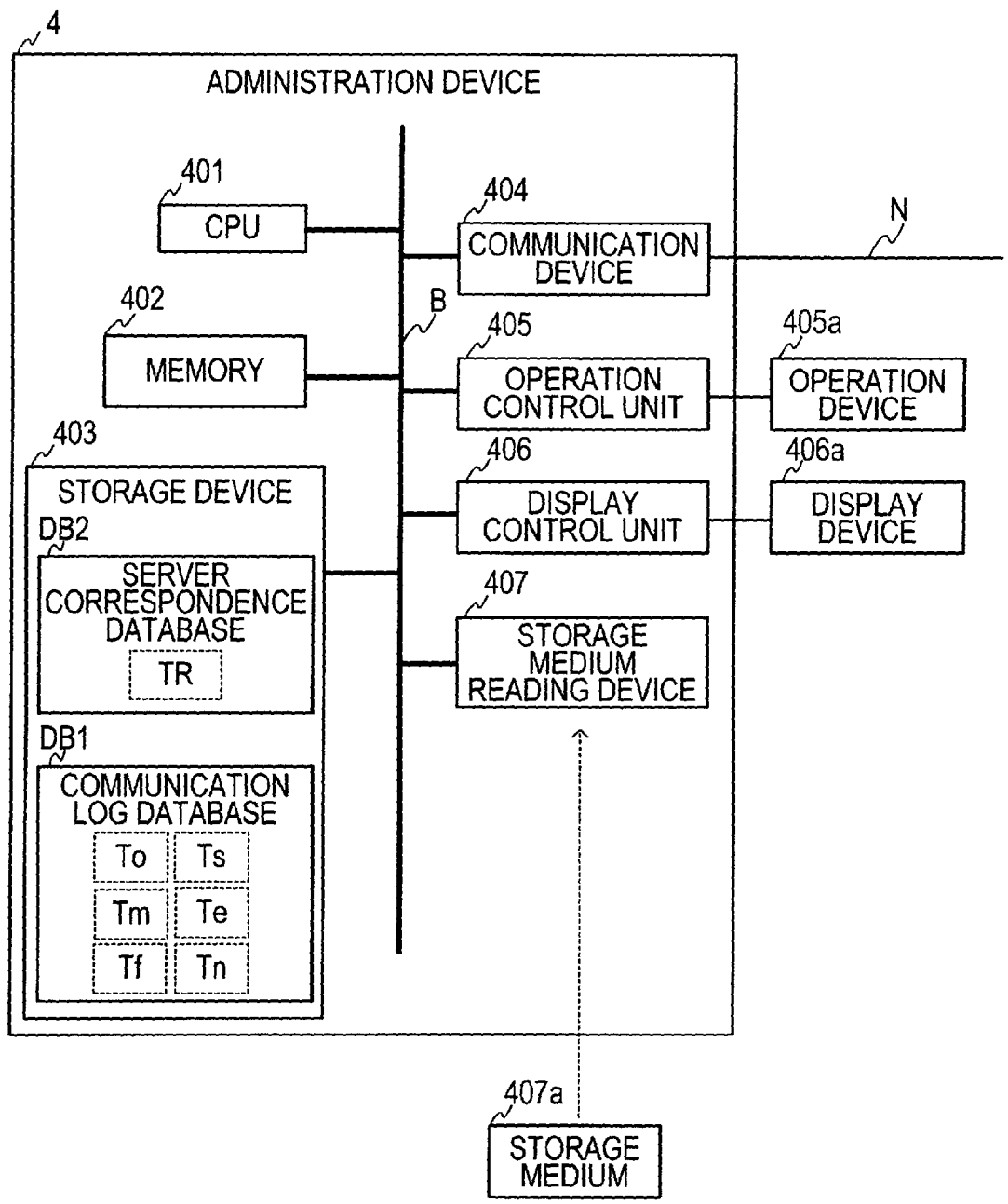
FIG. 34 is a hardware block diagram to explain an administration device as another example.
Figure 35:
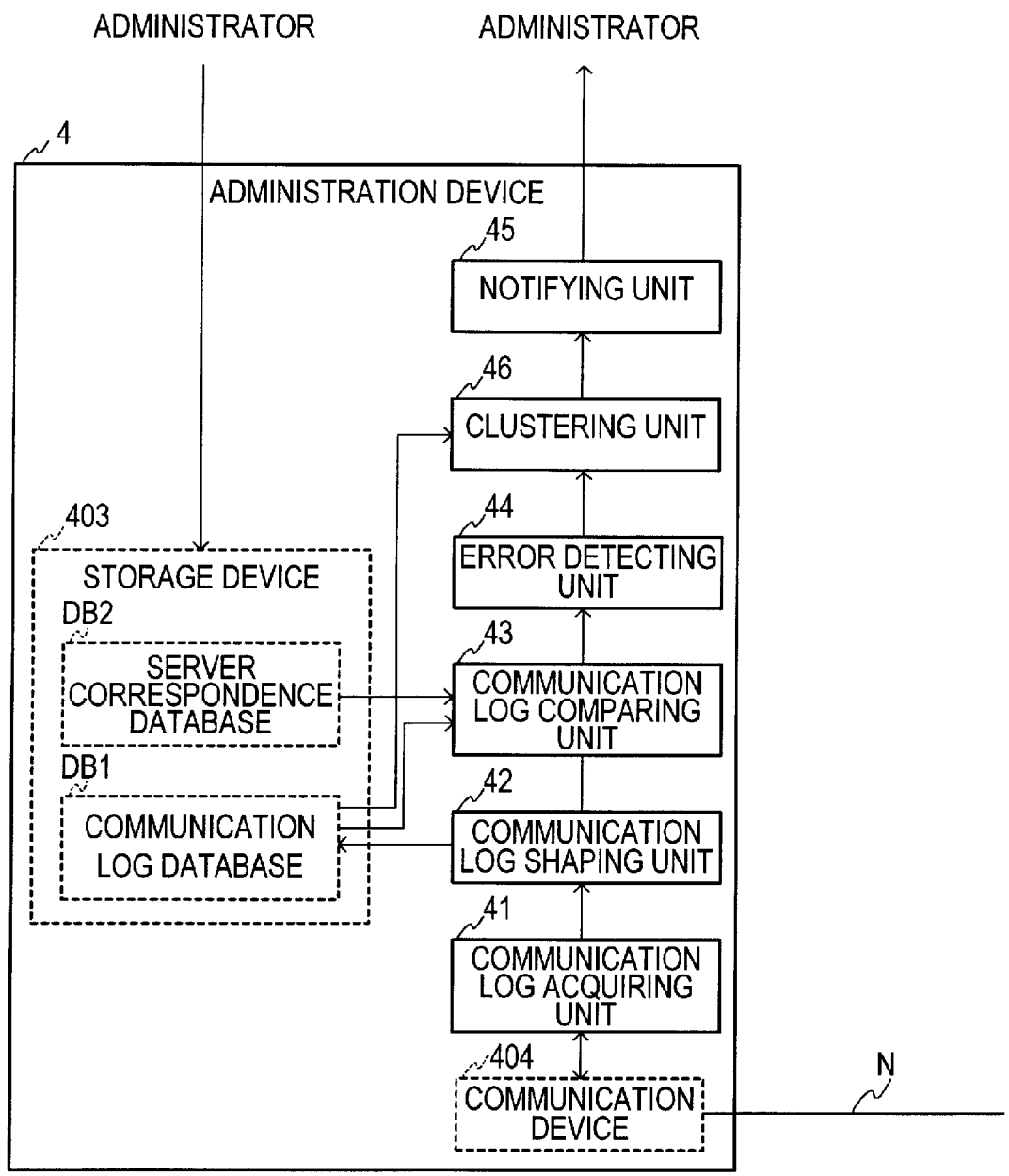
FIG. 35 is a block diagram of a software module of the administration device in FIG. 34.

FIG. 34 is a hardware block diagram to explain an administration device of the fourth embodiment. In the administration device 4 in FIG. 34, same elements as that described in FIG. 1 are same reference number and tables Te, Tf, Tn are added to the storage device 403 in the administration device 4 illustrated in FIG. 1. FIG. 35 is a block diagram of a software module of the administration device in FIG. 34 as another example. As described in the first embodiment, the error detecting unit 44 refers to the comparison result of the communication log and outputs the communication log of the setting error candidate to a clustering unit 46.

The clustering unit 46 sorts (referred to as clustering) the detected setting error candidates according to the similarity of the specify information included in the communication log of the setting error candidates (also referred to communication log of a setting error) of which the error detecting unit 44 detects. In other words, in the fourth embodiment, the specify information is information that can specify he communication content. For example, the information that can identify the communication content is information such as a port number, a number of communication, and amount of communication data. Below, the port number is exampled as the information that can specify the communication contents. When using the port number, it is possible to specify the communication content from the port number; because the port number corresponds to service such as applications and middleware which use the port number.

In other words, the clustering unit 46 aggregates the communication log of the setting error candidates having a common feature of the communication content. It is preferred that the information for specifying the communication content is information which do not require complex processing to obtain.

The clustering unit 46 shapes the communication log of the setting error candidate entered from the error detecting unit 44 as a preliminary step for performing clustering. The communication log of the setting error candidate includes at least of the IP address of the transmission source, the port number of the transmission source, and the IP address of the transmission destination.

Below, One server among the servers, which are set the IP address of the transmission source or the IP address of the transmission destination included in the communication log of the setting error candidate, is referred to as a target server, For example, the target server is a server that is set the IP address "12.0.3.7".

(Communication Log of Setting Error Candidates)

FIG. 36 is a table illustrating a communication log of the setting error candidates including the IP address of the target server.

The setting error candidate table Te11 in FIG. 36 is a table illustrating the communication log of the setting error candidate including the IP address "12.0.3.7" of the target server. For example, the communication log of the setting error candidate stored in the setting error candidate table Te11 is a communication log that exists only in the first block A20*a* which is described in the first embodiment of the administration device.

The setting errors candidate table Te11 has the IP address of the transmission source field, the port number of the transmission source field, the IP address of the transmission destination field, and the port number of the transmission destination field. The IP address of the transmission source field is stored the IP address of the transmission source included in the communication log of the setting error candidate. The port number of the transmission source field is stored the port number of the transmission source included in the communication log of the setting error candidate. The IP address of the transmission destination field is stored the IP address of the transmission destination included in the communication log of the setting error candidate. The port number of the transmission destination field is stored the port number of the transmission destination included in the communication log of the setting error candidate.

The setting error candidate table Te11 stores the IP address of the transmission source, the port number of the transmission source, the IP address of the transmission destination and the port number of the transmission destination included in one communication log of the setting error candidate, in one line.

For example, the communication log of the setting error candidate depicted by a reference number "P31" is a communication log including the IP address "12.0.3.7" of the transmission source, the port number of transmission source "***", the IP address of the transmission destination "12.0.0.3" and the port number of the transmission destination "161". The number "*" schematically depicts a state that the port number is merged, as described in FIG. 11**.

The reference "Te" in FIG. 34 depicts a state that the communication log database DB1 in FIG. 34 stores the setting error candidate table Te1.

Figure 37:
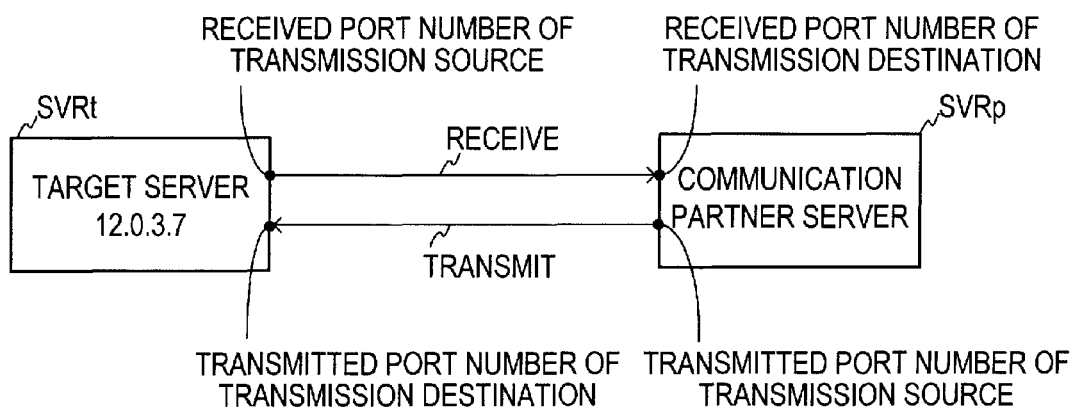
FIG. 37 is a diagram illustrating a diagram to explain definitions to use when explaining a clustering, as one example.

FIG. 37 is a an example of a diagram for explaining the terminology used in describing the clustering mentioned above. Below, a server of the communication partner of the target server is depicted by as a partner server.

FIG. 37 illustrates a state where the target server SVRt and the partner server SVRp send and receive communication packets each other. The IP address "12.0.3.7" is set in the target server SVRt.

A first case is that the partner server SVRp received the communication packet which was sent from the target server SVRt (referring to an arrow of "receive" from left to right in the drawing), In the first case, the port number used when the target server SVRt sent the communication log is called to as received port number of the transmission source. And the port number used when the partner server SVRp received the communication log is called to as received port number of the transmission destination.

In addition, a second case is that the partner server SVRp sent the communication packet to target server SVRt and the target server SVRt received the communication packet (referring to an arrow of "transmit" from right to left in the drawing). In the second case, the port number used when the partner server SVRp sent the communication log is called to as transmitted port number of the transmission source. And the port number used when the target server SVRt received the communication log is called as transmitted port number of the transmission destination.

(Shaping of Communication Log of Setting Error Candidates)

When communication with the target server SVRt and the partner server SVRp is performed, the setting error candidate table Te1 in FIG. 36 has the communication logs of a first type and a second type as below. The first type communication log is a communication log which is stored when the partner server VRp sends a communication packet to the target server SVRt. Second type communication log is a communication log stored when the target server SVRt sends a communication packet to the partner server SVRp. That is, the communication log in the communication between the target server SVRt and the partner server SVRp are stored in the setting error candidate table Te11 in FIG. 36 in the double.

For example, the IP address "12.0.3.7" is set to the target server SVRt, and the IP address "12.0.0.3" is set to the partner server SVRp. In this case, the target server SVRt and the partner server SVRp are devices (servers) in the first device group which has been verified the operation (for example, the first block A20*a* in FIG. 2). Then, the communication between the target server SVRt and the partner server SVRp is performed and the communication is success.

Further, in the devices of the second device group which is a target of operation verification (for example, the second block B20*b* in FIG. 2), the communication between the servers with the same function as the target server SVRt and the partner server SVRp has not been performed, because of the setting error in the communication-related information.

When the communication between the partner server SVRp and the target server SVRt in the first block A20*a* is successful, the communication logs "P31" and "P35" are stored in the setting error candidate table Te11.

The communication log "P31" is stored when the target server SVRt sent a communication packet to the partner server SVRp. The communication log "P35" is stored when the partner server SVRp sent the communication packet to the target server SVRt.

In addition, the communication log "P35" includes the IP address of transmission source "12.0.0.3", the port number of transmission source "161", the IP address of transmission destination "12.0.3.7", and the port number of transmission destination "*****".

Next, the IP address "12.0.3.7" is set to the target server SVRt, and the IP address "12.0.0.5" is set to the partner server SVRp. In this case, the target server SVRt and the partner server SVRp are servers in the first block A20*a* in FIG. 2.

In this case, when a communication from the partner server SVRp to the target server SVRt was successful, but a communication from the target server SVRt to the partner server SVRp was not successful, only communication log "P32" is stored in the setting error candidate table Te11. here, in the second block B20*b* in FIG. 2, the communication between the servers with the same function as the target server SVRt and the partner server SVRp has not been performed, because of the setting error in the communication-related information.

Below, in the server-to-server communication, a case that the communication from the first server to the second server was successful, but the communication from the second server to the first server was not successful, is referred to as appropriate success of only one side communication.

For example, the clustering unit 46, which clusters communication logs of the setting error candidates according to the similarity of the port number, performs the following process as a front step of performing the clustering.

The clustering unit 46 extracts the communication logs stored, by performing a communication with target server SVRt and the partner server SVRp, from among the communication logs of the setting error candidates which were detected by the error detecting unit 44 and integrates the extracted communication logs for each IP address that is set in the partner server SVRp, based on the target server SVRt.

Specifically, the clustering unit 46 gathers the communication logs of the setting error candidate, which are stored in the double, in a single communication log. Further, the clustering unit 46 stores the one side communication for the success of only one side communication. Below, cases to gather the communication logs of the setting error candidate, which are stored in the double, in a single communication log, and to store the one side communication, is referred to as appropriate shaping of communication log.

Figure 38:
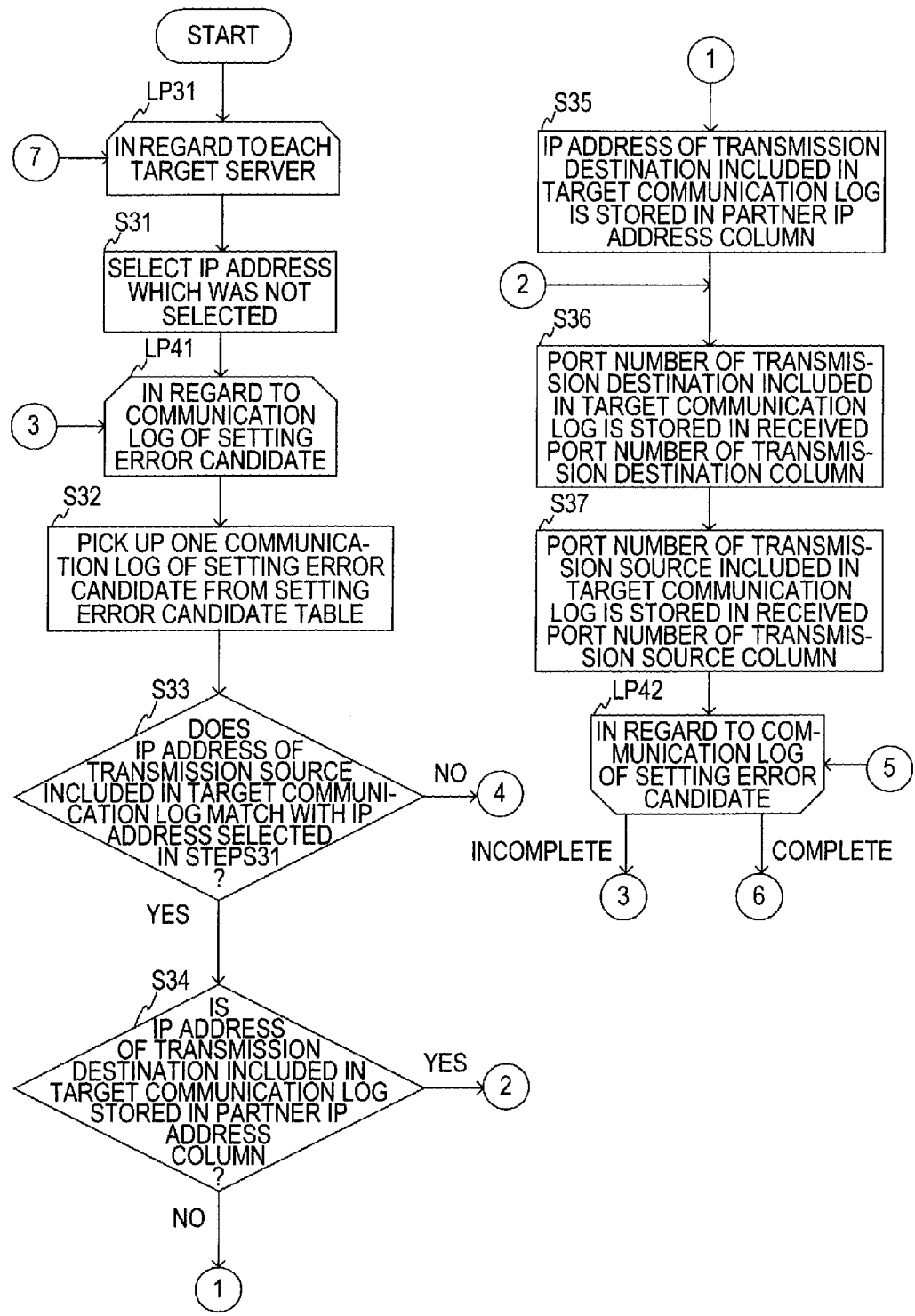
FIG. 38 is a first flow diagram to explain a shaping process in which the clustering unit executes.
Figure 39A:
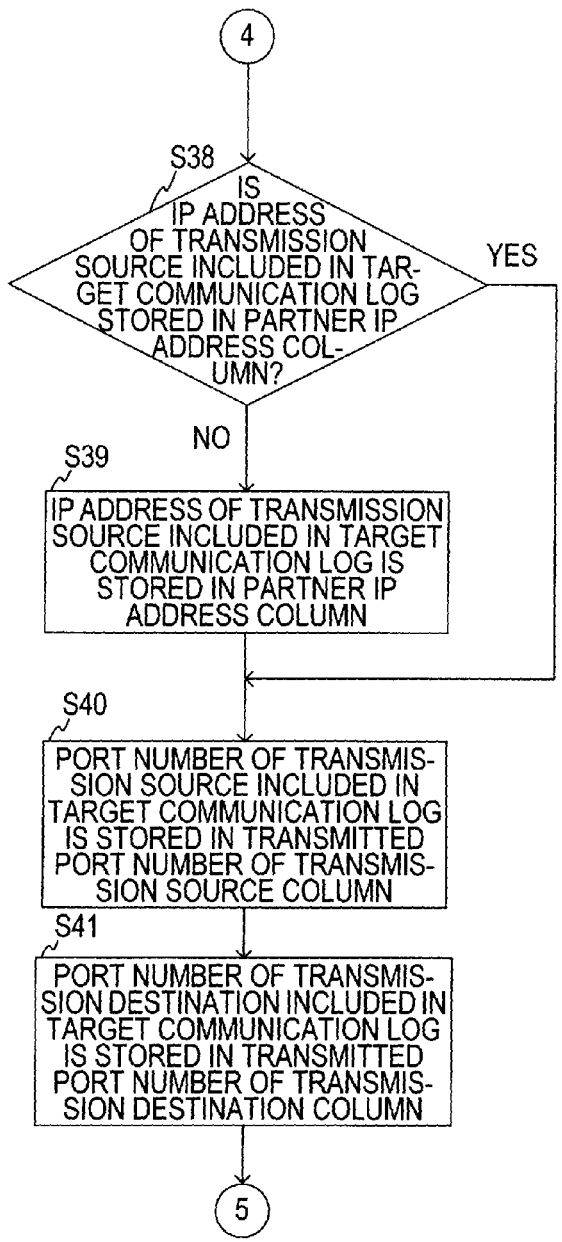
FIG. 39A is a second flow diagram to explain a shaping process in which the clustering unit executes.
Figure 39B:
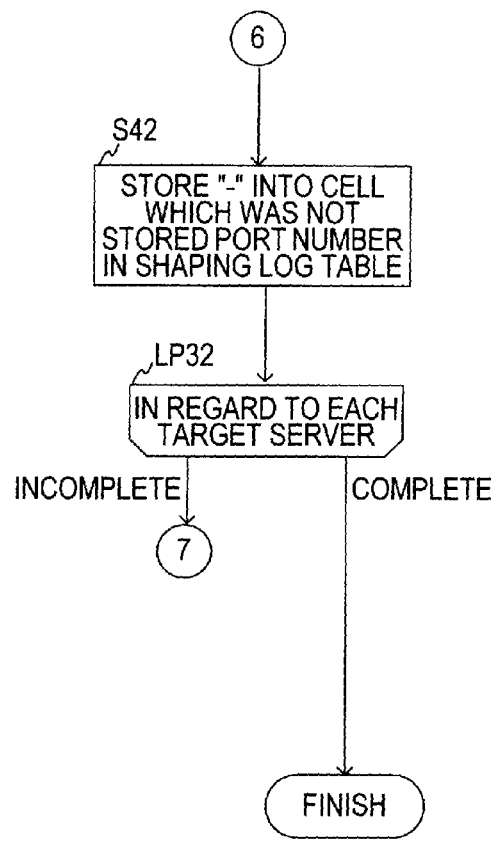
FIG. 39B is a third flow diagram to explain a shaping process in which the clustering unit executes.

FIG. 38, FIG. 39A and FIG. 39B are first and second flow diagrams illustrating the shaping process in which the clustering unit 46 performs. FIG. 40 is a diagram illustrating an example of a table for storing the communication log of the setting error candidates which were shaped, That is, FIG. 40 illustrates a state that the communication log after gathering the communication log that was extracted for each IP address that are set to the partner server SVRp is stored in a table format.

The shaping log table Tf1 in FIG. 40 includes the IP address of the partner field, the transmitted port number of transmission source field, the transmitted port number of transmission destination field, the received port number of transmission source field, and the received port number of transmission destination field.

The partner IP address field is stored the IP address which is set to the partner server SVRp (referring to FIG. 37) which is a communication partner for the target server SVRt (referring to FIG. 37). The transmitted port number of the transmission source field is stored the port number of the transmission source of the partner server SVRp when transmitting. The transmitted port number of the transmission destination field is stored the port number of the transmission destination of the partner server SVRt when transmitting. The received port number of the transmission source field is stored the port number of the transmission source of the partner server SVRp when receiving. The received port number of the transmission destination field is stored the port number of the transmission destination of the partner server SVRt when receiving.

The shaping process that the clustering unit 46 performs will be explained with reference to FIG. 38 to FIG. 40. In addition, at the time of starting the step S31 in FIG. 38, the fields in the shaping log table Tf1 in FIG. 40, the IP address and the port number is not stored.

Step S31 in FIG. 38: The clustering section 46 selects the IP address which has not been selected from the communication logs of the setting error candidates which were output from the error detecting section 44. The clustering unit 46 stores the communication log of the setting error candidate including selected IP address from the communication logs of the setting error candidates which were output from the error detecting section 44, into the storage device 403 (referring to FIG. 5). For example, in the case of the IP address "12.0.3.7" which has been not selected, the clustering unit 46 stores the communication log of the setting error candidate including the IP address "12.0.3.7" into the storage unit 403. A table that stores the communication log of the setting error candidate including the IP address "12.0.3.7" illustrates a setting error candidate table Te11 in FIG. 36, for example.

Step S32: The clustering unit 46 picks up one communication log of the setting error candidate from the setting error candidate table Te11 in FIG. 36, and then stores it in the memory 402. Below, the communication log of the setting error candidate which was picked up in step S32 is referred to as appropriate target communication log.

Every time the clustering unit 46 executes the Step S32, for example, the clustering section 46 picks up one of the communication log of the setting error candidate toward the bottom of field from the communication log P31 of the setting error candidate which was stored in the uppermost in the setting error candidate table Te11, and stores it into the memory 402.

Step S33: The clustering unit 46 determines whether the IP address of the transmission source included in the target communication log matches with the IP address selected in the step S31. When a match is determined in the step S33 (step S33/YES), the process proceeds to the step S34.

Step S34: the clustering section 46 determines whether the IP address of transmission destination that is included in the target communication log is stored in the partner IP address field in the shaping log table Tf1 of FIG. 40. When the IP address is not stored in the Step S34 (step S34/NO), the process proceeds to the step S35.

Step S35 the clustering section 46 stores the IP address of transmission destination that is included in the target communication log into the partner IP address field in the shaping log table Tf1 of FIG. 40.

Here, when the IP address is stored in step S34 (step S34/YES), or when the process in Step S35 completes, the process proceeds to step S36.

Step S36: the clustering section 46 stores the port number of transmission destination that is included in the target communication log into the received port number of the transmission destination field in the shaping log table Tf1. More specifically, when it is determined YES in step S34, the clustering section 46 stores the port number of transmission destination, that is included in the target communication log, into a cell of which column of the received port number of transmission destination intersects to row of the cell stored the IP address of transmission destination included in the target communication log in the shaping log table Tf1. In addition, when the cell has been already stored the port number (including "***"), the clustering unit 46 stores the "***" in place of the port number.

On the other hand, when the clustering section 46 executes the step S35, the clustering section 46 stores the port number of transmission destination that is included in the target communication log, into a cell of which column of the received port number of transmission destination intersects to row of the cell stored the IP address of transmission destination in the step S35 in the shaping log table Tf1.

Step S37: the clustering section 46 stores the port number of transmission source, that is included in the target communication log, into, the received port number of transmission source in the shaping log table Tf1. More specifically, when it is determined YES in step S34, the clustering section 46 stores the port number of transmission source, that is included in the target communication log, into a cell of which column of the received port number of transmission source intersects to row of the cell stored the IP address of transmission source included in the target communication log in the shaping log table Tf1. In addition, when the cell has been already stored the port number (including "***"), the clustering unit 46 stores the "***" in place of the port number.

On the other hand, when the clustering unit 46 executes the step S35, the clustering unit 46 stores the port number of transmission source that is included in the target communication log, into a cell of which column of the received port number of transmission source intersects to row of the cell stored the IP address of transmission destination in the step S35 in the shaping log table Tf1.

In step S33, when it is determined that the IP address of the transmission source included in the target communication log does not match with the selected IP address at step S31 (step S33/NO), the process proceeds to Step S38 in FIG. 39A.

Step S38 in FIG. 39: The clustering unit 46 determines whether the IP address of transmission source, that is included in the target communication log, is stored in address column of the partner IP address of the shaping log table Tf1 in FIG. 40. When it is determined that the IP address of transmission source is not stored in FIG. 38 (step S38/NO), the process proceeds to step S39.

Step S39: the clustering unit 46 stores the IP address of transmission source that is included in the target communication log into the address column of the partner IP address of the shaping log table Tf1 in FIG. 40.

Step S40: the clustering unit 46 stores the port number of transmission source that is included in the target communication log into the transmitted port number of transmission source column the shaping log table Tf1 in FIG. 40. More specifically, in case that it is determined YES in step S38, the clustering unit 46 stores the port number of transmission source that is included in the target communication log, into a cell of which column of the transmitted port number of transmission source intersects to row of the cell stored the IP address of transmission destination in the step S35 in the shaping log table Tf1. In addition, when the cell has been already stored the port number (including "***"), the clustering unit 46 stores the "***" in place of the port number.

On the other hand, when the clustering unit 46 executes the step S39, the clustering unit 46 stores the port number of transmission source that is included in the target communication log, into a cell of which column of the received port number of transmission source intersects to row of the cell stored the IP address of transmission destination in the step S39 in the shaping log table Tf1.

Step S41: the clustering unit 46 stores the port number of transmission destination that is included in the target communication log into the column of the transmitted port number of the transmission destination in the shaping log table Tf1 in FIG. 40. More specifically, in case that it is determined YES in step S38, the clustering unit 46 stores the port number of transmission destination that is included in the target communication log, into a cell of which column of the transmitted port number of transmission destination intersects to row of the cell stored the IP address of transmission source in the step S35 in the shaping log table Tf1. In addition, when the cell has been already stored the port number (including "***"), the clustering unit 46 stores the "***" in place of the port number.

On the other hand, when the clustering unit 46 executes the step S39, the clustering unit 46 stores the port number of transmission destination that is included in the target communication log, into a cell of which column of the transmitted port number of transmission destination intersects to row of the cell stored the IP address of transmission source in the step S39 in the shaping log table Tf1.

The processes of Step S37 in FIG. 38 and Step S41 in FIG. 39 for all communication log of setting error candidates is not completed (not complete in loop LP 42), the process of loop S42 moves to the process of loop S41, and the clustering unit 46 again executes the step S32 and its following step.

When the clustering unit 46 runs repeatedly the step S32 below and completes the execution of the process in step 33 below for the communication log of the setting error candidate including the IP address which were selected in step S31 (completion of loop LP42), the process proceeds to step S42. More detailed, the clustering unit 46 picks up all communication log of the setting error candidate among a plurality of communication log of the setting error candidate stored in the setting error candidate table Te11 and completes the execution the processes of step S33 and its following step, the process proceeds to step S42.

Step S42: the clustering unit 46 stores "-" (hyphen) in cells which are not the port number in the shaping log table Tf1 of FIG. 40. The storage of this hyphen means the storage indicating that only one side communicating by the clustering unit 46 is successful.

When the clustering unit 46 runs repeatedly the step S31 below and does not complete the selection of all IP address included in the communication log of the setting error candidate which were output by the error detecting unit 44 (incompletion of loop LP32), the process moves from the loop LP 32 to loop LP 31. The clustering unit 46 again repeatedly executes the step S31 and its following step.

On the other hand, the clustering unit 46 completes the selection of all IP address included in the communication log of the setting error candidate which were output by the error detecting unit 44 (completion of loop LP32), the process is finished.

(Examples of the Shaping of Communication Log of Setting Error Candidates)

The example of shaping of the communication log of setting error candidates will be described with reference to FIG. 36 through FIG. 40. Any data has not been stored in the table illustrated in FIG. 36 before running the step S31.

The clustering unit 46 executes the step S31, and selects the IP address "12.0.3.7" from the communication log of setting error candidate which was output from the error detecting unit 44 (step S31), for example. This IP address "12.0.3.7" is an IP address that is set to the target server SVRt in FIG. 37.

The clustering unit 46 executes the step S32, and picks up the communication log of setting error candidates such as indicated at reference number "P31" and stores it in the memory 402 (step 92). The IP address of the transmission source "12.0.3.7" included in the target communication log P31 matches with the IP address "12.0.3.7" selected in step S31, therefore the clustering unit 46 determines YES in step S33 and executes Step S34.

The IP address of transmission destination "12.0.0.3" included in the target communication log P31 is not stored in the partner IP address field in the shaping log table Tf1 of FIG. 40, therefore it is determined NO in step S34 and the step S35 is executed. The clustering unit 46 stores the IP address of transmission destination "12.0.0.3" included in the target communication log P31 as indicated at reference number P51, in to the partner IP address field in the shaping log table Tf1 (step S35).

Then, the clustering section 46 stores the port number of transmission destination "161" included in the target communication log P31, into a cell of which column of the received port number of transmission destination intersects to row of the cell stored the IP address of transmission destination "12.0.0.3" in step S35 in the shaping log table Tf1, as indicated by reference P51 (Step S36).

Then, the clustering unit 46 stores the port number of transmission source "*****" of the target communication log P31, into a cell of which column of the received port number of transmission source intersects to row of the cell stored the IP address of transmission source "12.0.0.3" in step S35 in the shaping log table Tf1, as indicated by reference P51 (step S37).

Then, the clustering unit 46 executes the processes of the step S32 to the step S37 for seven communication logs of setting error candidate from the communication log of setting error candidate depicted by the reference P32 until a communication log of setting error candidate depicted by the reference P33 in FIG. 36. As a result, the clustering section 46 stores the port number of transmission source and the port number of transmission destination included in seven communication logs of setting error candidate into the received port number of transmission source field and the received port number of transmission destination field in FIG. 40 (referring to cluster log depicted by references P52~P53 in FIG. 40).

And the clustering unit 46 executes the step S32 and picks up the communication log of setting error candidates such as indicated at reference number "P34" in FIG. 36 and stores it in the memory 402 (step S32). The IP address of the transmission source "12.0.3.6" included in the target communication log P34 does not match with the IP address "12.0.3.7" selected in step S31, therefore the clustering unit 46 determines NO in step S33 and executes Step S38 in FIG. 39A.

The IP address of transmission source "12.0.3.6" included in the target communication log P34, is not stored in address column of the partner IP address of the shaping log table Tf1 in FIG. 40, therefore NO is determined in step S38 and the process proceeds to step S39. The clustering unit 46 stores the IP address of transmission source "12.0.3.6" that is included in the target communication log P34 into the address column of the partner IP address of the shaping log table Tf1 in FIG. 40, as indicated by reference P54 (step S39).

Then, the clustering unit 46 stores the port number of transmission source "***" of the target communication log P34, into a cell of which column of the transmitted port number of transmission source intersects to row of the cell stored the IP address of transmission source "12.0.3.6" in the step S39 in the shaping log table Tf1, as indicated by reference P54 (step S40**).

And the clustering unit 46 stores the port number of transmission destination "56421" that is included in the target communication log P34, into a cell of which column of the transmitted port number of transmission destination intersects to row of the cell stored the IP address of transmission source "12.0.3.6" in the step S39 in the shaping log table Tf1, as indicated by reference P54 (step S41).

Then the clustering unit 36 returns the process of step S32 in FIG. 38, picks up the communication log of setting error candidate as depicted by reference P35 for example and stores it in the memory 402 (step S32). The IP address of the transmission source "12.0.0.3" included in the target communication log P35 does not match with the IP address "12.0.3.7" selected in step S31, therefore the clustering unit 46 determines NO in step S33 and executes Step S38.

The IP address of transmission destination "12.0.0.3" included in the target communication log P35 is stored in the partner IP address field in the shaping log table Tf1 of FIG. 40 (referring to reference P51 in FIG. 40), therefore it is determined YES in step S38 and the step S40 is executed.

The clustering unit 46 stores the port number of transmission source "161" that is included in the target communication log P35, into a cell of which column of the transmitted port number of transmission source intersects to row of the cell stored the IP address of transmission source "12.0.0.3" (as referred to reference P51) in the shaping log table Tf1, as depicted by reference P51.

The clustering unit 46 stores the port number of transmission destination "***" that is included in the target communication log P35, into a cell of which column of the transmitted port number of transmission destination intersects to row of the cell stored the IP address of transmission source "12.0.0.3" in the shaping log table Tf1, as depicted by reference P51 (step S41**).

The clustering unit 46 executes the shaping process of the communication log as explained by FIG. 38 and FIG. 39 to all IP addresses included in the communication logs of setting error candidate which were output from the error detecting unit 44.

Below, the shaping log table Tf1 in FIG. 40, which is created by the result that the clustering unit 46 executed for all communication logs stored in the setting error candidate table Te11 in FIG. 36, will be explained. In addition, reference Tf in FIG. 34 illustrates a state that the communication log database DB1 in FIG. 34 stores the shaping log table Tf1.

(Clustering)

The clustering unit 46 dusters logs stored in each row of the shaping log table Tf1 (hereinafter, described as the clustering log) on the basis of similarity of the port number, In other words, the clustering unit 46 summarizes the clustering logs with a high similarity. That is, the clustering unit 46 summarizes the clustering logs that include same port number.

Figure 41:
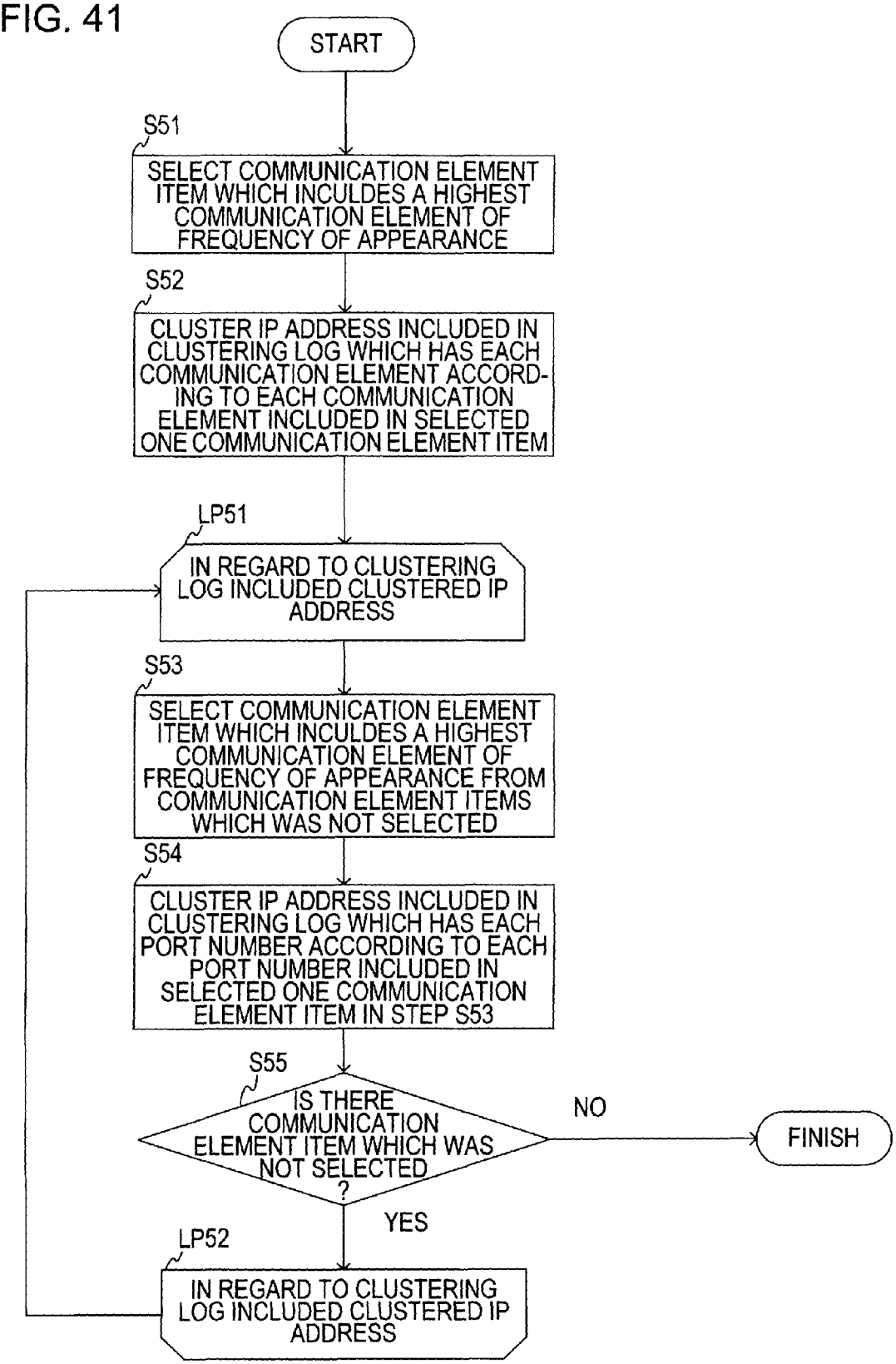
FIG. 41 is a flow diagram to explain a clustering process, as one example.

FIG. 41 is an example of a flow diagram illustrating the flow of the clustering process. The communication element of the clustering log as described below, for example, is a port number. The communication element item, for example, is a port number of transmission destination when sending, a port number of transmission source when sending, a port number of transmission destination when receiving, and a port number of transmission source when receiving. In addition, after the description of FIG. 41, an example of clustering will be explained.

Step S51: the clustering unit 46 selects the communication element item including the communication elements of which a frequency of occurrence is highest from among the communication element items included in the table (for example, shaping log table Tf1 of FIG. 40) which stores the clustering logs. Then, the clustering unit 46 stores selected communication element item in the memory element 402.

Step S52: the clustering unit 46 clusters the IP addresses which are included in the clustering logs that contains each communication element according to each communication element included selected one communication element item in step S51. Then, the clustering section 46 stores the IP address that were clustered in the memory 402 in the unit that have clustering. This clustering is also called to a process which integrates the IP address.

Hereinafter, the clustering unit 46 repeats the processes of the step S53~S55 for the clustering logs including the clustered IP address (loop LP51~LP52). Below, the IP addresses which were clustered are described as first ~N-th (N is an integer of 2 or more) clustered IP address, respectively.

Step S53: the clustering unit 46 selects the communication element item including the communication elements of which a frequency of occurrence is highest from among the communication element items which have not been selected by targeting the clustering logs including the clustered IP address in step S52. Then, the clustering unit 46 stores selected communication element item in the memory element 402.

Step S54: the clustering unit 46 clusters the IP addresses which are included in the clustering logs that contains each port number according to each port number included selected one communication element item in step S53, by targeting the clustering logs including the clustered IP addresses in step S52. Then, the clustering unit 46 stores the IP address that were clustered in the memory 402 in the unit that have clustering.

Step S55: the clustering unit 46 determines whether there is a communication element item unselected. When there is unselected communication element item (step S55/YES), the process returns to step S53 (from loop LP52 to loop LP51). When there is no unselected communication element item (step S55/NO), the process is finished, The clustering unit 46 performs the processes of step S51~S55 on each target servers.

(First Example of Clustering)

Figure 42:
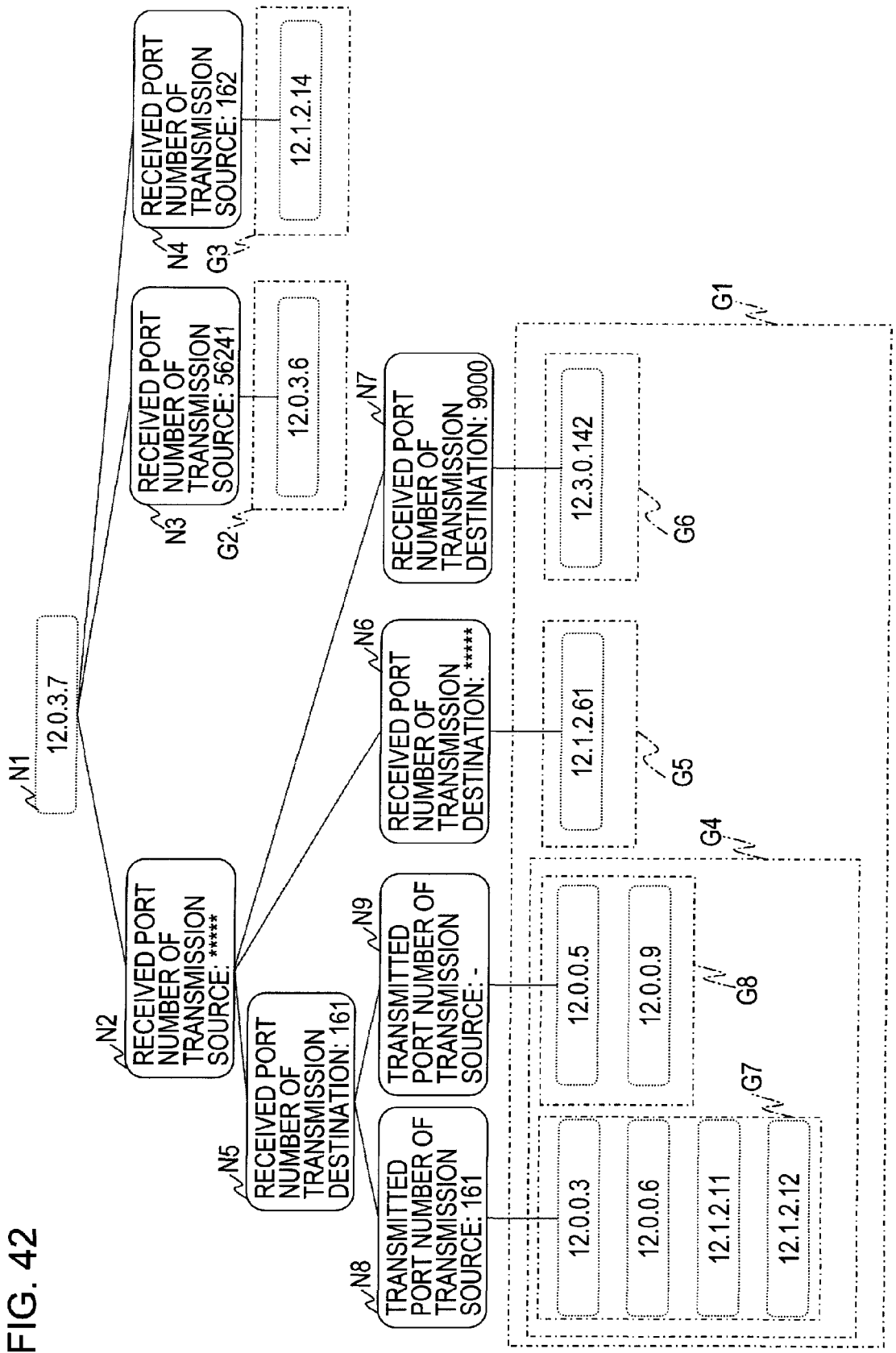
FIG. 42 is a diagram to explain a first embodiment of the clustering, as one example.

With reference to FIG. 40 through FIG. 42, a first example of clustering will be described.

FIG. 42 is an example of a diagram schematically illustrating a first example of clustering. FIG. 42 is a diagram illustrating a relationship between the port numbers and the IP addresses by a tree structure. A root node N1 indicates the IP address "12.0.3.7" that is set to the target server. Further, nodes N2~N9 depicted by a solid frame indicate the port numbers. Further, the node indicated by the dotted frame, indicates an IP address which is set to the partner server.

The clustering unit 46 executes the process in the step S51 of FIG. 41. The clustering unit 46 calculates frequencies of occurrence for each of the port number of transmission destination when sending, the port number of transmission source when sending, the port number of transmission destination when receiving, and the port number of transmission source when receiving (as four communication element item), which are included in the shaping log table Tf1 in FIG. 40. Then, the clustering unit 46 stores a highest frequency of occurrence port number among the port number of transmission source when sending, the port number of transmission destination when receiving, and the port number of transmission source when receiving, and the frequency of occurrence in the memory 402. Further the clustering unit 46 selects one communication element item including the highest frequency of occurrence port number among four communication element items and stores it in the memory 402.

The frequencies of occurrence for each of the port number of transmission destination when sending, the port number of transmission source when sending, the port number of transmission destination when receiving, and the port number of transmission source when receiving described in step S51, are following values.

In other words, the frequency of occurrence of each of the port number is a value which divided the number of same port number for each of the port number of transmission destination when sending, the port number of transmission source when sending, the port number of transmission destination when receiving, and the port number of transmission source when receiving by the total number of clustering logs stored in the shaping log table Tf1 in FIG. 40, In the example of FIG. 40, the total number is 10.

In the example of FIG. 40, since the number of the transmitted port number of transmission source "161" is four, the frequency of occurrence of the port number "161" in the transmitted port number of transmission source is 4/10.

In the example of FIG. 40, the highest frequency of occurrence port number in the transmitted port number of transmission source is "161" (4/10) and the highest frequency of occurrence port number in the transmitted port number of transmission destination is "***" (8/10). In the example of FIG. 40, the highest frequency of occurrence port number in the received port number of transmission source is "*" (8/10) and the highest frequency of occurrence port number in the received port number of transmission destination is "161" (6/10). In this case, the received port number of transmission source is the communication element item which includes calculated highest frequency of occurrence port number "*" (8/10). Therefore, the clustering unit 46 selects and stores the received port number of transmission source into the memory 402**.

The clustering unit 46 executes the process in the step S52. Here, in the example of FIG. 40, the port numbers that is included in the selected port number of transmission source when receiving (each communication element) are "***", "56241" and "162". The port number "*" that is included in the port number of transmission source when receiving is indicated by the node N2 in FIG. 42. The port number "56241" that is included in the port number of transmission source when receiving is indicated by the node N3 in FIG. 42. And the port number "162" that is included in the port number of transmission source when receiving is indicated by the node N4 in FIG. 42**.

The clustering unit 46 stores information indicating that the child node of the node N1 is the nodes N2~N4 in the memory 402, Following eight IP addresses are the partner address included the clustering log that contains the port number "***" in the port number of transmission source when receiving, That is, the eight IP addresses are "12.0.0.3", "12.0.0.6", "12.1.2.11", "12.1.2.12", "12.0.0.5", "12.0.0.9", "12.1.2.61", and "12.3.0.142" which are enclosed by the dashed line indicated by reference numeral G1 in FIG. 42. The clustering unit 46 stores information indicating that the IP addresses belonging to the node N2 is the eight IP addresses (represented by reference number G1) in the memory 402**.

In addition, the IP address included in the clustering log including the port number "56241" that is included in the port number of transmission source when receiving is a "12.0.3.6" enclosed by the dashed line indicated by reference numeral G2 in FIG. 42.

Further, the IP address included in the clustering log including the port number "162" that is included in the port number of transmission source when receiving is a "12.1.2.14" enclosed by the dashed line indicated by reference numeral G3 in FIG. 42.

The clustering unit 46 stores information indicating that the child node (leaf node) of the node N3 is a node indicating the reference number G2 and the child node of the node N4 is a node indicating the reference number G3 in the memory 402.

In step S52, the clustering section 46 classifies the IP addresses included in the clustering log which is stored in the shaping log table Tf1 in FIG. 40 into three clusters (referring to reference numbers G1~G3 in FIG. 42). Here, the eight IP addresses that are executed the cluster is a first clustered IP address (referring to reference number G1 in FIG. 42). And the one IP address of the clustered "12.0.3.6" is a second clustered IP address (referring to the reference number G2 in FIG. 42). Further, the one IP address of the clustered "12.1.2.14" is a third clustered IP address (referring to the reference number G3 in FIG. 42).

The clustering unit 46 executes the process in the step S53 for the first time. The clustering unit 46, in the execution of the step S53, calculates the frequent occurrences for each of port number in unselected communication element items by targeting the clustering log including the IP address that is clustered in step S52. And the clustering unit 46 stores a highest frequent occurrence port number and the frequency occurrence for each of the communication element item which were unselected in the memory 402. And the clustering unit 46 selects one communication element item including the port number having a calculated highest frequency occurrence from the unselected communication element items in the memory 402.

The frequency of occurrence of each port number for each of unselected communication element item described in step S53 is a value obtained by dividing the number of the same port number for each of the unselected communication element item by the total number of clustering logs contained the IP addresses that are clustered.

In the example of FIG. 40, the unselected communication element item, which targets to the clustering log containing the IP addresses that are clustered in step S52, is a port number of communication source when sending, a port number of communication destination when sending, a port number of transmission destination when receiving. And, the total number of clustering log including the IP address which are clustered (the clustering log including the first clustered IP address) is eight. Following, the frequency of occurrence of the port number, that is included in the clustering log including the first clustered IP address, will be explained.

In the example of FIG. 40, the port number with the highest occurrence frequency port number among the port number of transmission source when sending is "161" (4/8) and the port number with the highest occurrence frequency port number among the port number of transmission destination when sending is "***" (6/8), Further, in the example of FIG. 40, the port number with the highest occurrence frequency port number among the port number of transmission destination when receiving is "161" (6/8). In this case, the communication element item including the port number with the highest frequency of occurrence ("*" (6/8) "161" (6/8)) are the port number of transmission destination when sending and the port number of transmission destination when receiving. Thus, when there is more than one port number with the highest appearance frequency, the clustering section 46 selects the communication element item in which the port numbers are not merged, that is, the communication element item contains a port number other than the port number "***", and stores it in the memory 402. In the example of the above case, the clustering portion 46 selects the port number of transmission source when receiving.

The clustering unit 46 executes the process in the step S54 for the first time. Here, each of the port number that is included in the selected port number of transmission source when receiving by targeting the clustering logs including the clustered IP address in step S52 for the first time are "161", "***" and "9000". The port number "161" that is included in the port number of transmission destination when receiving is indicated by the node N6 in FIG. 42. The port number "***" that is included in the port number of transmission destination when receiving is indicated by the node N6 in FIG. 42, And the port number "9000" that is included in the port number of transmission destination when receiving is indicated by the node N7 in FIG. 42.

The clustering unit 46 stores information indicating that the child node of the node N2 is a node N5~a node N7 in the memory 402.

In FIG. 40, following six IP addresses are the IP addresses in the communication log that contains the port number "161" in the port number of transmission destination when receiving. That is, in FIG. 42, six IP addresses are the IP addresses of "12.0.0.3", "12.0.0.6", "12.1.2.11", "12.1.2.12", "12.0.0.5", and "12.0.0.9" which are enclosed by the dashed line indicated by reference numeral G4. Here, the six IP addresses which was clustered are a fourth clustered IP address.

The clustering unit 46 stores information indicating that the IP addresses belonging to the node N5 are the six IP addresses (referring to reference number G4) in the memory 402.

Further, the IP address included in the clustering log that contains the port number "*****" in the port number of transmission destination when receiving is "12.12.61" which is surrounded by a dashed line indicated by reference numeral G5 in FIG. 42. Further, the IP address included in the clustering log that contains the port number "9000" in the port number of transmission destination when receiving is "12.3.0.142" which is surrounded by a dashed line indicated by reference numeral G6 in FIG. 42.

The clustering unit 46 stores information indicating that the child node of the node N6 is a node indicated by reference number G5 and the child node of the node N7 is a node indicated by reference number G6 in the memory 402.

Here, since the communication element items which have been already selected are the port number of transmission source when receiving and the port number of transmission destination when sending, there are two unselected port number, that is, the port number of transmission source when sending and the port number of transmission destination when sending, Therefore, the clustering section 46 determines that there is communication element items unselected (step S55/NO), and returns to the process in step S53.

The clustering unit 46 executes the step S53 for the second time, In the example of FIG. 40, in the step S53 for the second time, the unselected communication element items are the port number of transmission source when sending and the port number of transmission destination when sending. And as for the fourth clustered IP address, the total number of clustering log that contains these IP addresses is a six.

In the example of FIG. 40, the port number with the highest occurrence frequency port number among the port number of transmission source when sending is "161" (4/6) and the port number with the highest occurrence frequency port number among the port number of transmission destination when sending is "***" (4/6). In the example of FIG. 40, in this case, the communication element item including the port number with the highest frequency of occurrence ("*" (4/6), "161" (4/6)) are the port number of transmission source when sending and the port number of transmission destination when sending. Thus, when there is more than one port number with the highest appearance frequency (that is, the port number of transmission source when sending and the port number of transmission destination when sending in FIG. 40), the clustering section 46 selects the communication element item in which the port numbers are not merged, that is, the communication element item contains a port number other than the port number "***", and stores it in the memory 402. In the example of the above case, the clustering portion 46 selects the port number of transmission source when sending and stores it to the memory 402.

The clustering unit 46 executes the process in the step S54 for the second time. Here, each of the port number that is included in the selected port number of transmission source when sending by targeting the clustering logs (the clustering log contained fourth clustered IP address) including the clustered IP address in step S54 for the first time are "161", and "-". The port number "161" that is included in the port number of transmission source when sending is indicated by the node N8 in FIG. 42. The port number "-" that is included in the port number of transmission source when sending is indicated by the node N9 in FIG. 42.

The clustering unit 46 stores information indicating that the child nodes of the node N5 are a node N8 and a node 9 in the memory 402, In FIG. 40, following four IP addresses are the IP addresses in the clustering log that contains the port number "161" in the port number of transmission source when sending. That is, in FIG. 42, four IP addresses are the IP addresses of "12.0.0.3", "12.0.0.6", "12.1.2.11", and "12.1.2.12" which are enclosed by the dashed line indicated by reference numeral G7 in FIG. 42. Further, following two IP addresses are the IP addresses in the clustering log that contains the port number "-" in the port number of transmission source when sending. That is, in FIG. 42, two IP addresses are the IP addresses of "12.0.0.5", and "12.0.0.9" which are enclosed by the dashed line indicated by reference numeral G8 in FIG. 42.

The clustering unit 46 stores information indicating that the child node of the node N8 is a node indicated by reference number G7 and a child node of a node 9 is a node indicated by reference number G8 in the memory 402.

In the execution of step S53 for the aforementioned second time, the clustering unit 46 selected one port number of transmission source when sending among the port number of transmission source when sending and the port number of transmission destination when sending. Therefore, the clustering unit 46 considers that there is no communication element items unselected (step S55/NO), the clustering section 46 finishes the clustering process, In addition, the clustering unit 46 does not execute the process of step S53 for the clustering log including single IP address which was clustered. For example, the clustering unit 46 does not execute the process of step S53 for the clustering log including single IP address "12.0.3.6" (referring to reference number G2 in FIG. 42) and the clustering log including single IP address "12.1.2.14" (referring to reference number G3 in FIG. 42).

By the clustering process that has been described above, the IP address in the shaping log table Tf1 in FIG. 40 executed the clustering into six clusters as indicated by the reference numbers G2, G3, G5~G8 in FIG. 42.

FIG. 43 is a diagram illustrated a state in which the IP addresses included in the shaping log table Tf1 in FIG. 40 are clustered in a table format, The refined result table Tn1 is a table provided with the item number column on the left side of the partner IP address field in the shaping log table Tf1. FIG. 43 illustrates a state that the clustering logs stored in the shaping log table Tf1 in FIG. 40 are clustered into six dusters.

For example, the line of the item number No. 1 the clustering log including the IP addresses "12.0.0.3", "12.0.0.6", "12.1.2.11", "12.1.2.12". enclosed by the dashed line indicated by the reference numeral G7 in FIG. 42. For example, the line of the item number No. 2, the clustering log including the IP addresses "12.0.0.5", "12.0.0.9", enclosed by the dashed line indicated by reference numeral G8 in FIG. 42.

As is apparent from the refined result table Tn1 in FIG. 43, the clustering unit 46 combines the clustering log including the same port number, For example, clustering unit 46 combines the clustering logs including the same port number of transmission source when sending "161", the port number of transmission destination when sending "***", the port number of transmission source when receiving "***", and the port number of transmission destination when receiving "161" into one.

In addition, the reference number Tn in FIG. 34 represents a state that the communication log database DB1 in FIG. 34 stores a refined result table Tn1 by reference number Tn in FIG. 34.

The clustering unit 46 outputs the refined result table Tn1 in FIG. 43 to the notification unit 45. The notification unit 45 displays the refined result table Tn1 in FIG. 43 to the administrator via a display control device 406 and a display unit 406a (referring to FIG. 5).

In the setting error candidate table Te11 in FIG. 36, the number of the communication log of setting error candidates is twenty. The clustering unit 46 consolidates this twenty communication logs of the setting error candidates into six items corresponding to the target server as indicated by the refined result table Tn1 in FIG. 43.

When the administrator confirms the setting of communication related information of one device which is set the IP address stored in the partner IP address field corresponding to each item number, it is possible that the administrator determines that same setting error of communication related information has occurred with a high probability in the device which is set the other IP address stored in the partner P address field corresponding to the item number.

For example, in the case of the item No. 1, the IP addresses stored in the partner IP address field corresponding to the item No. 1, are "12.0.0.3", "12.0.0.6", "12.1.2.11", "12.1.2.12". Here, because the source of these clustered logs are the communication log that exists only in the first block A20a which has been already validated the operation, it is possible to determine the following. In other words, it is possible that the administrator determines there is a possibility that the setting of application (also called as service) which utilizes the port number of "161" in the device set the IP address "12.0.0.3", for example, is forgotten.

And, it is possible that the administrator determines there is a possibility that the setting of application (also called as service) which utilizes the port number of "161" in the other three devices set the IP address "12.0.0.6", "12.1.2.11", "12.1.2. 12", is also forgotten is high.

In addition, the administrator determines that the setting of the application, that the application utilizes the port "161", is an error.

As described above, since the administrator should investigate the cause of the setting error by looking up the clustered (consolidated) log, it is possible that the administrator finds the cause of setting error with an efficiently. As a result, it is possible to reduce man-hours work in an inspections of cause and adjustment of setting error.

(A Second Example of Clustering)

It is also possible to use the number of communications as information that can identify the communication content. For example, in communications to use HTTP (Hyper text Transfer Protocol), the port number "80" is used. The communication in which the applications use the port number "80", are usually carried out frequently and the number of communications per unit time is many. Thus, it is possible to specify communication content that the communication, in which the number of communications is large, is as communication in which use the HTTP for example.

FIG. 44 is a diagram of an example of a table stored the clustering log containing a number of communications. FIG. 44 is a diagram of a table provided the number of communications field to the right of the port number of transmission source when receiving field when receiving in the shaping log table Tf1 in FIG. 40.

In addition, the IP address and the port number in the shaping log table Tf2 of FIG. 44, are different from the IP address and the port number of the shaping log table Tf1 of FIG. 40 in some part.

The clustering unit 46 executes the shaping process described in the flow of FIG. 38 for the communication log of setting error candidates including a number of communications, and combines the communication logs of setting error candidate stored in dual into one clustering log. When combining, the clustering unit 46 adds the number of first communication log of setting error candidate stored in the double with the number of the second communication log of the setting error candidates, and adds the calculated number to the one clustering log.

In the following description, the number of communication field is provided to left side of the port number field of transmission source in the setting error candidate table Te11 of FIG. 36 and is stored the number of communication log. For example, the communication log P31 of setting error candidate of FIG. 36 includes 2562 number of communications, and the communication log P35 of setting error candidate includes 2562 number of communications.

The clustering unit 46 executes the shaping process described in the flow of FIG. 38 for the communication log of setting error candidates including a number of communications, and creates the shaping log table Tf2 in FIG. 44, When the clustering unit 46 combines the communication log P31 of setting error candidates including the number of communications with the communication log P35 of setting error candidates including the number of communication, the clustering unit 46 executes the following processing. Namely, the clustering unit 46 adds the number of communication "2562" including the communication log P31 of the setting error candidate with the number of communication "2562" including the communication log P35 of setting error candidate (added result is 5124), and stores it into the number of communication field in FIG. 44. In the example, when the clustering unit 46 combines the communication log P31 of setting error candidates with the communication log P35 of setting error candidates, the clustering unit 46 stores the combined clustering log as the clustering log, as indicated by reference number P61 in FIG. 44.

In the first embodiment, the IP addresses are clustered according to the port number (referring to FIG. 41), but in the second example, the IP addresses are clustered according to the port number and the number of communications.

Since the number of communication naturally are not constant, there is a little possibility that the clustering logs with same number of communication are stored in the shaping log table Tf2 in FIG. 44. Therefore, it is difficult to executing useful clustering for the administrator even executing the clustering according to the number of communication with variation values.

In order to perform a useful clustering for the administrator, the number of communication is divided into a predetermined number of group. For example, the number of communication is divided into three separate groups ("small", "medium", "many", for example). When dividing into three groups, for example, the number of communications less than 1000 is a "small", the number of communications more than 1000 and less than 2999 is a "medium", and the number of communication more than 3000 is a "many".

FIG. 45 is a diagram of an example of a table illustrating a state in which a number of communication is grouped in FIG. 44.

As represented by the shaping log table Tf3 in FIG. 45, the clustering section 46 replaces the number of communications of 3000 or more times by "many", replaces and placed the number of communications of less than 2999 and more than 1000 times by the "medium", and replaces the number of communications less than 1000 times by the "small". In the example above, the clustering section 46 replaces the number of communications in the clustering log indicated by reference number P71 by the "many". And, the clustering unit 46 performs clustering as described in FIG. 40.

In addition, the reference Tf in FIG. 34 illustrates a state that the communication log database DB1 in FIG. 34 stores the shaping log table Tf3 in FIG. 45.

(A Second Example of Clustering)

Figure 46:
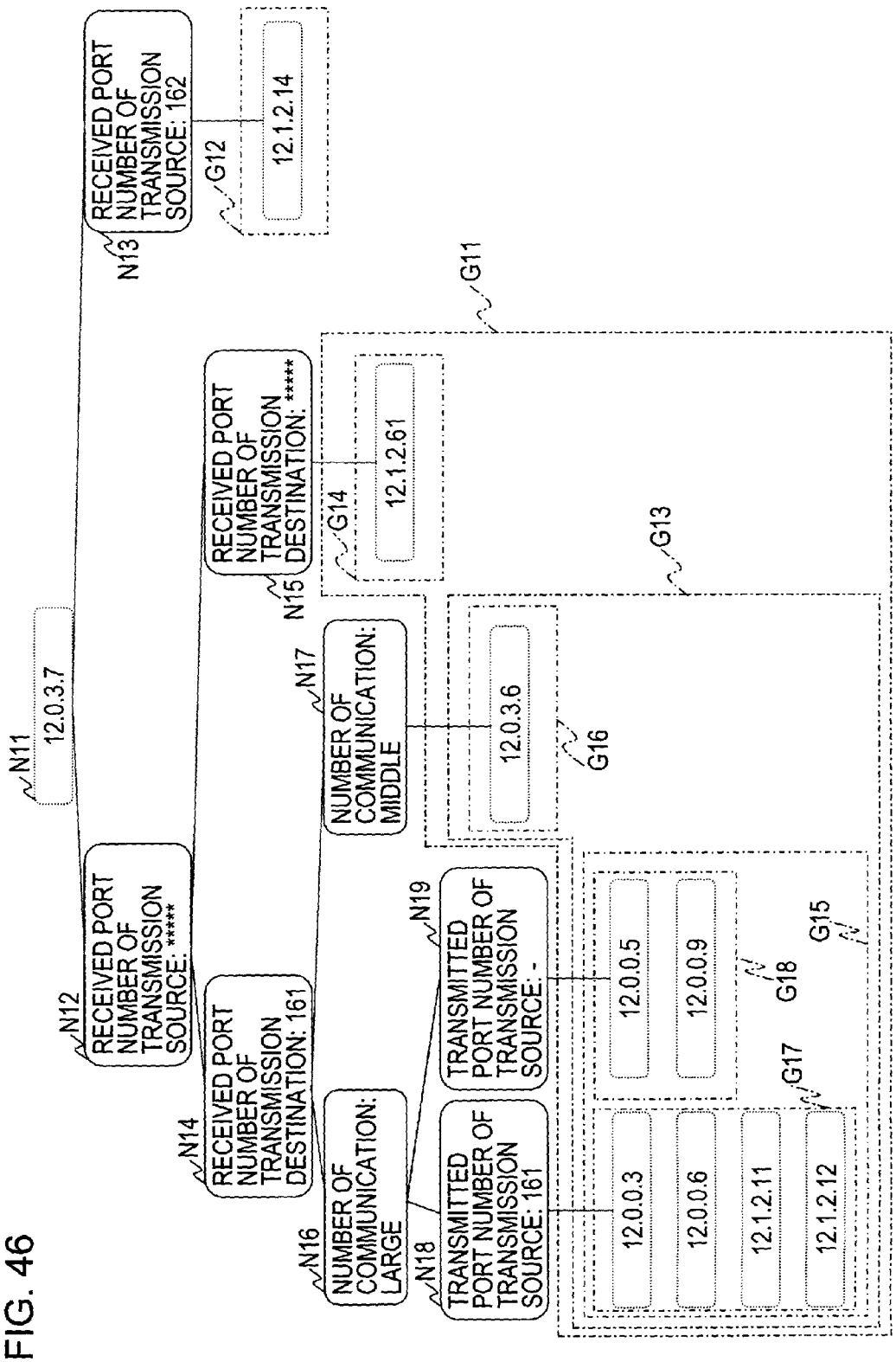
FIG. 46 is a diagram to illustrate a relationship the port number, the number of communication and the IP address by a tree construction.

A second example of the clustering will be explained with referring to FIG. 41, FIG. 45, and FIG. 46. FIG. 46 is a diagram illustrating a tree structure of relationships between the port number, the number of communication, and the IP address. The root node N11 represents the IP address "12.0.3.7" which is set to the target server. Further, the nodes N12~N19 illustrated in a solid frame illustrate the port number and the number of communications. In addition, the node illustrated by the dotted frame, illustrates the IP addresses set in the partner servers.

The clustering unit 46 executes the process in the step S51 of FIG. 41. The clustering unit 46 calculates frequencies of occurrence for each of the port number of transmission source when sending, the port number of transmission destination when sending, the port number of transmission source when receiving, and the port number of transmission destination when receiving (as four communication element item), which are included in the shaping log table Tf3 in FIG. 45. Then, the clustering unit 46 stores a highest frequency of occurrence port number among the port number of transmission source when sending, the port number of transmission destination when receiving, the port number of transmission source when receiving, and the port number of transmission destination when receiving, and the frequency of occurrence of selected highest frequency of occurrence port number in the memory 402. Further the clustering unit 46 calculates frequencies of occurrence for each of the number of communication (one communication element item) included in the shaping log table Tf3 in FIG. 45. In addition, the clustering unit 46 stores the number of communication having a highest frequency of occurrence and its frequency of occurrence in the memory 402.

Then, the clustering unit 46 selects one communication element item including the communication element item with a highest frequency of occurrence among five communication element items, and stores it in the memory 402.

Following values are the frequencies of occurrence for each of the port number of transmission source when sending, the port number of transmission destination when sending, the port number of transmission source when receiving, and the port number of transmission destination when receiving described in step S51.

In other words, the frequency of occurrence for each of the port number are values of which each of number of same port number in the port number of transmission source when sending, the port number of transmission destination when sending, the port number of transmission source when receiving, and the port number of transmission destination when receiving when sending, is divided by the total number of clustering log stored in the shaping log table Tf3 in FIG. 45. In the example of FIG. 45, the total number is nine.

In the example of FIG. 45, the frequency of occurrence of the port number "161" in the port number of transmission source when sending is 5/9, because the number of the port number "161" in the port number of transmission source is a five-time. In addition, the frequency of occurrence for each the number of communication as described in step S51 is a value of which the number of same communication number is divided by the total number of clustering log stored in the shaping log table Tf3 in FIG. 45 (in the example of FIG. 45, the total number is 9).

In the example of FIG. 45, the port number with the highest occurrence frequency in the port number of transmission source when sending is "161" (5/9), and the port number with the highest occurrence frequency in the port number of transmission destination when sending is "***" (6/9). Also, in the example of FIG. 45, the port number with the highest occurrence frequency in the port number of transmission source when receiving is a "***" (8/9) and the port number with the highest frequency of occurrence among the port number of transmission destination when receiving is a "161" (7/9). In addition, the number of communication with the highest frequency of occurrence is a "many" (7/9).

In this case, since the communication element with the highest frequency of occurrence is the port number "161" in the port number of transmission source when receiving, the clustering unit 46 selects the port number of transmission source when receiving which is a communication element item including the port number of highest frequency of occurrence "***" (8/9), and stores it in the memory 402, The clustering unit 46 executes the process in the step S52. Here, in the example of FIG. 45, the port numbers included in the selected port number of transmission source when receiving are "*" and "162". The port number included in the selected port number of transmission source when receiving "*" is indicated by a node N12 in FIG. 46. The port number included in the selected port number of transmission source when receiving "162" is indicated by a node N13 in FIG. 46**.

The clustering unit 46 stores information indicating that the nodes N12 and N13 are child nodes of the node N11 in the memory 402.

Following eight IP addresses are the partner IP addresses including the clustering logs having the port number "***" in the port number of transmission source when receiving. In other words, the eight IP addresses are "12.0.0.3", "12.0.0.5", "12.0.0.6", "12.0.0.9", "12.1.2.11", "12.1.2.12", "12.1.2.61", and "12.0.3.6" enclosed by the dashed line indicated by reference numeral G11 in FIG. 46. The clustering unit 46 stores information indicating that the IP address belonging to the node N12 is the eight pieces of the IP address (reference number G11) in the memory 402**.

Further, the IP address included in the clustering log that includes the port number "162" in the port number of transmission source when receiving, is "12.1.2.14" enclosed by the dashed line indicated by reference numeral G12 in FIG. 46. The clustering unit 46 stores information indicating that the child node of the node N13 is a node indicated by the reference number G12 in the memory 402.

In the step S52, the clustering section 46 executes the clustering the IP addresses which is stored in the shaping log table Tf3 in FIG. 45 into two clusters (referring to reference number G11 and G12 in FIG. 46). Here, the eight IP addresses which are clustered (referring to reference number G11 in FIG. 46) is a eleventh cluster assigned IP address. And the one IP address "12.1.2.14" which are clustered is a twelfth cluster assigned IP address (referring to reference numeral G12 in FIG. 46).

The clustering unit 46 executes the process in the step S53 for the first time. The clustering unit 46, in the execution of the step S53, calculates the frequent occurrences for each of communication elements (the port number or the frequency of occurrence) in unselected communication element items (the port number of transmission source when sending, the port number of transmission destination when sending, the port number of transmission destination when receiving and the number of communication) by targeting the clustering log including the IP address that is clustered in step S52. And the clustering unit 46 stores a highest frequent occurrence communication element and the frequency occurrence for each of the communication element item in the memory 402.

Then, the clustering unit 46 selects one of communication element item with a highest frequency of occurrence from among the unselected communication element items.

The frequency of occurrence of each port number in unselected communication element item described in step S53 are values of which each of number of same port number in each of the unselected communication element item is divided by the total number of clustering log including the IP address which is clustered. In addition, the frequency of occurrence of each communication number in unselected communication element item described in step S53 are values of which number of same communication number is divided by the total number of clustering log including the IP address which is clustered.

In the example of FIG. 45, the unselected communication element item for targeting the clustering log that contains the IP addresses that are the port number of transmission source when sending, the port number of transmission destination when sending, the port number of transmission destination when receiving and the number of communication. And the total number of clustering log including the IP address which is clustered in step S52 (for example, the clustered log including the eleventh clustered IP address), is eight. Below, the port number or frequency occurrence of communication included in the clustering log including the eleventh clustered IP address will be explained.

In the example of FIG. 45, the port number with the highest occurrence frequency in the port number of transmission source when sending is "161" (5/8), and the port number with the highest occurrence frequency in the port number of transmission destination when sending is "***" (6/8). Also, in the example of FIG. 45, the port number with the highest occurrence frequency in the port number of transmission destination when receiving is a "161" (7/8), And in the example of FIG. 45, the number of communication with the highest frequency of occurrence among the number of communication is a "many" (6/8), In this case, since the communication element with the highest frequency of occurrence is the port number "161" (7/8) in the port number of transmission destination when receiving, the clustering unit 46** selects the port number of transmission destination when receiving which is a communication element item including the port number of highest frequency of occurrence "161".

The clustering unit 46 executes the process in the step S54 for the first time. Here, each of the port number that is included in the selected port number of transmission destination when receiving selected in the step S53 by targeting the clustering logs including the clustered IP address are "161", and "***". The port number "161" that is included in the port number of transmission destination when receiving is indicated by the node N14 in FIG. 46. The port number "*" that is included in the port number of transmission destination when receiving is indicated by the node N15 in FIG. 46**.

The clustering unit 46 stores information that the child node of the node N12 is a node N14 and the child node of the node N15 is the node indicated by reference number G14 in the memory 402.

In FIG. 45, following seven IP addresses are the IP addresses in the clustering log that contains the port number "161" in the port number of transmission destination when receiving. That is, in FIG. 42, seven IP addresses are the IP addresses of "12.0.0.3", "12.0.0.5", "12.0.0.6", "12.0.0.9", "12.1.2.11", "12.1.2.12" and "12.0.3.6" which are enclosed by the dashed line indicated by reference numeral G13 in FIG. 46. Further, the IP address included in the clustering log that contains the port number "*****" in the port number of transmission destination when receiving is "12.1.2.61" enclosed by the dashed line indicated by the reference number G14 in FIG. 46.

Here, the seven clustered IP address is a thirteenth clustered IP address.

The clustering unit 46 stores information that the IP address belonging to the node N14 is the seven IP addresses (referring to reference number G13) in the memory 402.

Here, since the communication element item selected already is the port number of transmission source when receiving and the port number of transmission destination when receiving, the unselected communication element item exist the port number of transmission source when sending, the port number of transmission destination when sending, and the number of communication. Accordingly, the clustering unit 46 determines that there is a communication element item unselected (step S55/NO), and returns to the step S53.

The clustering unit 46 executes the process in the step S53 for the second time. In the example of FIG. 45, the unselected communication element item for targeting the clustering logs that have been clustered in the S54 for the first time is the port number of transmission source when sending, the port number of transmission destination when sending, and the number of communication. And for the thirteenth clustered IP address, the total number of clustering log including this IP address is seven.

In the example of FIG. 45, the port number with the highest occurrence frequency in the port number of transmission source when sending is "161" (4/7), and the port number with the highest occurrence frequency in the port number of transmission destination when sending is a "*****" (5/7). The communication number of times with the highest frequency of occurrence is a "many" (6/7).

in this case, since the communication element having the highest frequency of occurrence is the number of communications "many" (6/7), the clustering unit 46 selects the number of communication which is a communication element item including the port number with highest frequency occurrence "many" (6/7), and stores it into the memory 402.

The clustering unit 46 executes the process in the step S54 for the second time. Here, each of the number of communication, which are selected in the step S53 for the first time by targeting the cluster logs (including the communication log that contains the thirteenth IP address that are clustered) including the IP address which are clustered in the step S54 for the first time, are a "many" and a "medium". The number of communication "many" is indicated by a node N16 and the number of communications "medium" is indicated by a node N17 in FIG. 46.

The clustering unit 46 stores information that a child node of the node 14 is the node N16 and the node N17 in the memory 402.

In FIG. 45, following six IP addresses are the IP addresses included in the clustering logs containing the number of communications "many" in the number of communication field. That is, the six IP addresses are "12.0.0.3", "12.0.0.5", "12.0.0.6", "12.0.0.9", "12.1.2.11", and "12.1.2.1" which are enclosed by a chain line indicated by reference numeral G15 in FIG. 45. Here, the six IP addresses which were clustered is called as fourteenth clustered IP address.

The clustering unit 46 stores information that the IP address belonging to the node N16 is the six IP addresses (indicated by reference numeral G15) in the memory 402.

Further, IP address included in the clustering log, that contains the number of communications "medium" in the number of communication field, is "12.0.3.6" which is enclosed by the chain line indicated by reference numeral G16 in FIG. 46.

The clustering unit 46 stores information indicating that a child node of the node N17 is a node indicated by a reference numeral G16 in the memory 402.

Here, since the communication element items which have been selected already are the port number of transmission source when receiving, the port number of transmission destination when receiving and the number of communications, the unselected communication element items are the port number of transmission source when sending and the port number of transmission destination when sending. Accordingly, the clustering unit 46 determines that there is the unselected communication element item (step S55/NO), and returns the step S53.

The clustering unit 46 executes the process in the step S53 for the third time. In the example of FIG. 45, the unselected communication element items for targeting the clustering logs that have been clustered in the step S54 for the second time are the port number of transmission source when sending and the port number of transmission destination when sending. And, for the fourteenth clustered IP address, the total number of clustering log including this IP address is six.

In the example of FIG. 45, the port number with the highest occurrence frequency in the port number of transmission source when sending is "161" (4/6), and the port number with the highest occurrence frequency in the port number of transmission destination when sending is a "***" (4/6). In this case, the communication element item having the port number of highest frequency of occurrence ("*" (4/6) and "161" (4/6)) are the port number of transmission source when sending and the port number of transmission destination. In this way, when there is a plurality of the port number of highest frequency of occurrence (in the example of FIG. 45, the port number of transmission source when sending and the port number of transmission destination), the clustering unit 46 selects the communication element item including the port number which was not merged, that is, other port number except the port number "***". In the example, the clustering unit 46 selects the port number of transmission source when sending and stores it into the memory 402.

The clustering unit 46 executes the process in the step S54 for the third time. Here, the port number of transmission source when sending, which are selected in the step S53 for the third time by targeting the cluster logs including the IP address which are clustered in the step S54 for the second time, is "161" and "-". The port number of transmission source when sending "161" is indicated by a node N18 and the port number of transmission source when sending "-" is indicated by a node N19 in FIG. 46.

The clustering unit 46 stores information indicating that the child nodes of the node N16 are a node N18 and a node N19 in the memory 402.

In FIG. 45, following four IP addresses are the IP addresses in the clustering log that contains the port number "161" in the port number of transmission source when sending, That is, four IP addresses are the IP addresses of "12.0.0.3", "12.0.0.6", "12.1.2.11", and "12.1.2.12" which are enclosed by the chain line indicated by reference numeral G17 in FIG. 46. Further, following two IP addresses are the IP addresses in the clustering log that contains the port number "-" in the port number of transmission source when sending, That is, the two IP addresses are "12.0.0.5" and "12.0.0.9" enclosed by the chain line indicated by the reference number G18 in FIG. 46.

The clustering unit 46 stores information indicating that the child node of the node N18 is a node indicated by reference numeral G17 and the child of node N19 is a node indicated by reference numeral G18 in the memory 402.

In the execution of the step S53 for the third time, the clustering unit 46 selected one port number of transmission source when sending among the port number of transmission source when sending and the port number of transmission destination when sending. Therefore, the clustering unit 46 determines there is no unselected communication element item (the step S55/No), and finishes the clustering process.

BY the clustering process that has been described above, the IP addresses in the shaping log table Tf3 in FIG. 45 are clustered into five clusters as indicated by the reference numeral G12, G14, G16, G17 and G18 in FIG. 46.

FIG. 47 is a diagram indicating a state in which executing a cluster of the IP addresses included in the shaping log table Tf3 in FIG. 45 in a table format. The refined result table Tn2 is a table which are provided with the item field on the left side of the partner IP address field and the number of communication field on the right side of the port number of transmission destination when receiving field in the shaping log table Tf3.

FIG. 47 illustrates a state which the clustering logs that are stored in the shaping log table Tf3 in FIG. 45 are clustered into five cluster, For example, in the line of item No. 1, the clustering log including the IP addresses "12.0.03", "12.0.0.6", "12.1.2.11", "12.1.2.12", which are enclosed by the chain line indicated by reference numeral G17 in FIG. 46, is stored. Then, the line of the item No, 5, the clustering log including the IP address "12.0.3.6" enclosed by the chain line indicated by reference numeral G16 in FIG. 46.

As is apparent from the refined result table Tn2 of FIG. 47, the clustering unit 46 gathers together the clustering logs including the same port number and the number of communications. For example, the clustering unit 46 gathers together the clustering log including the same port number of transmission source when sending "161", same port number of transmission destination when sending "***", the same port number of transmission source when receiving "***", same port number of transmission destination when receiving "161" and the number of communication "many", into one, as indicated in the item No. 1.

In addition, the reference numeral Tn in FIG. 34 illustrates a state that the communication log database DB1 in FIG. 34 stores the refined result table Tn2.

The clustering unit 46 outputs the refined result table Tn2 in FIG. 47 to the notification unit 45. The notification unit 45 displays the refined result table Tn2 in FIG. 47 to the administrator through the display control device 406 and the display unit 406a (referring to FIG. 5).

FIG. 48 is an example of a diagram illustrating a state in which the IP addresses included in the shaping log table Tf2 of FIG. 44 are executed the clustering without referring the number of communication as a measure of similarity, in a table format. The refined result table Tn3 is a table which is provided with the item No. field on the left side of the partner IP address field in the shaping log table Tf3.

By comparing the refined result table Tn2 of FIG. 47 with the refined result table Tn3 of FIG. 48, the difference will be explained. In other words, the difference is that the clustering log including the IP address "12.0.3.6", which is stored in the cell that the line of the item No. 1 in the refined result table Tn3 in FIG. 48 intersects to the partner address field, is stored in the line of the item No. 5 in FIG. 47.

When the administrator looked at the refined result table Tn3 in FIG. 48, the administrator checks the setting error in five devices which are set the partner IP address in the item No. 1. However, it is preferable to check the setting error of the device, which has recorded the communication log of many communication (that is, the device with frequently communication), as priority, instead of evenly checking the setting errors of five devices.

According to the refined result table Tn2 of FIG. 47, the clustering log including the IP address "12.0.3.6", which is combined into one in the example of FIG. 48, is stored in the line of the item No. 5 in FIG. 47. Therefore, the administrator should check the setting error of the devices that are set the IP address "12.0.3.6" (which performs communication with the number of communications "medium") after lowering the priority of the confirmation order which is set for the device. Accordingly, it is possible to check the setting error of the device recording that the communication log communication is frequently, as priority.

[Fifth Embodiment of Administration Device]

The administration device in the fifth embodiment, execute the clustering again by referring the configuration information for the IP address after executing the cluster that is discussed in the fourth embodiment, in order to perform more efficient investigation of setting error by the administrator. This configuration information is stored in a CMDB 14 (referring to FIG. 2) in the operator management server group MC (referring to FIG. 1) which connects the administration device 4 through the network and N. Below, the again clustering is referred to as appropriate re-clustering.

The clustering unit 46 classifies (also called as clustering) the communication log of setting error, which was classified according to the similarity of the information indicating the relationship between the transmission source and the transmission destination of the communication included the communication log of setting error (also referred as a communication log of setting error), which was classified as described in the fourth embodiment.

Here, the source and destination of communication included in the communication history of setting error are the IP address, for example. And the information indicating the relationship between the source and destination of the communication is a configuration information stored in the CMDB 14 (referring to FIG. 2). In other words, the communication history of setting error includes the transmission source and transmission destination of the communication, but does not include information indicating the relationship between the source and destination of the communication.

By performing this clustering, the administration device 4 collects the communication logs of setting error related to the devices having a common network connection construction and the devices at the same location, for example.

(Configuration Management Database)

The CMDB14 depicted by FIG. 1 is a configuration management database (CMDB: Configuration Management Database) and a database that stores the configuration information related to the operation and management of an information processing system SYS.

The CDMB stores configuration item (CI) including information related to the devices (for example, servers, switches) in the information processing system SYS and information related to software of which the devices execute, and relationship element information (also called as Relationship) indicating the relationship between the configuration items.

It is possible that the clustering unit 46 searches second configuration item related to a first configuration item by using the configuration item and the relationship element information stored in the CDMB 14.

FIG. 49A and FIG. 49B illustrate the configuration items, FIG. 49C illustrates the configuration element information, FIG. 49D is a diagram that a virtual server identified by the identification VServer005 is executed on a physical server that is identified by an identifier Server001. In FIG. 49D, an arrow indicated by reference Dom0 indicates that the virtual server is executed on the physical server.

In a tag of the configuration item C1 <item id="VServer005", type="Vserver"> in FIG. 49A, the "VServer" following to the "type" indicates that the configuration item C1 is a virtual server, and the "VServer" following to the "item id" indicates that the identifier for this virtual server is "VServer005".

In a tag of the configuration item C2 <item id="Server001", type="Server"> in FIG. 49B, the "Server" following to the "type" indicates that the configuration item C2 is a physical server; and the "Server 001" following to the "item id" indicates that the identifier for this physical server is "Server001".

Below, a string sandwiched a tag <name> and a tag </name> indicates the name of the configuration item. A string sandwiched in the tag <cpu> and the tag </cpu> indicates the operation clock number of the CPU of the configuration item. A string sandwiched in the tag <memory> and </memory> indicates the memory capacity of the configuration item. A string sandwiched in the tag <ipAddress> and the tag </ipAddress> indicates the IP address set in the configuration item. A string sandwiched in the tag <status> and the tag </status> indicates the state of the configuration item.

In the tag of the relationship element information <relationship id="Rel405", type="Dom0"> in FIG. 49C, the "Dom0" following to the "type=" indicates that the configuration item that will be the source (virtual server) is executed by the configuration item that will be the target (physical server).

Below, the string that is sandwiched between the tag <sourceItem> and the tag </sourceItem> indicates the identifier that identifies the configuration item that will be a source. And the string that is sandwiched between the tag <targetItem> and the tag </targetItem> indicates an identifier for identifying the configuration item that will be a target.

It is possible that the clustering unit 46, by referring the configuration items C1, C2 and the relationship element information, searches the configuration item C2 related to the configuration item C1. In addition, it is possible that the clustering unit 46 determines that the configuration item C1 relates to the configuration item C2 in a relationship indicated by FIG. 49D.

FIG. 50A illustrates the configuration items, FIG. 50B illustrates the configuration element information. FIG. 50C illustrates the relationship between the configuration elements. FIG. 50C illustrates a diagram that a switch identified by the identification "Switch001" connects to a physical server that is identified by an identifier "Server001" via the network. In FIG. 50C, an arrow indicated by reference numeral LinkTo indicates that the physical server connects to the switch via the network.

In addition, the network connection between the configuration items is not limited to the network connection to the switch and the physical servers. For example, the network connections between the switches, and between the physical servers and between the virtual servers are applied. Further, the virtual server may connect to the physical server via the network.

In a tag of the configuration item C3 <item id="Switcth001", type="Switch"> in FIG. 50A, the "Switch" following to the "type" indicates that the configuration item C3 is a switch, and the "Switch001" following to the "item id" indicates that the identifier for this switch is "Switch001".

Below, a string sandwiched in the tag <manufacture> and the tag </manufacture> indicates a manufacture of the configuration item. A string which is sandwiched in the tag <model> and the tag </model> indicates the model number of the configuration item. A string sandwiched by the tag<ipAddress> and the tag</ipAddress> indicates the IP address that is set to the configuration item.

In a tag of relationship element information R2 <relationship id="Rel001", type="LinkTo"> in FIG. 50, the "LinkTo" following to the "type=" indicates that the configuration item as the source (switch) connects to the configuration item as the target (physical server) via the network. The construction of the physical server is indicated by the configuration item C2 in FIG. 49B.

It is possible that the clustering unit 46, by referring the configuration items C2, C3 and the relationship element information, searches the configuration item C3 related to the configuration item C2. In addition, it is possible that the clustering unit 46 determines that the configuration item C2 relates to the configuration item C3 in the relationship indicated by FIG. 50C.

Although not illustrated in the figures, the relationship element information including the tag <relationship id="Re1002" type="ManagedBy"> has information that the configuration item serving as a source is managed by the configuration item serving as the target. Also, information indicating the location of the configuration item may be added to the relationship element information.

(Examples of Network Configuration)

Figure 51:
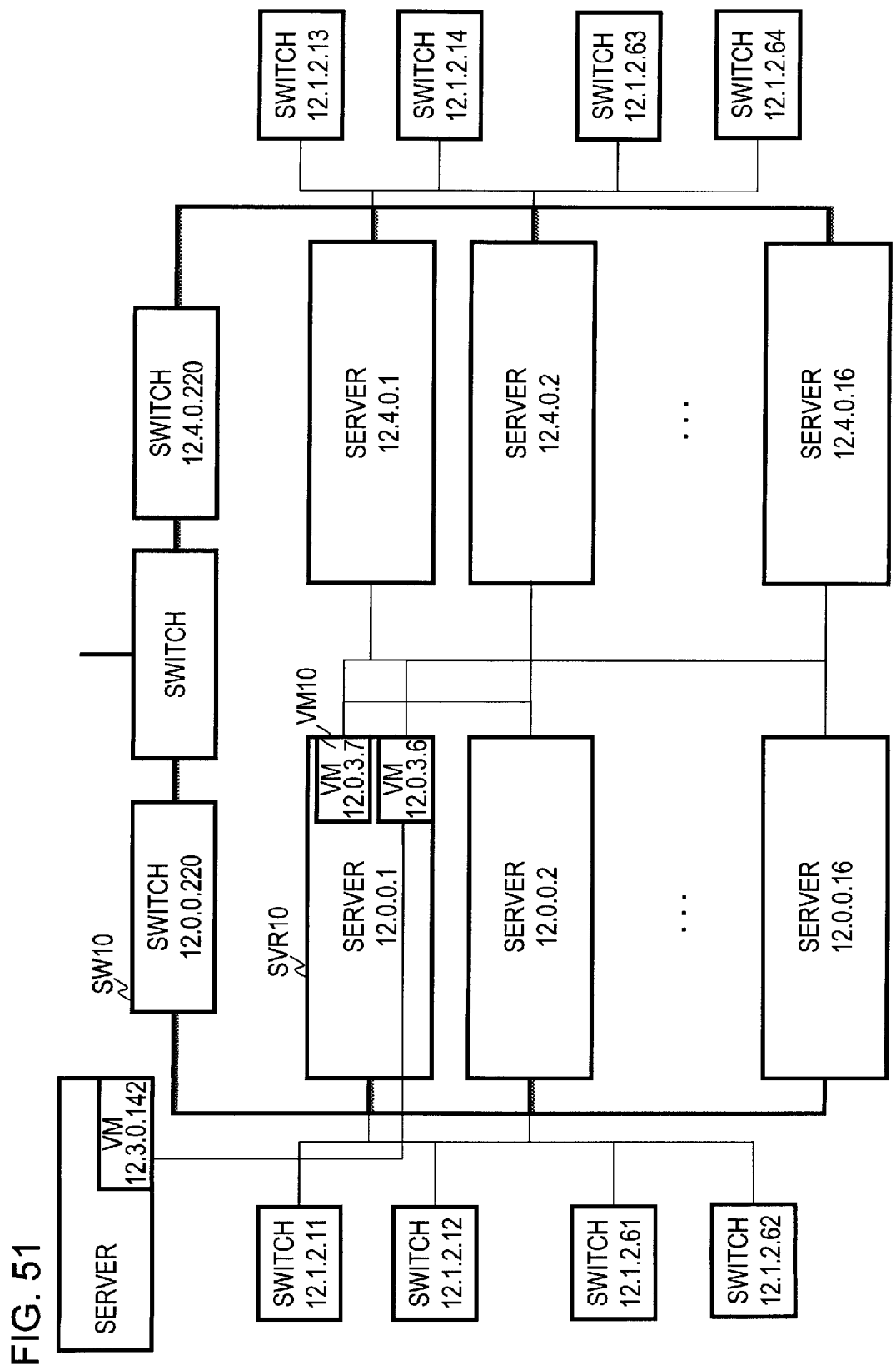
FIG. 51 is a diagram illustrating a network construction of devices and servers in which the IP address of transmission source and the IP address of a transmission destination are set in the fourth embodiment described in FIG. 35.

FIG. 51 is a diagram illustrating a network configuration of the virtual servers and the devices that are set with the source IP address and the destination IP address described in FIG. 35 in the fourth embodiment. This network configuration is the network configuration in the first block A20a in FIG. 2, for example.

The reference "Server" in the block in FIG. 51 indicates that this block is a physical server, and the reference numeral "X1, X2, X3, X4" (X1, X2, X3, X4=0~255) under the reference "Server" is the IP address that is set to the physical server. For example, it is indicated that, in the physical server SVR10, the IP address "12.0.0.1" is set to this physical server.

The reference "VM" in the second block provided on the inside of the first block of the physical server in FIG. 51, indicates a virtual server, and the reference numeral "X1, X2, X3, X4" under the reference "VM" indicates the IP address set in the virtual server. For example, it is indicated that, in a virtual server VM10, the IP address "12.0.3.7" is set to the virtual server.

The "Switch" in the block in FIG. 51, indicates that this block is a switch, and the reference numeral "X1, X2, X3, X4" under the "switch", indicates the IP addresses set on the switch. For example, it is indicated that the IP address "12.0.0.220" is set to the switch SW.

Solid lines between the blocks in FIG. 51 indicates schematically a network connection between the blocks.

The CMDB 14 stores the configuration items for each of the switch, the physical servers, and the virtual servers described in FIG. 51 and further stores the relationship element information between the configuration items.

(Grouping)

The clustering unit 46 executes the following process as a preliminary step for performing clustering by referring to the configuration information for the IP address after the cluster that is described in the fourth embodiment. In other words, the clustering unit 46 extracts the IP addresses set to each of a plurality of the partner servers of which the relationship from the target server to the partner server is matched, and executes the grouping of the plurality of IP addresses that were extracted.

Figure 52:
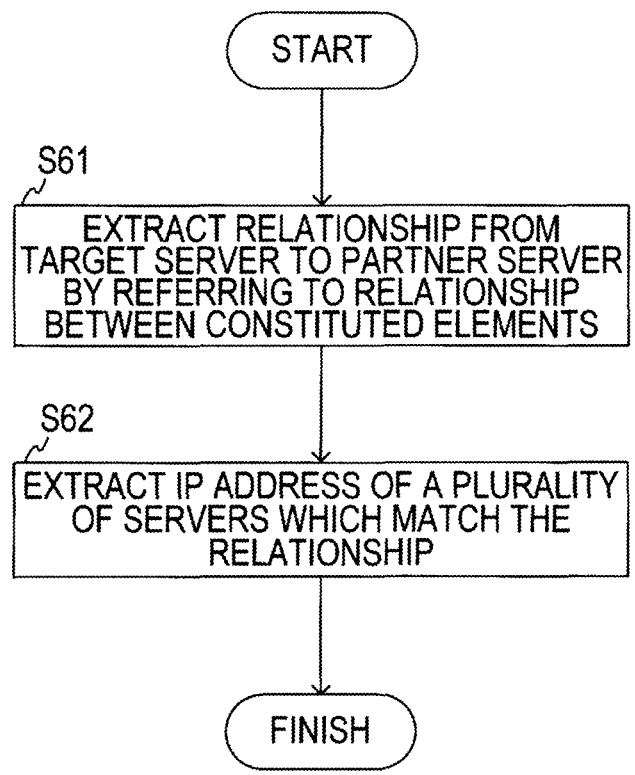
FIG. 52 is a flow diagram to explain grouping of the IP address, as one example.

FIG. 52 is an example of a flow diagram illustrating the grouping of IP addresses as mentioned above.

Step S61: the clustering unit 46 refers to the configuration item and the relationship element information stored in the CMDB 14, extracts the relationship between the configuration items, refers to the relationship between the configuration items extracted, extracts the relationship from the target server to the partner server, and stores it into the memory 402.

Step S62: the clustering unit 46 extracts the IP addresses set to each of a plurality of the partner servers, of which the relationship from the target server to the partner server is matched, executes the grouping of the plurality of IP addresses that were extracted, combines the grouped IP address into group and stores it to the memory 402.

The clustering unit 46 executes the processes in the step S61 and the step S62 for each of the target servers.

Figure 53:
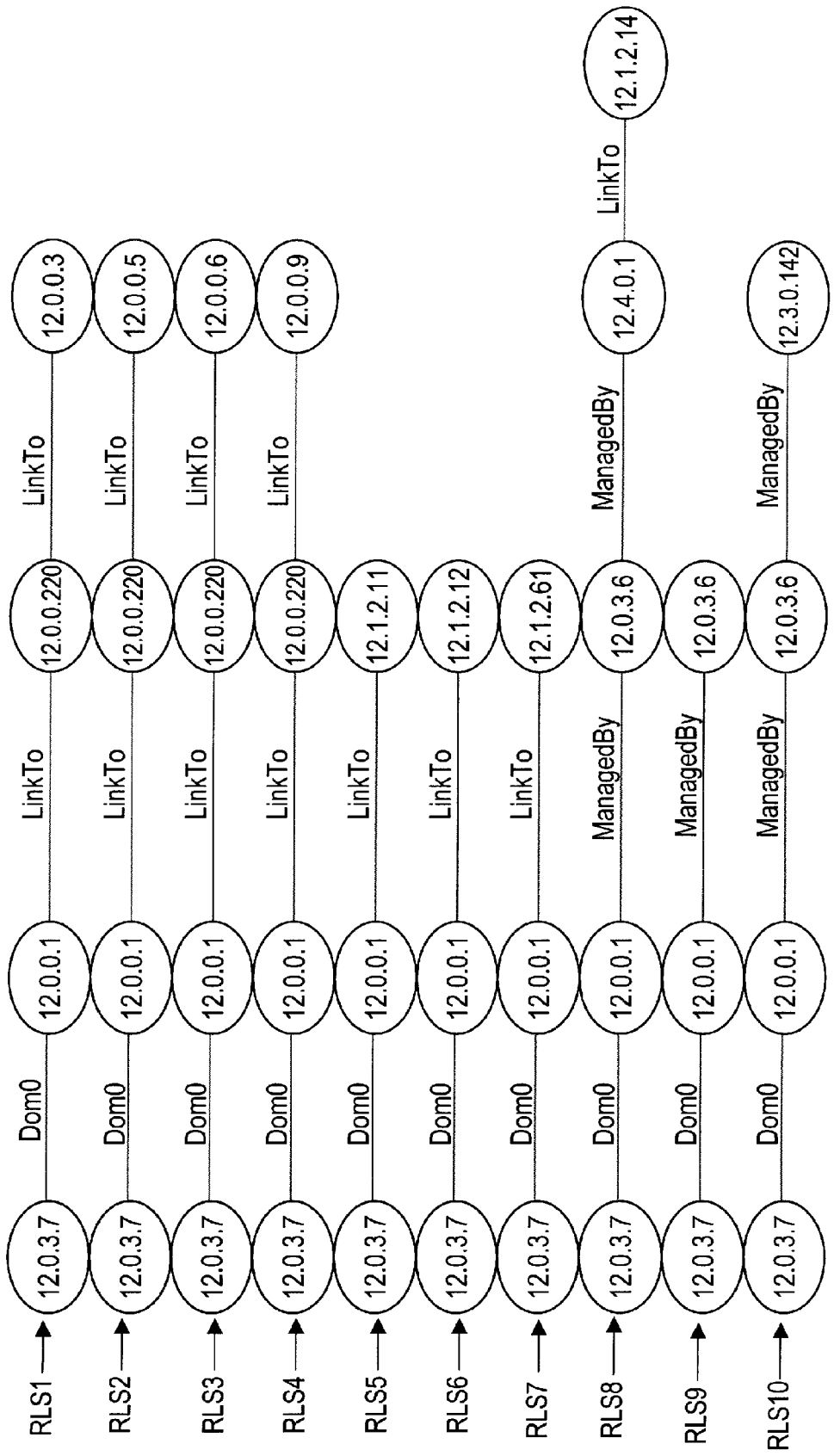
FIG. 53 is a diagram to illustrate a relationship from a target server to a partner server.

Next, by referring to FIG. 53 and FIG. 54, the grouping of IP addresses in FIG. 52 will be described. FIG. 53 is a schematic diagram illustrating the relationship to the partner server from the target server.

The ellipse illustrates schematically the configuration items (for example, switches, physical servers, virtual servers). The IP addresses "X1, X2, X3, X4" in the ellipse indicate the IP addresses set to the configuration items. Straight lines between the ellipses indicate the relationship between the configuration items represented by the ellipse. Then, the reference "Dom0", "LinkTo", "Managed by" described in this straight line indicate the contents of the relationship between the configuration items. The "Dom0", "LinkTo", and "Managed by" are explained in FIG. 49 and in FIG. 50.

In FIG. 53, the target server indicates a server that is set with the IP address "12.0.3.7". In addition, the partner server indicates a server set the partner IP address, which is stored in the partner IP address field in the shaping log table Tf1 of FIG. 40.

FIG. 53 illustrates the relationship between the target servers that were set the IP address "12.0.3.7" and the partner server of which the partner IP address, which is stored in the partner IP address field of the shaping log table Tf1 of FIG. 40, among the ten relationships indicated by reference numerals RLS1~RLS10.

First, the relationship RLS1 will be explained in detail. The target server (VM10 in FIG. 51) that is set with the IP address "12.0.3.7" has a relationship (referring to "Dom0") which is executed by the physical server (SVR10 of FIG. 51) that is set with the IP address "12.0.0.1". And, the physical server that is set with the IP address "12.0.0.1" has a relationship (referring to "Link To") which connects to the switch that is set with the IP address "12.0.0.220" via the network. The switch set with the IP address "12.0.0.220" has a relationship (referring to "Link To") which connects to the physical server that is set the IP address "12.0.0.3" via the network.

The relationship RLS2~relationship RLS4 (For more detail, the relationship between the target server that is set with the IP address "12.0.3.7" and three physical servers which are set the IP addresses "12.0.0.5", "12.0.0.6", "12.0.0.9") are same relationship of the RLS1 (in other words, the same relationship as RLS1).

Then, the relationship RLS5 will be explained in detail. There is a relationship (referring to "Dom0") that the target server (VM10 in FIG. 51), which is set with the IP address "12.0.3.7", is executed by the physical server (SVR10 in FIG. 51) that is set with the IP address "12.0.0.1". In addition, there is a relationship (referring to "LinkTo") that the physical server which is set with the IP address "12.0.0.1" connects to the switch (referring to FIG. 51) that is set with IP address "12.1.2.11" via the network.

The relationship RLS6 and the relationship RLS7 (For more detail, the relationship between the target server that is set with the IP address "12.0.3.7" and two switches (referring to FIG. 51) which are set the IP addresses "12.1.2.12", "12.1.2.61") are same relationship of the RLS5 (in other words, the same relationship as RLS5).

Below, since the relationship RLS8~relationship RLS10 are not directly related to the grouping which will be described below, the description thereof will be omitted.

In FIG. 53, about the relationship RLS1~the relationship RLS10, the server, which is set the IP address within the ellipse indicated by the far left of the drawing, is a target server (IP address "12.0.3.7"), and the server, which is set the IP address (for example, IP address "12.0.0.3") within the ellipse indicated by the far right of the drawing, is a partner server.

The CDMB stores the configuration items and the relationship element information which correspond to the relationship between the configuration items as described in FIG. 53 above. The clustering unit 46 refers to the configuration items and the relationship element information, follows the configuration item relating to the target server, and extracts the relationship to the partner server from the target server (step S61). Then, the clustering unit 46 stores the relationship between configuration items extracted in the memory 402 (step S61).

In the example of FIG. 53, the clustering unit 46 stores information indicating that the relationship between the configuration items is the relationship depicted by reference numerals RLS1~RLS10 in the memory 402.

Here, for example, the target server is a server that is set the IP address of the transmission source included in the communication log of the setting error candidate, which was segmented as described in the fourth embodiment. And the partner server is a server that is set the IP address of the transmission destination included in the communication log of the setting error candidate.

Figure 54:
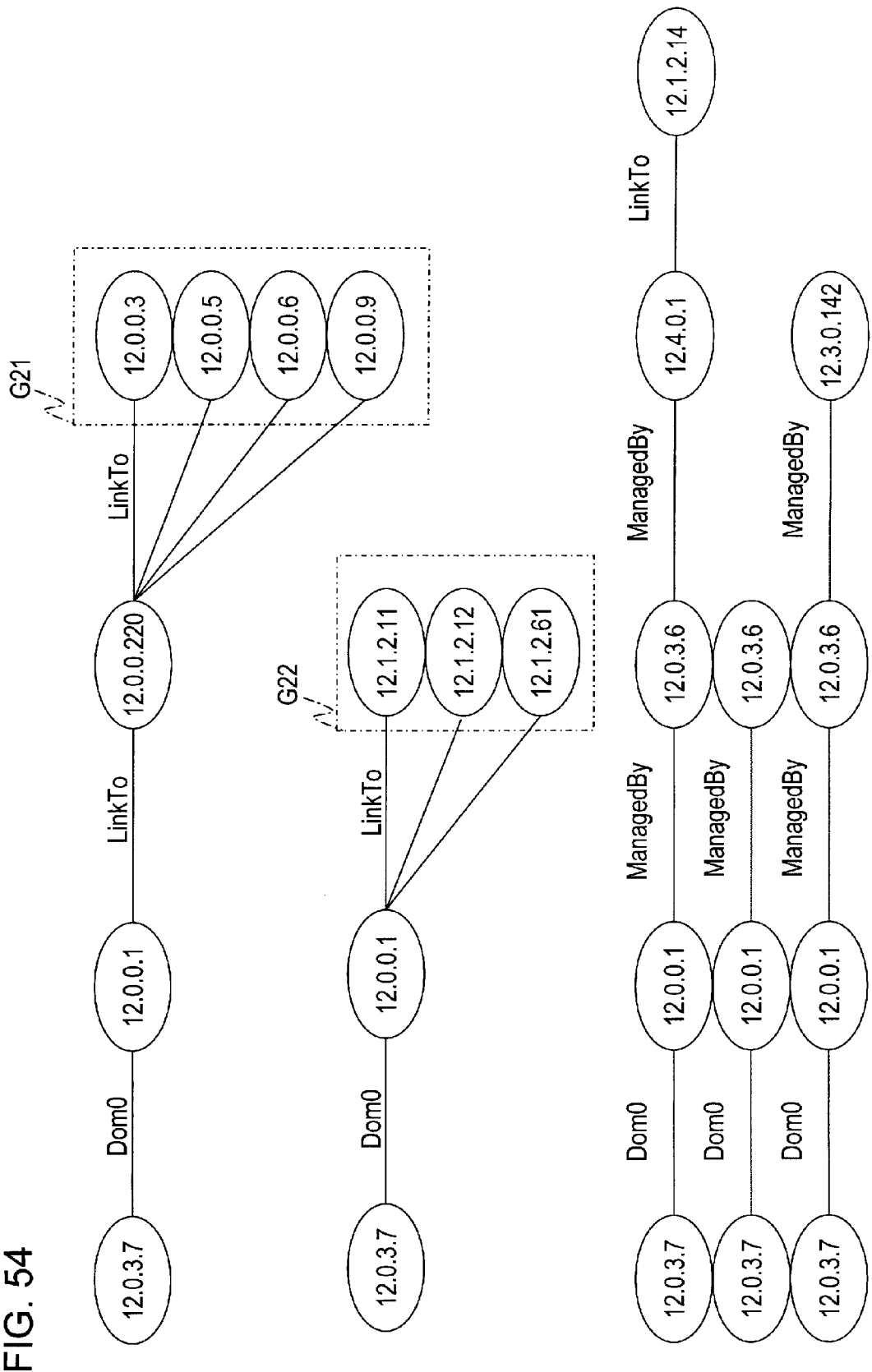
FIG. 54 is a diagram to illustrate a grouping process of IP addresses which are set to each servers that the relationship from a target server to a partner serve are matched.

FIG. 54 is a schematic diagram of the grouping process of the IP addresses which are set to each of the plurality of partner servers that the relationship to the partner server from the target server matches. FIG. 54 illustrates a state that the configuration items which match the relationship are combined into one in FIG. 53.

The clustering unit 46 refers to the relationship between the configuration items stored in the memory 402 in the step S61, and extracts the IP address which is set to each of the partner servers in which the relationship to the partner server from the target server matches (step S62).

In the example of FIG. 54, the IP address which is set to each of the partner servers in which the relationship to the partner server from the target server, which is set the IP address "12.0.3.7", matches is the IP address enclosed in the chain line indicated by reference numerals G21, G22.

Here, IP addresses surrounded by a chain line indicated by reference numeral G21 are four IP addresses "12.0.0.3", "12.0.0.5", "12.0.0.6", "12.0.0.9". And the IP addresses enclosed by the chain line indicated by reference numeral G22 are three IP addresses "12.1.2.11", "12.1.2.12", "12.1.2.61".

The clustering unit 46 refers to the relationship between the configuration items stored in the memory 402 and extracts the four IP addresses and the two IP addresses which are set to each of the partner servers in which the relationship to the partner server from the target server matches.

The clustering unit 46 executes the grouping of the plurality of IP addresses extracted, segments the grouping IP addresses into a group and store it in the memory 402. More specifically, the clustering unit 46 stores a flag indicating that the four IP addresses belong to same group along with the four IP addresses in the memory 402. Then, clustering unit 46 stores a flag indicating that the three IP addresses belong to same group along with the three IP addresses in the memory 402.

(Re-Clustering)

Figure 55:
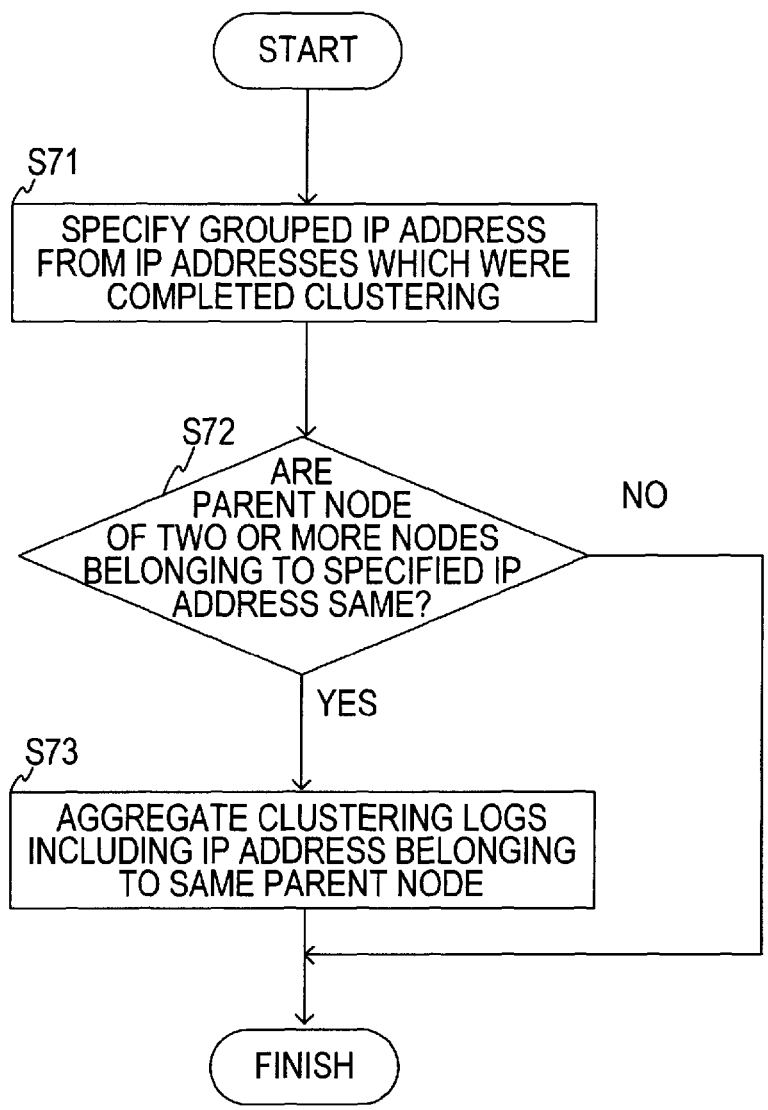
FIG. 55 is a flow diagram to explain re-clustering.

FIG. 55 is an example of a flow diagram illustrating the re-clustering.

Step S71: the clustering unit 46 specifies the grouped IP address from the IP addresses which were clustered.

Step S72: the clustering unit 46 determines whether or not the parent node of two or more nodes belonging to the specified IP address is same. When is a same case (step S72/YES), the process proceeds to the step S73.

Step S73: the clustering unit 46 aggregates the clustering log including the IP address belonging to same parent node among the clustering logs stored in the refined result table and created in the previous step of re-clustering.

The clustering unit 46 executes the processes of the steps S72, S73 for each group.

The clustering unit 46 executes the processes from the step S71 to the step S73 on each target servers.

(Examples of the Re-Clustering)

Figure 56:
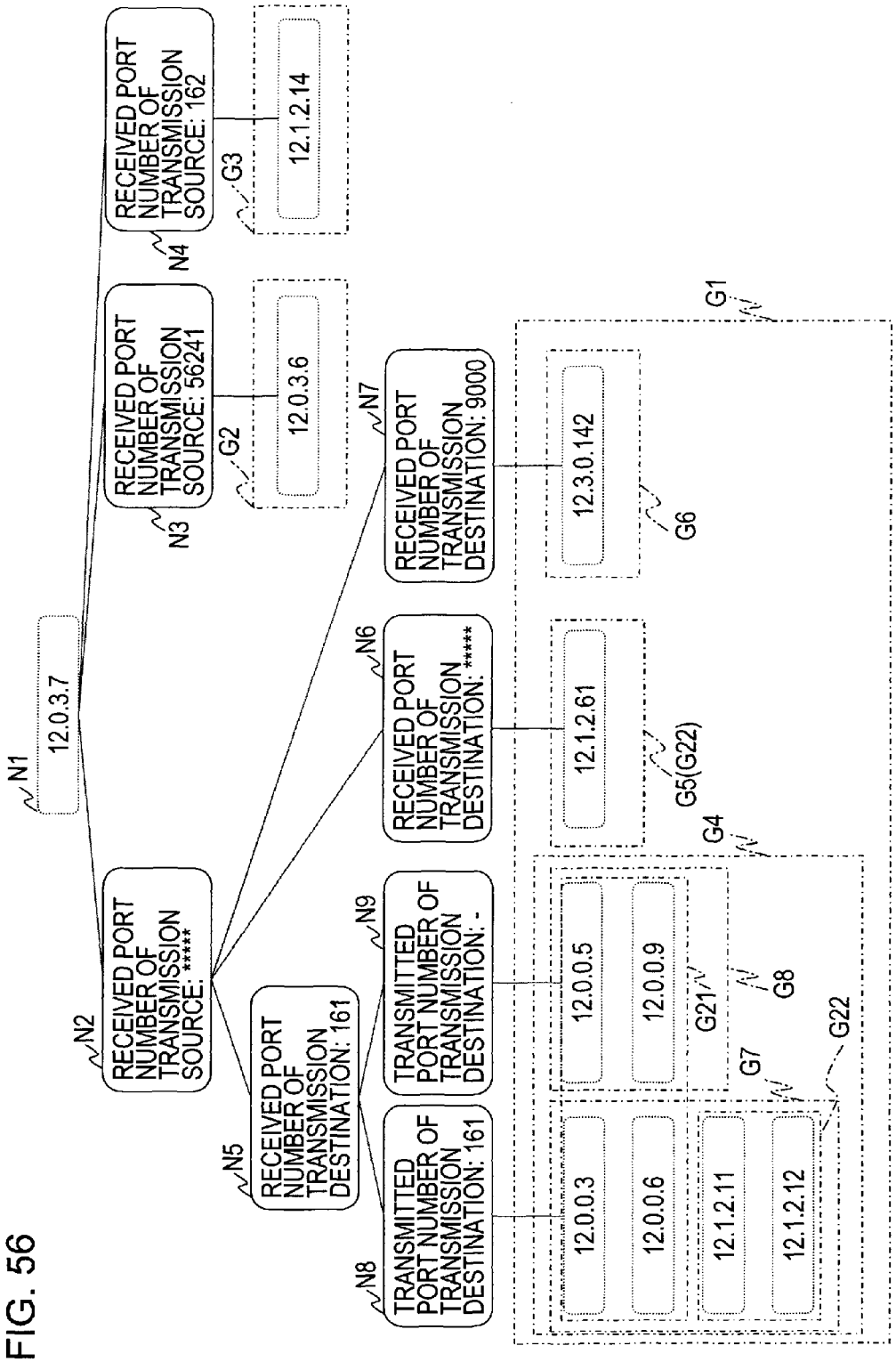
FIG. 56 is a first diagram to explain a first embodiment of the re-clustering.
Figure 57:
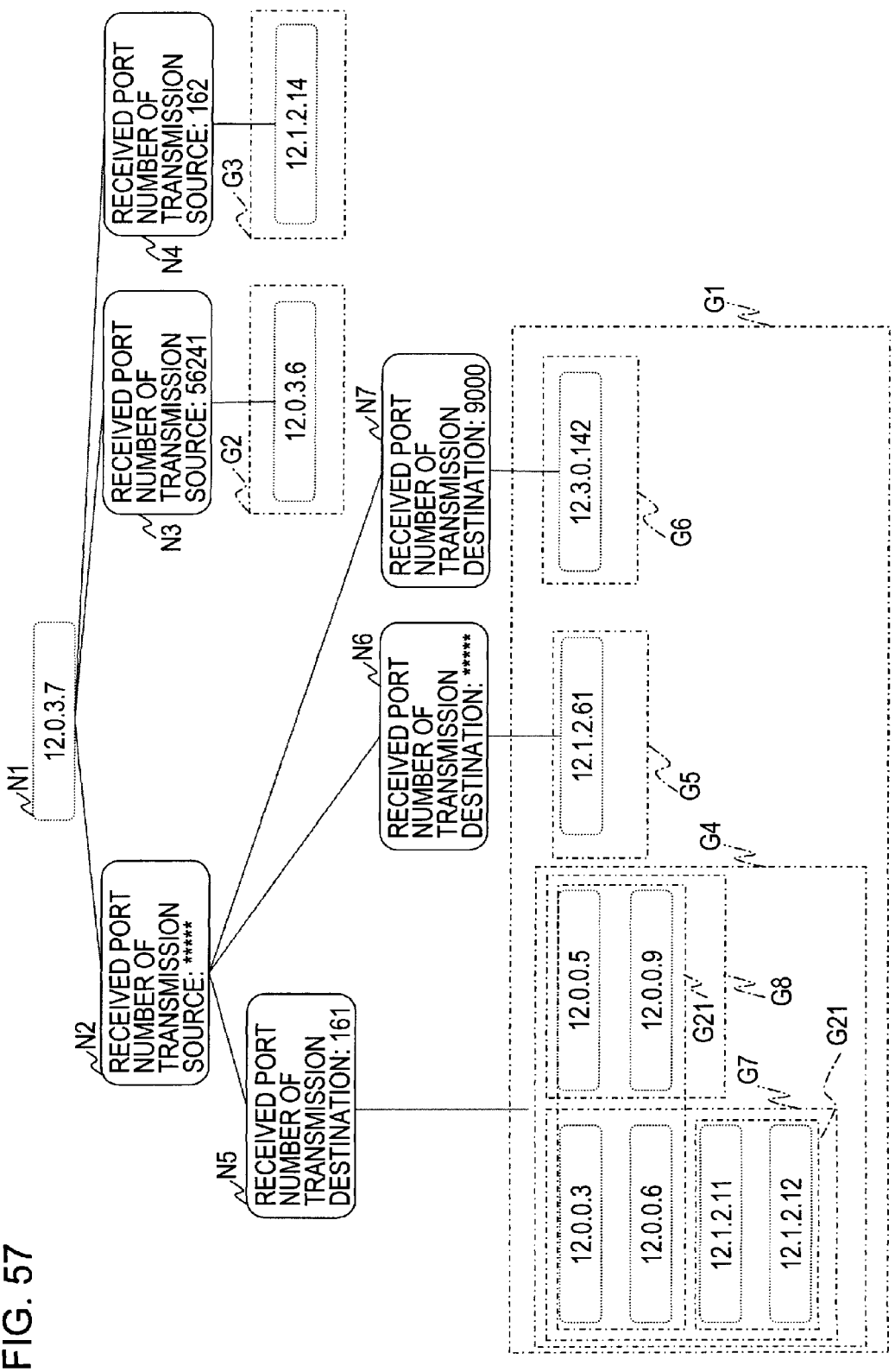
FIG. 57 is a second diagram to explain a second embodiment of the re-clustering.

By referring to FIG. 55, FIG. 56, the example of re-clustering will be described. FIG. 56 schematically illustrates a first diagram of example of the re-clustering. FIG. 57 schematically illustrates a second diagram of example of the re-clustering. FIG. 56 is a diagram illustrating a tree structure related to the port numbers and the IP addresses, as same as FIG. 42. The node configuration in FIG. 56 is same as the node configuration in FIG. 42. Here, as already described in the first example of the clustering, the clustering of the IP address is already finished.

That is, as described in the fourth embodiment of the administration device, the clustering unit 46 stores node information that the child nodes of the root node N1 are nodes N2~N4, the child nodes of the node N2 are nodes N5~N7, the child nodes of the node N5 are a node N8 and a node N9.

Furthermore, the clustering unit 46 stores node information that the child node of the node N2 is a node indicated by reference numeral G2, the child node of the node N4 is a node indicated by reference numeral G3, the child node of the node N8 is a node indicated by reference numeral G7. And the clustering unit 46 stores node information that the child node of the node N9 is a node indicated by reference numeral G8, the child node of the node N6 is a node indicated by reference numeral G5, the child node of the node N7 is a node indicated by reference numeral G6.

In addition, the grouping of IP addresses which is described in FIG. 54 has been completed. That is, the memory 402 stores the flag indicating that four IP addresses "12.0.0.3", "12.0.0.5", "12.0.0.6", "12.0.0.9", which are enclosed by the chain line indicated by reference numeral G21 in FIG. 54, belong to same group. Further, the memory 402 stores the flag indicating that three IP addresses "12.1.2.11", "12.1.2.12", "12.1.2.16", which are enclosed by the chain line indicated by reference numeral G22 in FIG. 54, belong to same group.

The clustering unit 46 identifies the grouped IP address described in FIG. 54 among the IP addresses which were executed the clustering in the memory 402 (step S71). In the example in FIG. 56, the IP addresses indicated by the reference numerals G21, G22 are identified. Here, four IP addresses indicated by the reference numeral G21 is referred as a first group and two IP addresses indicated by the reference numeral G22 is referred to as a second group.

The clustering unit 46 determines whether or not the parent node of two or more nodes belonging to the specified IP address is same, per grouped IP address (step S72). In the first group, the parent node of two nodes N8, N9 belonging to specified four IP address is the same parent node N5. Thus, the clustering unit 46 determines the YES in step S72 for the first group.

Here, the IP addresses belonging to the node N5 are six IP addresses indicated by reference numeral G21 and reference numeral G22 (reference numeral G4).

The clustering unit 46 aggregates six IP addresses belonging to same parent node N5. That is, the clustering unit 46 aggregates the clustering log including the six IP addresses belonging to same parent node N5 among the clustering logs stored in the refined result table Tn1 in FIG. 43 and created in the previous step of re-clustering (step S73).

On the other hand, in the second group, in the three IP addresses that have been identified, the parent node of one node N8 that two IP addresses "12.1.2.11", "12.1.2.12" belongs to is the node N5, and the parent node of the node N6 that single IP address "12.1.2.61" belongs to is the node N2. That is, Parent nodes of three nodes N8, N9, N6 that IP addresses belong to are different from each other. Accordingly, the clustering unit 46 determines the NO in step S72 for the second group, and does not perform process of the step S73.

FIG. 57 is a diagram schematically illustrating a state to aggregate six IP addresses belonging to same parent node N5 in the nodes depicted by the tree structure shown in FIG. 56.

In FIG. 57, the IP addressee belonging to the node N8 and the node N9 illustrated in FIG. 56, are aggregated so as to belong to the node N5.

FIG. 58 is a diagram schematically illustrating a state to aggregate the clustering logs including six IP addresses which belong to same parent node N5 in the clustering logs depicted by the refined result table Tn1 of FIG. 43.

As represented by the item No. 1 of the refined result table Tn4 in FIG. 58, the clustering unit 46 aggregates the clustering logs including six IP addresses "12.0.0.3", "12.0.0.5", "12.0.0.6", "12.0.0.9", "12.1.2.11", "12.1.2.12" to one (1 line). That is, the clustering unit 46 aggregates the clustering logs stored in lines of the item No. 1 and the item No. 2 on one line (referring to the item No. 1 in FIG. 58) in the refined result table Tn1 in FIG. 43.

Then, the clustering unit 46 merges the port number of transmission source when sending, the port number of transmission destination when sending, the port number of transmission destination when receiving, and the port number of the transmission destination when receiving. The clustering unit 46 executes following process in this merge, when, in the port number of transmission source when sending field, the port number of transmission destination when sending field, the port number of transmission destination when receiving field, and the port number of the transmission destination when receiving field of the refined result table Tn1 in FIG. 43, different port number are stored. That is, the clustering unit 46 stores different port numbers in the line of one item number and stores the "or" between the different port numbers in the field of which different port numbers are stored.

For example, in the refined result table Tn1 in FIG. 43, "161" is stored in a cell in which the line of item No. 1 intersects to the port number of transmission source when sending field, and "-" is stored in a cell in which the line of item No. 2 intersects to the port number of transmission source when sending field. Therefore, the clustering unit 46 stores "161" or "-" in a cell in which the line of item No. 1 intersects to the port number of transmission source when sending field.

Meanwhile, when same port number are stored in each field of the port number of transmission source when sending field, the port number of transmission destination when sending field, the port number of transmission destination when receiving field, and the port number of the transmission destination when receiving field of the refined result table Tn1 in FIG. 43, the clustering unit 46, in the merging of the port numbers, stores same port number (that is, not performed merging of the port number).

For example, in the refined result table Tn1 in FIG. 43, "161" is stored in a cell in which the line of item No. 1 intersects to the port number of transmission destination when receiving field, and "161" is stored in a cell in which the line of item No. 2 intersects to the port number of transmission destination when receiving field. Therefore, the clustering unit 46 stores "161" in a cell in which the line of item No. 1 intersects to the port number of transmission destination when receiving field.

As described above, the clustering section 46 executes the re-clustering of the communication logs of setting error candidates which were already executed the clustering, according to the similarity of information (information indicating the relationship between the configuration items described in FIG. 53 and FIG. 54) indicating the relationship between communication source and communication destination included in the communication log of setting error candidate which were executed the clustering. In other words, the clustering unit 46 combines the clustering logs including the IP address that the relationship between the source and the destination matches into one clustering log.

In the refined result table Tn4 of FIG. 58, the clustering logs including six partner IP addresses is aggregated in the line of item No. 1. As described in the first example of the clustering in the fourth embodiment, it is possible that the administrator determines that there is a possibility that set of the application, that uses port number "161", is forgotten in the device set to "12.0.0.3", for example.

And it is possible that the administrator determines that there is a possibility that set of the application, that uses port number "161", is forgotten in the other devices set to "12.0.0.5", "12.0.0.6", "12.0.0.9", "12.1.2.11", "12.1.2.12", for example.

The number of the device in this case is two more than the example which is described in the first example of the clustering in the fourth embodiment by referring the refined result table Tn1 in FIG. 43. Therefore, it is possible that the administration device displays more number of devices which have a possibility occurred the setting error by same case to the administrator. As a result, it is possible that the administrator performs more efficient investigation of the setting error.

The state that the communication log database DB1 in FIG. 34 stores the refined result table Tn4 is illustrated by reference numeral Tn in FIG. 34.

In addition, even though determining that parent nodes of two or more nodes belonging to the specified IP address are same node (step S72/YES) in a group (hereinafter referred to as group GX), when the contents of the clustering for log that contains the specified IP address does not characterize to the communication contents, the clustering unit 46 does not aggregate the clustering logs (step S73).

More specifically, in the group GX, when the port number in all nodes till the root node N1 from the specified IP address is "*****" or "-", the clustering unit 46 does not execute the processing in step S73, even though determining the YES in the step S72.

Figure 59:
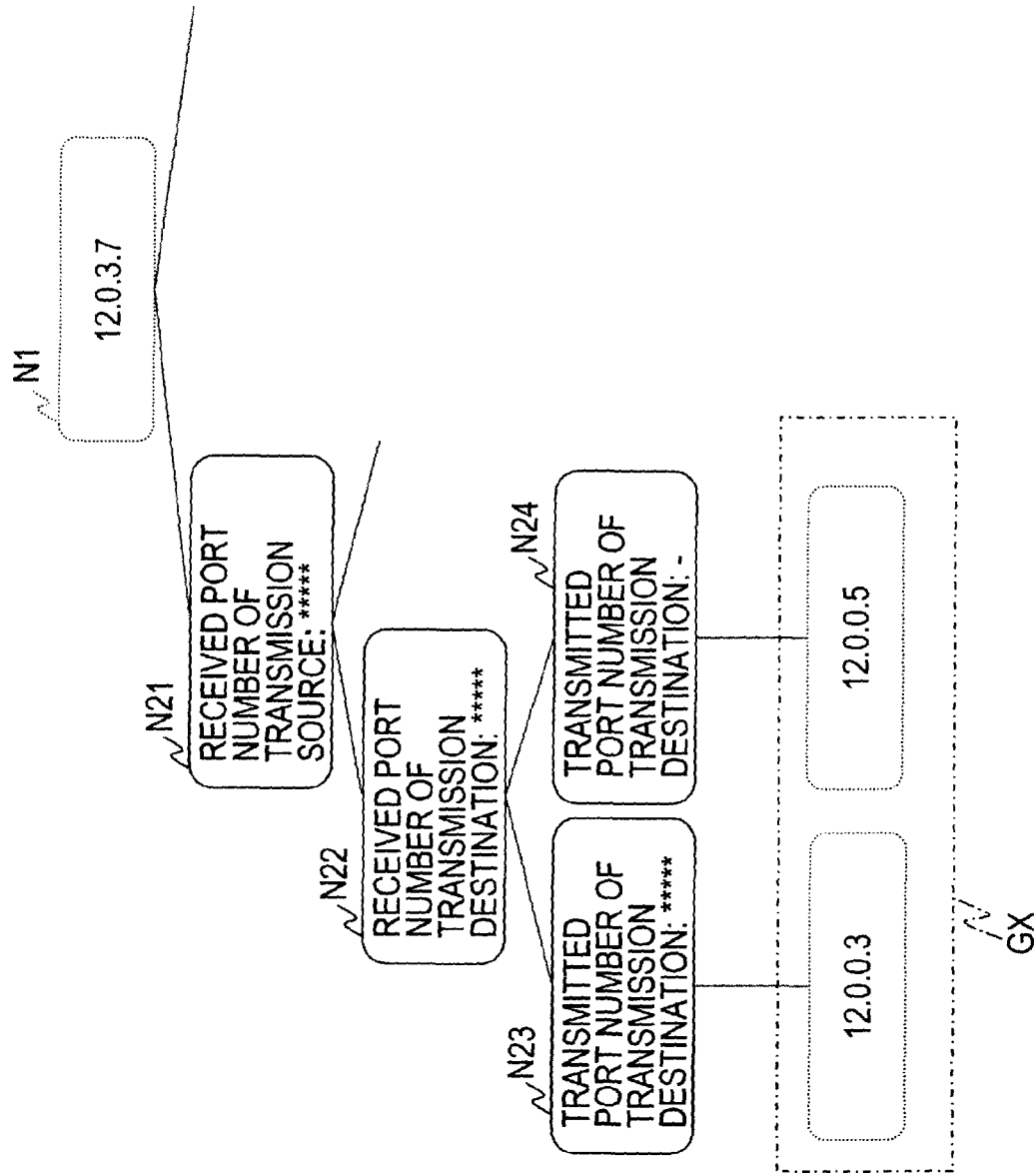
FIG. 59 is a diagram to explain a case that the aggregation of the clustering logs is not executed in one group.

FIG. 59 is a diagram schematically illustrating that the aggregate of clustering logs does not execute in one group.

In all nodes N21~N24 in the way to the root node N1 from the IP address indicated by reference numeral GX, the port number is a "***" or "-". In the port number of "***" or "-", it is not known what the port number.

For clustering logs that contains the IP address indicated by reference numeral GX, the contents of the port number is unknown. Therefore, since it is not possible to identify the contents of the service, even if the clustering logs are aggregated, it is difficult to find a setting error from the clustering log after aggregation. Therefore, the aggregation of clustering logs is not performed.

In addition, there is a case which is detected two or more relationship from the target server to the partner server not only one relationship. In such a case, for example, it is preferable to detect one relationship which matches the other relationship by a priority of the network connection configuration. Therefore it is no need that the relationship from the target server to the partner server is shortest, that is, the configuration item from the configuration item of the target server to the configuration item of the partner server is minimum.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

The invention claimed is:

1. An administration device in a system in which a first device group and a second device group are connected to a network, the administration device comprising:
   a storage device configured to store relating information which relates devices of the first device group to devices of the second device group; and
   a control unit configured to acquire a first communication history of the first device group and a second communication history of the second device group, to convert first address information which specifies a communication source and a communication destination of the first communication history or second address information which specifies the communication source and the communication destination of the second communication history into third address information set in the devices of the second device group or fourth address information set in the devices of the first device group according to the relating information, to compare the third address information with the second address information or compare the first address information with the fourth address information according to the relating information, and to detect a setting error of the second address information set in the devices of the second device group based on a comparison result.

2. The administration device according to claim 1,
wherein the first and second address information include IP (Internet protocol) addresses of the transmission source and the transmission destination and port numbers of the transmission source and the transmission destination, and
wherein the relating information include each of the IP addresses set in each device in the first device group and each of the IP addresses set in each device in the second device group which has a same function of the first device group.

3. The administration device according to claim 2, wherein the control unit creates a converted first communication history having the third address information that each of the IP addresses in the first communication history are converted into the IP addresses set in the second device group corresponding to the IP addresses in the first communication history, based on the relating information, detects the communication history in the converted first communication history which do not correspond with the IP address or the port number of the communication source and the communication destination in the second communication history as a first setting error, and detects the communication history in the second communication history which do not correspond with the IP address or the port number of the communication source and communication destination in the converted first communication history as a second setting error.

4. The administration device according to claim 3, wherein, the control unit, from the first setting error and the second setting error, detects a third setting error that the IP address of the transmission source and the port number of the transmission source are common, or a fourth setting error that the IP address of the transmission destination and the port number of the transmission destination are common, detects a setting error of the IP addresses of the transmission source and transmission destination related to the first and second setting errors, and notifies detected the setting error.

5. The administration device according to claim 4, wherein the control unit detects communication history having a fifth setting error except the third and fourth setting errors, from the communication history having the first setting error, detects the setting error of the IP address of the transmission source related to the communication history having the fifth setting error in the devices of the second device group, and notifies the setting error to be detected.

6. The administration device according to claim 2, wherein the control unit creates a converted second communication history having the fourth address information that each of the IP addresses in the second communication history are converted into the IP addresses set in the first device group corresponding to the IP addresses in the second communication history, based on the relating information, detects the communication history in the converted second communication history which do not correspond with the IP address or the port number of the communication source and communication destination in the first communication history as a first setting error, and detects the communication history in the first communication history which do not correspond with the IP address or the port number of the communication source and communication destination in the converted second communication history as a second setting error.

7. The administration device according to claim 2, wherein, the control unit, when the IP addresses of the transmission source and the transmission destination included in two first communication history are respectively common, and further, the port number of the transmission source or the port number of the transmission destination included in the two first communication history are common, integrates the two first communication history into one first communication history, stores the one first communication history in the storage device, and acquires the specific information from the one first communication history to be integrated, and
wherein, when the IP addresses of the transmission source and the transmission destination included in the two second communication history are respectively common, and further, the port number of the transmission source or the port number of the transmission destination included in the two second communication history are common, the control unit integrates the two second communication history into one second communication history, stores the one second communication history in the storage device, and acquires the specific information from the one second communication history to be integrated.

8. The administration device according to claim 2, wherein the control unit adds frequency occurrence of the first communication history of the plurality of first device groups to the first communication history, and converts the IP addresses of the transmission source and the transmission destination in the first communication history of the plurality of first device groups into the IP addresses set in the devices of the second device group corresponding to the IP addresses of the transmission source and the transmission destination, based on the relating information.

9. The administration device according to claim 8, wherein the control unit detects a first setting error that the communication history in the first communication history do not correspond with the IP address or the port number of the communication source and communication destination in the plurality of second communication history, and detects a second setting error that the communication history in the second communication history do not correspond with the IP address or the port number of the communication source and communication destination in the first communication history.

10. The administration device according to claim 2, wherein the control unit detects communication history having the setting error by referring the comparison result, and assembles the communication history having the setting error according to a similarity of the address information in the communication history having the setting error.

11. The administration device according to claim 10, wherein the control unit assembles assembled communication history having the setting error according to a similarity of information indicating a relationship of the transmission source and the transmission destination in the assembled communication history having the setting error.

12. An administration control method of an administration device in a system in which a first device group and a second device group are connected to a network, the administration control method comprising:
acquiring a first communication history of the first device group and a second communication history of the second device group;
converting first address information which specifies a communication source and a communication destination of the first communication history or second address information which specifies the communication source and the communication destination of the second communication history into third address information set in the devices of the second device group or fourth address information set in the devices of the first device group according to relating information which relates devices of the first device group to devices of the second device group;

comparing the third address information with the second address information or comparing the first address information with the fourth address information; and detecting a setting error of the second address information set in the devices of the second device group based on a comparison result.

13. The administration control method according to claim 12, wherein the detecting comprises:
   first detecting a subset of the first communication history that does not correspond to the second address information, as having the setting error, based on the comparison result; and
   second detecting the setting error of the second address information related to the subset of the first communication history having the setting error, in the devices of the second device group.

14. The administration control method according to claim 12, the method further comprising:
   detecting an error-containing communication history having the setting error by referring to the comparison result; and
   assembling the error-containing communication history having the setting error according to a similarity of the second address information in the error-containing communication history having the setting error.

15. The administration control method according to claim 14, wherein the method further comprising second assembling assembled communication history having the setting error according to a similarity of information indicating a relationship of the transmission source and the transmission destination in the assembled communication history having the setting error.

16. A non-transitory computer-readable storage medium storing therein a program for causing a computer to execute a process, the process comprising,
   acquiring a first communication history of the first device group and a second communication history of the second device group;
   comparing first address information with second address information or comparing third address information with fourth address information; and
   detecting a setting error of the second address information set in the devices of the second device group based on a comparison result.

17. The non-transitory computer-readable storage medium according to claim 16, the process further comprising
   first detecting a subset of the first communication history that does not correspond to the second address information, as having the setting error, based on the comparison result; and
   second detecting the setting error of the second address information related to the subset of the first communication history having the setting error, in the devices of the second device group.

18. The non-transitory computer-readable storage medium according to claim 16, the process further comprising:
   detecting an error-containing communication history having the setting error by referring to the comparison result; and
   assembling the error-containing communication history having the setting error according to a similarity of the second address information in the error-containing communication history having the setting error.

19. The non-transitory computer-readable storage medium according to claim 16, the process further comprising:
   assembling assembled communication history having the setting error according to a similarity of information indicating a relationship of the transmission source and the transmission destination in the assembled communication history having the setting error.

\* \* \* \* \*